(12) United States Patent
Cui et al.

(10) Patent No.: US 11,680,474 B2
(45) Date of Patent: *Jun. 20, 2023

(54) FRACTURING APPARATUS AND CONTROL METHOD THEREOF, FRACTURING SYSTEM

(71) Applicant: YANTAI JEREH PETROLEUM EQUIPMENT & TECHNOLOGIES CO., LTD., Yantai (CN)

(72) Inventors: Shuzhen Cui, Yantai (CN); Rikui Zhang, Yantai (CN); Dong Liu, Yantai (CN); Jifeng Zhong, Yantai (CN); Liang Lv, Yantai (CN); Xincheng Li, Yantai (CN); Sheng Chang, Yantai (CN); Chunqiang Lan, Yantai (CN); Jian Zhang, Yantai (CN); Xiaolei Ji, Yantai (CN); Huaizhi Zhang, Yantai (CN); Ruijie Du, Yantai (CN); Dawei Zhao, Yantai (CN); Shouzhe Li, Yantai (CN)

(73) Assignee: YANTAI JEREH PETROLEUM EQUIPMENT & TECHNOLOGIES CO., LTD., Yantai (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/884,358

(22) Filed: Aug. 9, 2022

(65) Prior Publication Data
US 2022/0381126 A1 Dec. 1, 2022

Related U.S. Application Data

(63) Continuation-in-part of application No. 17/733,922, filed on Apr. 29, 2022, which is a continuation-in-part
(Continued)

(30) Foreign Application Priority Data

Jun. 13, 2019 (CN) .......................... 201910510411.8
Apr. 20, 2021 (CN) .......................... 202110426356.1
Oct. 14, 2021 (CN) .......................... 202111198446.6

(51) Int. Cl.
*E21B 43/26* (2006.01)
*F04B 17/03* (2006.01)
*H02K 7/18* (2006.01)

(52) U.S. Cl.
CPC .......... *E21B 43/2607* (2020.05); *F04B 17/03* (2013.01); *H02K 7/1823* (2013.01)

(58) Field of Classification Search
CPC .... E21B 43/2607; F04B 17/03; H02K 7/1823
See application file for complete search history.

(56) References Cited

U.S. PATENT DOCUMENTS 1,711,979 A 5/1929 Helmut
2,015,745 A 10/1935 Max
(Continued)

FOREIGN PATENT DOCUMENTS

CA 2908276 A1 4/2016
CN 1154765 A 7/1997
(Continued)

OTHER PUBLICATIONS

Written Opinion of the International Searching Authority and International Search Report for PCT Application No. PCT/CN2019/114303 dated Aug. 3, 2020.
(Continued)

*Primary Examiner* — Pedro J Cuevas

(57) ABSTRACT

A fracturing apparatus may include a power supply platform; a gas turbine engine; a generator; and one or more rectifiers. At least two of the gas turbine engine, the generator, and the one or more rectifiers are arranged on the
(Continued)

power supply platform. A first end of the generator is connected to the gas turbine engine. A second end of the generator is connected to the one or more rectifiers. The generator is configured to output a voltage to the one or more rectifiers.

20 Claims, 31 Drawing Sheets

Related U.S. Application Data of application No. PCT/CN2021/139240, filed on Dec. 17, 2021, application No. 17/884,358 is a continuation-in-part of application No. 17/242,316, filed on Apr. 28, 2021, now Pat. No. 11,492,887, said application No. 17/733,922 is a continuation-in-part of application No. PCT/CN2020/135860, filed on Dec. 11, 2020, said application No. 17/242,316 is a continuation of application No. 16/834,446, filed on Mar. 30, 2020, now Pat. No. 11,035,214, said application No. 17/733,922 is a continuation-in-part of application No. PCT/CN2019/114304, filed on Oct. 30, 2019.

(56) References Cited

U.S. PATENT DOCUMENTS

| | | |
|---|---|---|
| 3,035,222 A | 5/1962 | Stone |
| 3,378,755 A | 4/1968 | Sawyer |
| 3,453,443 A | 7/1969 | Stoeckly |
| 3,794,377 A | 2/1974 | Wachsmuth et al. |
| 3,815,965 A | 6/1974 | Ostwald |
| 4,136,432 A | 1/1979 | Melley, Jr. |
| 4,201,523 A | 5/1980 | Olofsson |
| 4,336,485 A | 6/1982 | Stroud |
| 4,720,645 A | 1/1988 | Stroudxx |
| 4,793,775 A | 12/1988 | Peruzzi |
| 4,904,841 A | 2/1990 | English |
| 4,992,669 A | 2/1991 | Parmley |
| 5,274,322 A | 12/1993 | Hayashi et al. |
| 5,453,647 A | 9/1995 | Hedeen et al. |
| 5,517,822 A | 5/1996 | Haws et al. |
| 5,519,300 A | 5/1996 | Leon et al. |
| 5,614,799 A | 3/1997 | Anderson et al. |
| 5,691,590 A | 11/1997 | Kawai et al. |
| 5,714,821 A | 2/1998 | Dittman |
| 5,751,150 A | 5/1998 | Rippel et al. |
| 5,767,591 A | 6/1998 | Pinkerton |
| 5,821,660 A | 10/1998 | Anderson |
| 5,846,056 A | 12/1998 | Dhindsa et al. |
| 5,994,802 A | 11/1999 | Shichijyo et al. |
| 6,121,707 A | 9/2000 | Bell et al. |
| 6,134,878 A | 10/2000 | Amako et al. |
| 6,281,610 B1 | 8/2001 | Kliman et al. |
| 6,331,760 B1 | 12/2001 | Mclane, Jr. |
| 6,388,869 B1 | 5/2002 | Fauteux et al. |
| 6,417,592 B2 | 7/2002 | Nakamura et al. |
| 6,450,133 B1 | 9/2002 | Bernard et al. |
| 6,455,974 B1 | 9/2002 | Fogarty |
| 6,552,463 B2 | 4/2003 | Oohashi et al. |
| 6,704,993 B2 | 3/2004 | Fogarty |
| 6,765,304 B2 | 7/2004 | Baten et al. |
| 6,784,583 B2 | 8/2004 | Umeda |
| 6,786,051 B2 | 9/2004 | Kristich et al. |
| 6,893,487 B2 | 5/2005 | Alger et al. |
| 6,895,903 B2 | 5/2005 | Campion |
| 7,007,966 B2 | 3/2006 | Campion |
| 7,016,207 B2 | 3/2006 | Yamanaka et al. |
| 7,075,206 B1 | 7/2006 | Chen |
| 7,081,682 B2 | 7/2006 | Campion |
| 7,112,891 B2 | 9/2006 | Johnson et al. |
| 7,122,913 B2 | 10/2006 | Witten et al. |
| 7,221,061 B2 | 5/2007 | Alger et al. |
| 7,245,032 B2 | 7/2007 | Willets et al. |
| 7,291,954 B2 | 11/2007 | Kashihara et al. |
| 7,372,174 B2 | 5/2008 | Jones et al. |
| 7,511,385 B2 | 3/2009 | Jones et al. |
| 7,608,934 B1 | 10/2009 | Hunter |
| 7,615,877 B2 | 11/2009 | Willets et al. |
| 7,619,319 B1 | 11/2009 | Hunter |
| 7,635,926 B2 | 12/2009 | Willets et al. |
| 7,656,052 B2 | 2/2010 | Jones et al. |
| 7,667,342 B2 | 2/2010 | Matsumoto et al. |
| 7,679,232 B2 | 3/2010 | Kakimoto et al. |
| 7,692,321 B2 | 4/2010 | Jones et al. |
| 7,755,209 B2 | 7/2010 | Jones et al. |
| 7,921,914 B2 | 4/2011 | Bruins et al. |
| 8,159,082 B2 | 4/2012 | Gemin et al. |
| 8,294,285 B2 | 10/2012 | Hunter |
| 8,294,286 B2 | 10/2012 | Hunter |
| 8,362,638 B2 | 1/2013 | Gemin et al. |
| 8,495,869 B2 | 7/2013 | Beissler et al. |
| 8,519,591 B2 | 8/2013 | Nishimura |
| 8,587,136 B2 | 11/2013 | Williams |
| 8,670,260 B2 | 3/2014 | Wang et al. |
| 8,731,793 B2 | 5/2014 | Barbir et al. |
| 8,773,876 B2 | 7/2014 | Kuboyama et al. |
| 8,789,601 B2 | 7/2014 | Broussard et al. |
| 8,796,899 B2 | 8/2014 | Imazawa et al. |
| 8,811,048 B2 | 8/2014 | Zhang et al. |
| 9,103,193 B2 | 8/2015 | Coli et al. |
| 9,140,110 B2 | 9/2015 | Coli et al. |
| 9,166,495 B2 | 10/2015 | Guan |
| 9,209,704 B2 | 12/2015 | Huang |
| 9,534,473 B2 | 1/2017 | Morris et al. |
| 9,562,420 B2 | 2/2017 | Morris et al. |
| 9,577,545 B2 | 2/2017 | Tan et al. |
| 9,641,112 B2 | 5/2017 | Harknett et al. |
| 10,184,397 B2 | 1/2019 | Austin et al. |
| 10,240,643 B2 | 3/2019 | Clapp et al. |
| 10,411,635 B2 | 9/2019 | Takahashi |
| 10,514,205 B2 | 12/2019 | Hjorth et al. |
| 10,523,130 B2 | 12/2019 | Bax et al. |
| 10,584,671 B2 | 3/2020 | Tunzini et al. |
| 10,610,842 B2 | 4/2020 | Chong |
| 10,648,311 B2 * | 5/2020 | Oehring ............... H02P 5/74 |
| 10,801,311 B1 | 10/2020 | Cui et al. |
| 10,855,142 B2 | 12/2020 | Cory |
| 10,865,624 B1 * | 12/2020 | Cui ............... E21B 41/0085 |
| 10,873,099 B1 | 12/2020 | Gurunathan et al. |
| 10,914,155 B2 * | 2/2021 | Oehring ............ E21B 43/2607 |
| 11,035,214 B2 | 6/2021 | Cui et al. |
| 11,047,379 B1 | 6/2021 | Li et al. |
| 11,109,508 B1 | 8/2021 | Yeung et al. |
| 11,125,066 B1 | 9/2021 | Yeung et al. |
| 11,208,878 B2 * | 12/2021 | Oehring ............... H02B 1/20 |
| 11,220,895 B1 | 1/2022 | Yeung et al. |
| 11,378,008 B2 | 7/2022 | Yeung et al. |
| 11,391,136 B2 | 7/2022 | Coli et al. |
| 11,434,737 B2 * | 9/2022 | Oehring ............... H02J 3/38 |
| 11,459,863 B2 * | 10/2022 | Robinson ............ E21B 43/2607 |
| 11,542,786 B2 | 1/2023 | Hinderliter et al. |
| 2003/0007369 A1 | 1/2003 | Gilbreth et al. |
| 2003/0030246 A1 | 2/2003 | Campion |
| 2003/0033994 A1 | 2/2003 | Campion |
| 2003/0057704 A1 | 3/2003 | Baten et al. |
| 2003/0064858 A1 | 4/2003 | Saeki et al. |
| 2003/0079479 A1 | 5/2003 | Kristich et al. |
| 2004/0081561 A1 | 4/2004 | Iwanami et al. |
| 2004/0104577 A1 | 6/2004 | Alger et al. |
| 2004/0174723 A1 | 9/2004 | Yamanaka et al. |
| 2005/0093496 A1 | 5/2005 | Tokunou et al. |
| 2005/0241884 A1 | 11/2005 | Ghanemi et al. |
| 2006/0066105 A1 | 3/2006 | Johnson et al. |
| 2006/0066108 A1 | 3/2006 | Willets et al. |
| 2006/0080971 A1 | 4/2006 | Smith et al. |
| 2006/0208594 A1 | 9/2006 | Kashihara et al. |
| 2006/0260331 A1 | 11/2006 | Andreychuk |
| 2007/0108771 A1 | 5/2007 | Jones et al. |
| 2007/0121354 A1 | 5/2007 | Jones et al. |
| 2007/0216452 A1 | 9/2007 | Matsumoto et al. |

(56) References Cited

U.S. PATENT DOCUMENTS

| | | |
|---|---|---|
| 2009/0146426 A1 | 6/2009 | Jones et al. |
| 2009/0146500 A1 | 6/2009 | Jones et al. |
| 2009/0147549 A1 | 6/2009 | Jones et al. |
| 2009/0308602 A1 | 12/2009 | Bruins et al. |
| 2010/0045237 A1 | 2/2010 | Liu |
| 2010/0060076 A1 | 3/2010 | Gemin et al. |
| 2010/0084922 A1 | 4/2010 | Gollentz et al. |
| 2010/0135840 A1 | 6/2010 | Fujimoto et al. |
| 2012/0002454 A1 | 1/2012 | Kuboyama et al. |
| 2012/0065787 A1 | 3/2012 | Broniak et al. |
| 2012/0175947 A1 | 7/2012 | Gemin et al. |
| 2012/0248922 A1 | 10/2012 | Imazawa et al. |
| 2012/0255734 A1 | 10/2012 | Coli et al. |
| 2013/0063070 A1 | 3/2013 | Zhang et al. |
| 2013/0182468 A1 | 7/2013 | Guan |
| 2013/0184884 A1 | 7/2013 | More et al. |
| 2013/0229836 A1 | 9/2013 | Wang et al. |
| 2013/0234522 A1 | 9/2013 | Tan et al. |
| 2013/0255153 A1* | 10/2013 | Sasaki ............... B01J 21/066 48/128 |
| 2014/0096974 A1 | 4/2014 | Coli et al. |
| 2014/0138079 A1 | 5/2014 | Broussard et al. |
| 2014/0167810 A1 | 6/2014 | Neti et al. |
| 2014/0174717 A1 | 6/2014 | Broussard et al. |
| 2014/0210213 A1 | 7/2014 | Campion et al. |
| 2014/0219824 A1 | 8/2014 | Burnette |
| 2014/0312823 A1 | 10/2014 | Huang |
| 2015/0027712 A1 | 1/2015 | Vicknair et al. |
| 2015/0068754 A1 | 3/2015 | Coli et al. |
| 2015/0114652 A1 | 4/2015 | Lestz et al. |
| 2015/0252661 A1 | 9/2015 | Glass |
| 2015/0260794 A1 | 9/2015 | Athikessavan et al. |
| 2015/0300145 A1 | 10/2015 | Coli et al. |
| 2015/0314255 A1 | 11/2015 | Coli et al. |
| 2015/0349387 A1 | 12/2015 | Inaba et al. |
| 2016/0041066 A1 | 2/2016 | Patenaude et al. |
| 2016/0075387 A1 | 3/2016 | Fong et al. |
| 2016/0105022 A1 | 4/2016 | Oehring et al. |
| 2016/0121871 A1 | 5/2016 | Lee |
| 2016/0177675 A1 | 6/2016 | Morris et al. |
| 2016/0177678 A1 | 6/2016 | Morris et al. |
| 2016/0177945 A1 | 6/2016 | Byrne et al. |
| 2016/0273328 A1 | 9/2016 | Oehring |
| 2016/0358311 A1 | 12/2016 | Chen et al. |
| 2016/0369609 A1 | 12/2016 | Morris et al. |
| 2017/0051732 A1 | 2/2017 | Hernandez et al. |
| 2017/0104389 A1 | 4/2017 | Morris et al. |
| 2017/0154387 A1 | 6/2017 | Somers |
| 2017/0159425 A1 | 6/2017 | Wood et al. |
| 2017/0222409 A1 | 8/2017 | Oehring et al. |
| 2017/0285062 A1 | 10/2017 | Kim |
| 2017/0292789 A1 | 10/2017 | Hjorth et al. |
| 2017/0302135 A1 | 10/2017 | Cory |
| 2017/0305284 A1 | 10/2017 | Koh et al. |
| 2018/0059754 A1 | 3/2018 | Shaikh et al. |
| 2018/0080376 A1 | 3/2018 | Austin et al. |
| 2018/0080377 A1 | 3/2018 | Austin et al. |
| 2018/0145511 A1 | 5/2018 | Biellmann |
| 2018/0156210 A1 | 6/2018 | Oehring et al. |
| 2018/0159403 A1 | 6/2018 | Yokoyama et al. |
| 2018/0328157 A1 | 11/2018 | Bishop |
| 2019/0010793 A1 | 1/2019 | Hinderliter |
| 2019/0100989 A1 | 4/2019 | Stewart et al. |
| 2019/0128265 A1 | 5/2019 | Washio et al. |
| 2019/0136840 A1 | 5/2019 | Kumar et al. |
| 2019/0157982 A1 | 5/2019 | Brueckner et al. |
| 2019/0169971 A1* | 6/2019 | Oehring ............... H02P 5/74 |
| 2019/0195292 A1 | 6/2019 | Pan et al. |
| 2019/0229643 A1 | 7/2019 | Bax et al. |
| 2019/0319459 A1 | 10/2019 | Brathwaite et al. |
| 2019/0331080 A1 | 10/2019 | Tunzini et al. |
| 2020/0040705 A1 | 2/2020 | Morris et al. |
| 2020/0040878 A1 | 2/2020 | Morris |
| 2020/0049136 A1 | 2/2020 | Stephenson |
| 2020/0109616 A1 | 4/2020 | Oehring et al. |
| 2020/0109617 A1 | 4/2020 | Oehring et al. |
| 2020/0325760 A1 | 10/2020 | Markham |
| 2020/0332784 A1 | 10/2020 | Zhang et al. |
| 2021/0040830 A1 | 2/2021 | Mu et al. |
| 2021/0040836 A1 | 2/2021 | Baskin |
| 2021/0095552 A1* | 4/2021 | Oehring ............... F04D 13/06 |
| 2021/0095648 A1 | 4/2021 | Buckley et al. |
| 2021/0102451 A1* | 4/2021 | Robinson ............... E21B 43/17 |
| 2021/0102530 A1 | 4/2021 | Pruitt et al. |
| 2021/0107616 A1 | 4/2021 | Pedersen |
| 2021/0108489 A1 | 4/2021 | Shampine |
| 2021/0199161 A1 | 7/2021 | Eto et al. |
| 2021/0301630 A1 | 9/2021 | Krippner et al. |
| 2021/0310341 A1* | 10/2021 | Sherman ............... F04B 47/00 |
| 2021/0396120 A1 | 12/2021 | Rother et al. |
| 2022/0004179 A1 | 1/2022 | Badkoubeh |
| 2022/0018232 A1* | 1/2022 | Oehring ............... H01F 38/14 |
| 2022/0112892 A1 | 4/2022 | Cui et al. |
| 2022/0213777 A1* | 7/2022 | Cui ............... F04D 29/605 |
| 2022/0298906 A1* | 9/2022 | Zhong ............... E21B 43/2607 |
| 2022/0333471 A1 | 10/2022 | Zhong et al. |
| 2022/0364448 A1* | 11/2022 | Oehring ............... F02B 63/06 |

FOREIGN PATENT DOCUMENTS

| | | |
|---|---|---|
| CN | 100999188 A | 7/2007 |
| CN | 101636901 A | 1/2010 |
| CN | 101639040 A | 2/2010 |
| CN | 201461291 U | 5/2010 |
| CN | 101728860 A | 6/2010 |
| CN | 201549965 U | 8/2010 |
| CN | 201570910 U | 9/2010 |
| CN | 102574475 A | 7/2012 |
| CN | 102602322 A | 7/2012 |
| CN | 102704895 A | 10/2012 |
| CN | 202544830 U | 11/2012 |
| CN | 102810909 A | 12/2012 |
| CN | 202645914 U | 1/2013 |
| CN | 103089226 A | 5/2013 |
| CN | 103310963 A | 9/2013 |
| CN | 103456141 A | 12/2013 |
| CN | 103913193 A | 7/2014 |
| CN | 104033247 A | 9/2014 |
| CN | 104578389 A | 4/2015 |
| CN | 204386465 U | 6/2015 |
| CN | 105337397 A | 2/2016 |
| CN | 105352588 A | 2/2016 |
| CN | 105763337 A | 7/2016 |
| CN | 205479153 U | 8/2016 |
| CN | 106143468 A | 11/2016 |
| CN | 106711990 A | 5/2017 |
| CN | 107231000 A | 10/2017 |
| CN | 107237617 A | 10/2017 |
| CN | 107240915 A | 10/2017 |
| CN | 107345857 A | 11/2017 |
| CN | 107816341 A | 3/2018 |
| CN | 207652040 U | 7/2018 |
| CN | 108360818 A | 8/2018 |
| CN | 108443099 A | 8/2018 |
| CN | 207829871 U | 9/2018 |
| CN | 108900136 A | 11/2018 |
| CN | 208281489 U | 12/2018 |
| CN | 208337176 U | 1/2019 |
| CN | 109296733 A | 2/2019 |
| CN | 109578459 A | 4/2019 |
| CN | 109765484 A | 5/2019 |
| CN | 109882144 A | 6/2019 |
| CN | 209041375 U | 6/2019 |
| CN | 110107490 A | 8/2019 |
| CN | 110118127 A | 8/2019 |
| CN | 110155193 A | 8/2019 |
| CN | 209469732 U | 10/2019 |
| CN | 110454285 A | 11/2019 |
| CN | 110821464 A | 2/2020 |
| CN | 110932362 A | 3/2020 |
| CN | 210183018 U | 3/2020 |
| CN | 111156266 A | 5/2020 |
| CN | 111181159 A | 5/2020 |
| CN | 210745048 U | 6/2020 |

(56) References Cited

FOREIGN PATENT DOCUMENTS

| | | |
|---|---|---|
| CN | 210780534 U | 6/2020 |
| CN | 109578459 B | 7/2020 |
| CN | 111502974 A | 8/2020 |
| CN | 111525736 A | 8/2020 |
| CN | 111628519 A | 9/2020 |
| CN | 211530941 U | 9/2020 |
| CN | 111769551 A | 10/2020 |
| CN | 111799903 A | 10/2020 |
| CN | 211819660 U | 10/2020 |
| CN | 112311297 A | 2/2021 |
| CN | 112383190 A | 2/2021 |
| CN | 112467899 A | 3/2021 |
| CN | 212649313 U | 3/2021 |
| CN | 212671744 U | 3/2021 |
| CN | 213027453 U | 4/2021 |
| CN | 112983381 A | 6/2021 |
| CN | 112983382 A | 6/2021 |
| CN | 112993965 A | 6/2021 |
| CN | 113006757 A | 6/2021 |
| CN | 113417737 A | 9/2021 |
| CN | 214227909 U | 9/2021 |
| CN | 214741267 U | 11/2021 |
| CN | 214786070 U | 11/2021 |
| CN | 215292784 U | 12/2021 |
| CN | 215621353 U | 1/2022 |
| DE | 102013208455 A1 | 11/2014 |
| EP | 2290776 A1 | 3/2011 |
| JP | 4096267 B2 | 6/2008 |
| KR | 20110045161 A | 5/2011 |
| KR | 20210087308 A | 7/2021 |
| WO | 2015/030757 A1 | 3/2015 |

OTHER PUBLICATIONS

"Kilowatts to horsepower conversion," RapidTables, retrieved from: https://www.rapidtables.com/convert/power/kw-to-hp.html—Kilowatts to horsepower (hp) conversion calculator, retrieved on May 6, 2020.

Quintuplex—PowerZone, retrieved from: https://www.powerzone.com/resources/glossary/quintuplex#:-:text=A%20reciprocating%20pump%20design%20which,pump%20used%20across%20many%20industries.&text=Dual%20action%20quintuplex%20pumps%20can,rare%20and%20usually%20custom%20manufactured, retrieved on Aug. 18, 2020.

Final Office Action for U.S. Appl. No. 16/833,496 dated Aug. 28, 2020.

Non-Final Office Action for U.S. Appl. No. 16/833,496 dated May 12, 2020.

Non-Final Office Action for U.S. Appl. No. 16/832,872 dated Jun. 11, 2020.

Final Office Action for U.S. Appl. No. 16/832,872 dated Oct. 9, 2020.

Written Opinion of the International Search Authority and International Search Report for PCT Application No. PCT/CN2019/114304 dated Jul. 29, 2020.

International Preliminary Report on Patentability Chapter I for PCT Application No. PCT/CN2019/114304 dated May 12, 2022.

International Search Report dated Sep. 2, 2021, for International Application No. PCT/CN2020/135860, 4 pages.

Non-Final Office Action for U.S. Appl. No. 17/170,141 dated Feb. 8, 2021.

Final Office Action for U.S. Appl. No. 17/170,141 dated Aug. 5, 2022.

Written Opinion and International Search Report for PCT Application No. PCT/CN2021/113988 dated Apr. 28, 2022.

Written Opinion and International Search Report for PCT Application No. PCT/CN2021/139240 dated Mar. 16, 2022.

Written Opinion and International Search Report for PCT Application No. PCT/CN2021/132090 dated Jul. 7, 2022.

Written Opinion of the International Searching Authority and International Search Report for PCT Application No. PCT/CN2019/102811 dated Mar. 19, 2020.

International Preliminary Report on Patentability Chapter 1 for PCT Application No. PCT/CN2019/102811 dated Dec. 23, 2021.

Non-Final Office Action for U.S. Appl. No. 16/834,446 dated Jun. 5, 2020.

Non-Final Office Action for U.S. Appl. No. 16/834,446 dated Jan. 6, 2021.

Non-Final Office Action for U.S. Appl. No. 17/242,316 dated May 26, 2022.

Search Report for Chinese Application No. 202110455679.3 dated May 28, 2022.

Written Opinion and International Search Report for PCT Application No. PCT/CN2022/076452 dated Jun. 1, 2022.

Non-Final Office Action for U.S. Appl. No. 17/728,667 dated Sep. 16, 2022.

Non-Final Office Action for U.S. Appl. No. 17/733,922 dated Sep. 21, 2022.

Non-Final Office Action for U.S. Appl. No. 17/747,916 dated Aug. 18, 2022.

Non-Final Office Action for U.S. Appl. No. 17/155,966 dated Jul. 28, 2022.

International Search Report dated Aug. 13, 2021, for International Application No. PCT/CN2020/137300, 5 pages.

International Search Report dated Aug. 23, 2021, for International Application No. PCT/CN2020/137135, 4 pages.

Written Opinion and International Search Report for PCT Application No. PCT/CN2022/076321 dated Nov. 16, 2022.

Final Office Action for U.S. Appl. No. 17/747,916 dated Nov. 10, 2022.

Final Office Action for U.S. Appl. No. 17/733,922 dated Dec. 28, 2022.

First Search for Chinese Application No. 202280000733.8 dated Mar. 14, 2023.

Non-Final Office Action for U.S. Appl. No. 17/167,391 dated Feb. 17, 2023.

\* cited by examiner

FRACTURING APPARATUS AND CONTROL METHOD THEREOF, FRACTURING SYSTEM

CROSS REFERENCE TO RELATED APPLICATIONS

The present application is a continuation-in-part of U.S. application Ser. No. 17/242,316, filed Apr. 28, 2021, which is a continuation of U.S. application Ser. No. 16/834,446, filed Mar. 30, 2020. U.S. application Ser. No. 16/834,446 claims priority to Chinese patent application no. 201910510411.8, filed Jun. 13, 2019. The present application is also a continuation-in-part of U.S. application Ser. No. 17/733,922, filed Apr. 29, 2022, which is a continuation-in-part application of International Application No. PCT/CN2021/139240 filed on Dec. 17, 2021, International Application No. PCT/CN2019/114304 filed on Oct. 30, 2019, and International Application No. PCT/CN2020/135860 filed on Dec. 11, 2020. The International Application No. PCT/CN2021/139240 claims priority to Chinese patent application No. 202110426356.1 filed on Apr. 20, 2021. The U.S. application Ser. No. 17/733,922 claims priority to Chinese patent application No. 202111198446.6 filed on Oct. 14, 2021. The entire contents of all of the above-identified applications are incorporated herein by reference in their entirety.

TECHNICAL FIELD

Embodiments of the present disclosure relate to fracturing apparatuses, control methods of the fracturing apparatuses, and fracturing systems.

BACKGROUND

In the field of oil and gas exploitation, fracturing technology is a method to make oil and gas reservoirs crack by using high-pressure fracturing liquid. Fracturing is the core technology for oilfield stimulation in conventional reservoirs and oilfield exploitation in unconventional reservoirs such as shale gas, shale oil and coal-bed methane. Fracturing technology may improve the flowing environment of oil and gas underground by causing cracks in oil and gas reservoirs, which may increase the output of oil wells. Therefore, it is widely used in conventional and unconventional oil and gas exploitation, offshore and onshore oil, and gas resources development.

Nowadays, the production of shale gas mostly adopts factory fracturing mode and zipper-type multi-well uninterrupted fracturing mode, which requires fracturing equipment to be capable of continuous operation for a long time. Currently, each fracturing equipment is driven by a diesel engine which needs to be equipped with a gearbox and a transmission shaft. The equipment is large in size and the operation noise is very loud when the engine and gearbox work. Some other fracturing equipment is driven by an electric motor, and when the motor is running, the electromagnetic, cooling, and exhaust devices are very noisy. As the fracturing equipment generates loud noise during operation, resulting in noise pollution, normal rest of residents around the well site will be affected, thus the fracturing equipment cannot meet the requirements of 24-hour continuous operation, especially normal operation at night.

Further, in a configuration mode of a power transmission system used in conventional fracturing equipment on fracturing sites in oil and gas fields all over the world, a diesel engine is connected to a transmission to drive a fracturing plunger pump through a transmission shaft to work. This configuration mode has the following disadvantages: (1) Large volume and heavy weight: When the diesel engine drives the transmission to drive the fracturing plunger pump through the transmission shaft, a large volume is occupied, a heavy weight is involved, the transportation is restricted, and the power density is low. (2) Environmental problems: During operations on a well site, the fracturing equipment driven by the diesel engine would generate engine waste gas pollution and noise pollution. The noise exceeding 105 dBA will severely affect the normal life of nearby residents. (3) Cost inefficiency: The fracturing equipment driven by the diesel engine requires relatively high initial purchase costs and incurs high fuel consumption costs for unit power during operation, and the engine and the transmission also require very high routine maintenance costs. Efforts are made globally to manufacture oil-gas exploitation equipment with "low energy consumption, low noise, and low emission". Therefore, the foregoing disadvantages of conventional fracturing equipment that uses the diesel engine as the power source impedes the exploitation progress of unconventional oil and gas sources to some extent.

It may be a good solution to replace conventional diesel engine driven equipment with electric drive equipment. However, high-voltage generators are employed in conventional power supply schemes by generators, i.e., rectifier transformers need to be used to supply power to the rectifying units, while the rectifier transformers are too bulky, expensive, and involve complex wiring. The above features of the rectifier transformers themselves, to some extent, result in the power supply part in the electric drive equipment are bulky, i.e., occupy a large area, expensive, and involve complex wiring, thus greatly limiting the widely use of the electric drive equipment.

SUMMARY

Embodiments of the present disclosure provide fracturing apparatuses, control methods of the fracturing apparatuses, and fracturing systems. In some embodiments, upon the first pressure sensor detecting that the pressure of the hydraulic oil provided by the clutch hydraulic system to the clutch is smaller than a preset pressure value, the fracturing apparatus may control the clutch to disengage, so that the clutch slip phenomenon caused by relatively low liquid pressure may be avoided, deterioration of the fault may be further avoided, and pertinent overhaul and maintenance may be carried out.

At least one embodiment of the present disclosure provides a fracturing apparatus. The fracturing apparatus includes a power supply platform, a gas turbine engine, a generator, and one or more rectifiers. At least two of the gas turbine engine, the generator, and the one or more rectifiers are arranged on the power supply platform. A first end of the generator is connected to the gas turbine engine. A second end of the generator is connected to the one or more rectifiers. The generator is configured to output a voltage to the one or more rectifiers.

In some embodiments, the fracturing apparatus includes a first plunger pump, comprising a first power end and a first hydraulic end; a prime mover comprising a first power output shaft; and a first clutch comprising a first connection portion and a second connection portion. The first power end of the first plunger pump comprises a first power input shaft. The first connection portion is coupled to the first power input shaft. The second connection portion is coupled to the first power output shaft of the prime mover. The prime mover is coupled (e.g., electrically coupled) to the generator via the one or more rectifiers.

At least one embodiment of the present disclosure provides a fracturing apparatus, which includes: a plunger pump, including a power end and a hydraulic end; a prime mover, including a power output shaft; a clutch, including a first connection portion, a second connection portion and a clutch portion between the first connection portion and the second connection portion; and a clutch hydraulic system, configured to provide hydraulic oil to the clutch. The power end of the plunger pump includes a power input shaft, the first connection portion is connected with the power input shaft, the second connection portion is connected with the power output shaft of the prime mover, and the fracturing apparatus further includes a first pressure sensor configured to detect a hydraulic pressure of the clutch hydraulic system.

For example, in the fracturing apparatus provided by an embodiment of the present disclosure, the fracturing apparatus further includes: a second pressure sensor, the hydraulic end of the plunger pump includes a liquid output end, and the second pressure sensor is configured to detect a pressure of liquid output by the liquid output end.

For example, the fracturing apparatus provided by an embodiment of the present disclosure further includes: a discharge manifold, connected with the liquid output end, the second pressure sensor is arranged on the liquid output end or the discharge manifold.

For example, in the fracturing apparatus provided by an embodiment of the present disclosure, the fracturing apparatus includes two plunger pumps, one prime mover, two clutches, two clutch hydraulic systems and two first pressure sensors, the two first pressure sensors are arranged in one-to-one correspondence with the two clutch hydraulic systems, and the first pressure sensor is configured to detect a hydraulic pressure of a corresponding one of the two clutch hydraulic systems.

For example, the fracturing apparatus provided by an embodiment of the present disclosure further includes: a first temperature sensor, configured to detect a temperature of the clutch.

For example, the fracturing apparatus provided by an embodiment of the present disclosure further includes: a second temperature sensor, configured to detect a temperature of hydraulic oil in the clutch hydraulic system.

For example, the fracturing apparatus provided by an embodiment of the present disclosure further includes: a first vibration sensor, configured to detect vibration of the plunger pump, the fracturing apparatus further includes a plunger pump base, the plunger pump is arranged on the plunger pump base, and the first vibration sensor is arranged on the plunger pump or the plunger pump base.

For example, the fracturing apparatus provided by an embodiment of the present disclosure further includes: a second vibration sensor, configured to detect vibration of the prime mover, the fracturing apparatus further includes a prime mover base, the prime mover is arranged on the prime mover base, and the second vibration sensor is arranged on the prime mover or the prime mover base.

For example, the fracturing apparatus provided by an embodiment of the present disclosure further includes: a first rotation speed sensor, configured to detect an actual rotation speed of the power input shaft of the plunger pump; and a second rotation speed sensor, configured to detect an actual rotation speed of the power output shaft of the prime mover.

For example, the fracturing apparatus provided by an embodiment of the present disclosure further includes: a planetary gearbox, including an input gear shaft, the first connection portion of the clutch is directly connected with the input gear shaft, and the power input shaft is directly connected with the planetary gearbox.

For example, in the fracturing apparatus provided by an embodiment of the present disclosure, the prime mover includes one of a diesel engine, an electric motor and a turbine engine.

At least one embodiment of the present disclosure further provides a control method of a fracturing apparatus, the fracturing apparatus including the abovementioned fracturing apparatus, the control method including: detecting the hydraulic pressure of the clutch hydraulic system; and controlling the clutch to disengage if the hydraulic pressure of the clutch hydraulic system as detected is smaller than a first preset pressure value.

For example, the control method of the fracturing apparatus provided by an embodiment of the present disclosure further includes detecting a pressure of liquid output by the plunger pump; and controlling the clutch to disengage if the pressure of the liquid output by the plunger pump as detected is higher than a second preset pressure value.

For example, the control method of the fracturing apparatus provided by an embodiment of the present disclosure further includes detecting a temperature of the clutch; and controlling the clutch to disengage if the temperature of the clutch as detected is higher than a first preset temperature value.

For example, the control method of the fracturing apparatus provided by an embodiment of the present disclosure further includes detecting a temperature of hydraulic oil in the clutch hydraulic system; and controlling the clutch to disengage if the temperature of the hydraulic oil in the clutch hydraulic system as detected is higher than a second preset temperature value.

For example, the control method of the fracturing apparatus provided by an embodiment of the present disclosure further includes detecting a vibration of the plunger pump; and controlling the clutch to disengage if the vibration of the plunger pump as detected is higher than a first preset vibration value.

For example, the control method of the fracturing apparatus provided by an embodiment of the present disclosure further includes detecting a vibration of the prime mover; and controlling the clutch to disengage if the vibration of the prime mover as detected is higher than a second preset vibration value.

For example, the control method of the fracturing apparatus provided by an embodiment of the present disclosure further includes: detecting a first actual rotation speed of the power input shaft of the plunger pump; detecting a second actual rotation speed of the power output shaft of the prime mover; and calculating a ratio of the first actual rotation speed and the second actual rotation speed, and controlling the clutch to disengage if the ratio is smaller than a first preset ratio or greater than a second preset ratio.

At least one embodiment of the present disclosure further provides a fracturing system, which includes any one of the abovementioned fracturing apparatus, a control system configured to control the clutch in the fracturing apparatus; and a remote control unit communicated with the control system.

In some embodiments, a single-motor single-pump electric drive fracturing semi-trailer is provided, which merge a traditional power supply semi-trailer and a fracturing semi-trailer together to realize the function of a semi-trailer for supplying power and fracturing simultaneously, without the need of using a power supply semi-trailer and a fracturing semi-trailer as a complete set, making it more flexible in practical uses, greatly optimizing the wellsite arrangement in oil and gas fields and facilitating the transportation. One set of high voltage cable is needed to connect to a high voltage power supply to reach working state. The wiring installation is faster. Compared with diesel-driven fracturing, electric drive fracturing generates less noise and no pollutive emission. Electricity is cheaper to use than diesel. A five cylinder plunger pump of 5000 hp or above, such as 7000 hp, is employed to greatly enhance the output power of the single-motor single-pump electric drive fracturing semi-trailer. While single-semi-trailer has a high output power, the wellsite power density per unit area is also greatly enhanced. The power end housing of the five cylinder plunger pump adopts an integral welding structure, so that the power end assembly has a higher structural strength and a better support stability to reduce vibration of the whole pump. The cylinder spacing of the five cylinder plunger pump is 13-14 inches, ensuring the high-power output of the five cylinder plunger pump. The high-power five cylinder plunger pump may effectively address the problem of placing many fracturing apparatuses in a shale gas fracturing wellsite with limited space, thus reducing the use of equipment and facilitating efficient arrangement of equipment at the wellsite. Further, the multi-point support design of the crankcase, the crosshead case, and the hydraulic end assembly may enhance the support strength of the five cylinder plunger pump and reduce the vibration, thus better ensuring high load and smoother operation.

In various embodiments, a single-motor single-pump electric drive fracturing semi-trailer, including a semi-trailer body, a plunger pump, a radiator, a power supply unit, and an electric motor, wherein the power supply unit, the electric motor, the radiator, and the plunger pump are installed on the semi-trailer body. There are one electric motor, one radiator, and one plunger pump. The power supply unit provides power for the electric motor, the electric motor is connected to the plunger pump, the radiator cools lubricating oil of the plunger pump.

For example, the power supply unit includes a voltage conversion unit and a frequency conversion unit. The frequency conversion unit is connected to the voltage conversion unit, the voltage conversion unit is disposed at one end of semi-trailer body near the electric motor, and the frequency conversion unit is disposed on a gooseneck of the semi-trailer body.

For example, the voltage conversion unit has a cabin structure with multiple compartments, in which a switch and a transformer are arranged, and the switch is connected to the transformer.

For example, the frequency conversion unit has a cabin structure with multiple compartments, in which a frequency converter is arranged. An input end of the frequency converter is connected to the voltage conversion unit, and an output end of the frequency converter is connected to the electric motor.

For example, the plunger pump is a five cylinder plunger pump which includes a power end assembly, a hydraulic end assembly and a reduction gearbox assembly. One end of the power end assembly is connected to the hydraulic end assembly, and the other end of the power end assembly is connected to the reduction gearbox assembly. The power end assembly includes a crankcase, a crosshead case, and a spacer frame which are connected in sequence.

For example, the stroke of the five cylinder plunger pump is 10" (inches) or above.

For example, the power of the five cylinder plunger pump is 5000 hp or above.

For example, the power of the five cylinder plunger pump is 7000 hp.

For example, the cylinder spacing of the five cylinder plunger pump is 13-14 inches.

For example, the crankcase and the crosshead case are welded to constitute a power end housing which is connected to the spacer frame, the power end housing includes six vertical plates, six bearing seats, a front end plate, a back cover plate, a base plate, a support plate and an upper cover plate; each vertical plate is connected to a corresponding bearing seat, and the six vertical plates are arranged in parallel to constitute a power end chamber; the base plate is mounted at the bottom of the power end chamber, and the upper cover plate is mounted on the top of the power end chamber, the front end plate is mounted at the front end of the power end chamber, the back cover plate is mounted at the back end of the power end chamber, and the support plate is disposed between two adjacent vertical plates arranged in parallel.

For example, a crankshaft support is disposed at the bottom of the crankcase, and the crankshaft support is used to support the crankcase.

For example, a crosshead support is disposed at the bottom of the crosshead case, and the crosshead support is used to support the crosshead case.

For example, a hydraulic support is disposed at the bottom of the spacer frame, and the hydraulic support is used to support the hydraulic end assembly.

In various embodiments, a fracturing apparatus comprises: a plunger pump for pressurizing liquid; a main motor connected to the plunger pump by transmission and configured to provide driving force to the plunger pump; and a noise reduction device configured as a cabin structure, wherein the noise reduction device covers outside the main motor and isolates the main motor from the plunger pump.

According to the present disclosure, the fracturing apparatus is driven by the main motor. Hence the noise during operation is low. The main motor is isolated from outside by the noise reduction device, which may effectively reduce the noise intensity transmitted to the outside during operation, thereby achieving the effect of noise reduction. In addition, the plunger pump is isolated from the main motor, thus realizing isolation of high-pressure dangerous areas, and ensuring safe operation.

In one embodiment, the fracturing apparatus further comprises: an oil tank containing lubricating oil; and a lubrication driving device for driving lubricating oil from the oil tank to the plunger pump to lubricate the plunger pump; wherein, the lubrication driving device includes a lubrication pump and a lubrication motor, the lubrication pump and/or the lubrication motor being arranged inside the noise reduction device.

According to the present disclosure, the noise generated during operation of the lubrication pump and the lubrication motor may be reduced while lubricating the plunger pump.

In one embodiment, the fracturing apparatus comprises: a cooler having a fan and configured to dissipate heat from the lubricating oil by means of air blast cooling; and a cooler motor connected to the cooler by transmission and configured to provide a driving force to the cooler; wherein the cooler and the cooler motor are arranged inside the noise reduction device.

According to the present disclosure, the noise generated during the operation of the cooler motor may be reduced while cooling the lubricating oil.

In one embodiment, the cooler is arranged above the main motor, and the top of the noise reduction device is provided with a cooler window at a position corresponding to the cooler.

According to the present disclosure, the cooler window may enhance the heat exchange between the cooler and the outside, thus enhancing the heat dissipation capability.

In one embodiment, the cooler is configured as a cuboid and comprises at least two fans arranged along a length direction.

According to the present disclosure, the cooler is adapted to be integrally arranged inside the noise reduction device, and the heat dissipation capability may be correspondingly enhanced as the number of fans increases.

In one embodiment, the main motor comprises a cooling fan configured to cool the main motor by means of air suction cooling.

According to the present disclosure, air suction cooling may effectively reduce noise when cooling the main motor.

In one embodiment, the fracturing apparatus further comprises a primary exhaust silencer which is arranged inside the noise reduction device and is connected with an exhaust port of the cooling fan.

According to the present disclosure, the primary exhaust silencer may reduce the noise generated by the cooling fan during exhausting.

In one embodiment, the exhaust port of the cooling fan is connected to the primary exhaust silencer via a soft connection.

According to the present disclosure, the soft connection has lower requirement on alignment precision, so that the connection is more convenient and installation and subsequent maintenance is easy. Furthermore, the soft connection may compensate the displacement caused by vibration during operation, and achieve noise reduction and shock absorption meanwhile.

In one embodiment, a flow area of an airflow passage in the soft connection gradually increases along an air flow direction.

According to the present disclosure, the exhaust may be smoother.

In one embodiment, the fracturing apparatus further comprises a secondary exhaust silencer which is provided on the noise reduction device and corresponds to an exhaust port of the primary exhaust silencer.

According to the present disclosure, the secondary exhaust silencer may further reduce the noise generated by the primary exhaust silencer during exhausting.

In one embodiment, at least one side of the noise reduction device is provided with at least one air inlet where an air inlet silencer is provided.

According to the present disclosure, the air inlet may meet the demand of air intake, and the air inlet silencer may reduce noise generated during air intake process. In addition, the air inlet silencer is integrally installed with the noise reduction device, so that the overall structure may be compact.

In one embodiment, an outer surface of the main motor is wrapped with a noise reduction material.

According to the present disclosure, the noise generated by the main motor during operation may be further reduced.

In one embodiment, a wall of the noise reduction device is constructed as a sandwich structure filled with a noise reduction material.

According to the present disclosure, the noise reduction effect of the noise reduction device may be enhanced.

In some embodiments, a fracturing apparatus driven by a variable frequency speed control integrated machine includes an integrated frequency-converting speed-varying machine, which includes a drive device for providing driving force and an inverter integrally mounted on the drive device, and a plunger pump. The inverter supplies power to the drive device; the plunger pump and the integrated variable frequency speed regulation machine are integrally installed, and the plunger pump is mechanically connected to and driven by the drive device of the integrated variable frequency speed regulation machine.

In some embodiments, the fracturing apparatus further includes a rectifier arranged inside or outside the integrated frequency-converting speed-varying machine, and supplies power to the inverter.

In some embodiments, inverters are provided in plural and the drive devices are provided in plural, the input terminals of each of the inverters are connected to the rectifier, and the output terminals of each of the inverters are respectively connected to the corresponding one of the drives.

In some embodiments, the inverter has a housing, the drive device has a housing, the two housings are fixedly connected directly or via a mounting flange, a plurality of holes are arranged in the connecting surfaces of the two housings or multiple binding posts. The output terminal of the inverter is connected to the inside of the drive device through the plurality of holes or the plurality of connecting posts, and the transmission output shaft of the drive device is connected from the housing of the drive device with a different side of the face sticks out.

In some embodiments, the drive output shaft of the drive is directly mechanically connected to the power input shaft of the plunger pump, or the transmission output shaft of the drive device is connected to the power input shaft of the plunger pump via a gearbox and/or a coupling.

In some embodiments, in the case of the direct mechanical connection, the transmission output shaft of the drive device has internal splines or external splines or flat or conical keys, and the power input shaft of the plunger pump has an adaptor of external or internal splines or flat or tapered keys.

In some embodiments, in the case of the direct mechanical connection, the transmission output shaft of the drive has a housing and the power input shaft of the plunger pump has a housing, the housings of which are directly fixedly connected on the connection side or the connection is fixed by means of a mounting flange.

In some embodiments, the fracturing apparatus further includes a lubricating system comprising a lubricating oil tank for storing and supplying lubricating oil; and a lubricating motor and lubricating pump set connected to the lubricating oil tank and for circulating the lubricating oil. The direction along the power input shaft of the plunger pump is defined as the longitudinal direction, and the horizontal direction perpendicular to the longitudinal direction is defined as the width direction, which is perpendicular to both the longitudinal direction and the width direction. The direction is defined as the height direction, and the lubrication system is provided at one side of the frequency conversion and speed control integrated machine in the width direction.

In some embodiments, the fracturing apparatus further includes a lubricating oil cooling system, which is arranged at the top of the plunger pump in the height direction or at one side of the frequency conversion and speed control integrated machine in the width direction. The lubricating oil cooling system includes a lubricating oil radiator, a cooling motor and a cooling fan driven by the cooling motor, and the cooling fan exchanges heat between the air and the lubricating oil entering the lubricating oil radiator.

In some embodiments, the lubricating oil radiator is a horizontal radiator, a vertical radiator, or a square radiator.

In some embodiments, in the case of the direct mechanical connection, the lubrication system includes a lubrication motor and a lubrication pump set that provide lubrication to the power end of the plunger pump, or in the case of the connection via a gearbox and/or a coupling, the lubrication system includes a first lubricating motor and a lubricating pump group for providing lubrication to the power end of the plunger pump, and a lubrication system for the gearbox and/or the second lubricating motor and lubricating pump group where the coupling provides lubrication.

In some embodiments, the fracturing apparatus further includes an integrated machine heat dissipation system, which is at least partially disposed at one side in the width direction and/or at the top in the height direction of the variable frequency speed regulation integrated machine.

In some embodiments, the drive device includes a motor and a housing for accommodating the motor, the inverter is integrally mounted on a top surface of the housing of the drive device, and the all-in-one machine cooling system includes a drive device cooling system, at least a part of which is arranged on the top surface of the casing of the drive device; and/or an inverter cooling system, which is arranged on the top of the inverter on the surface. The drive device cooling system includes an air cooling device, a cooling liquid cooling device, or a combination of the two. The heat dissipation system of the inverter includes a cooling liquid cooling device.

In some embodiments, the cooling liquid cooling device includes a horizontal radiator, a vertical radiator, or a square radiator.

In some embodiments, the cooling liquid cooling device includes a cooling plate provided on the top surface of the housing of the drive device and/or on the top surface of the inverter, and is connected with the housing and the drive device and/or direct contact with the inverter; a cooling liquid storage chamber for storing the cooling liquid and supplying the cooling liquid into the cooling plate; and a fan assembly for cooling the cooling liquid in the cooling liquid storage chamber to cool down. The cooling plate includes a cooling channel for flowing a cooling liquid. The cooling channel includes at least one cooling tube and a cooling channel inlet and a cooling channel outlet in communication with the cooling tube, the cooling channel inlet, and the cooling channel. The cooling passage outlet communicates with the output port and the input port of the cooling liquid storage chamber, respectively. At least one cooling pipe shares the cooling channel inlet and the cooling channel outlet.

In some embodiments, the air-cooling device includes an air outlet assembly communicating with a cavity defined by the housing of the drive device, and an air inlet assembly, which includes an air outlet assembly disposed on a side of the outer casing that is different from the air outlet assembly side. The gas entering the cavity from the air inlet is discharged through the air outlet assembly.

In some embodiments, the air outlet assembly includes: a cooling fan, arranged on the casing of the drive device; a fan volute, disposed between the cooling fan and the housing; and an exhaust duct. The first side of the fan volute is communicated with the cooling fan, the second side of the fan volute is communicated with the cavity, and the third side of the fan volute is communicated with the exhaust duct. The gas sucked into the fan volute in the cavity is discharged through the exhaust duct. The exhaust duct includes an air outlet, the air outlet faces a direction away from the casing.

In some embodiments, the air inlet assembly is provided with a protective net for covering the air inlet.

In some embodiments, there are at least two air outlet assemblies, and the air outlet directions of the at least two air outlet assemblies are the same or different from each other. There are at least two air inlet assemblies, and the at least two air inlet assemblies are arranged at different positions on the bottom surface of the housing.

In some embodiments, the fracturing apparatus further includes: a control cabinet, through which the power from the power supply system is input to the fracturing apparatus, and the control cabinet is arranged at the side opposite to the plunger pump side of the integrated variable frequency speed regulation machine, or is arranged at any, the side of the plunger pump opposite to the side of the variable frequency speed control integrated machine; a low-pressure manifold through which fracturing fluid is supplied to the hydraulic end of the plunger pump, the low-pressure manifold is provided on one side of the plunger pump in the width direction where; and a high pressure manifold, the fracturing fluid is pressurized by the movement of the plunger pump and then discharged from the output end of the hydraulic end of the plunger pump to the plunger pump through the high pressure manifold outside, the high-pressure manifold is provided at an end of the plunger pump in the lengthwise direction.

In some embodiments, an auxiliary transformer is provided in the control cabinet, and the auxiliary transformer supplies the electric power from the power supply system to the fracturing apparatus after voltage adjustment.

In some embodiments, the fracturing apparatus further includes a carrier frame at the bottom of the fracturing apparatus to integrally mount the entire fracturing apparatus. The carrier is in the form of a skid frame, a semi-trailer, or a chassis.

In some embodiments, on the carrier, at least one set of arrangements for driving a single said plunger pump by a single said drive means is integrated, or on the carrier, an arrangement is integrated in which a plurality of the plunger pumps are driven by a single drive device.

In some embodiments, fracturing apparatus is powered by a power supply system, the power supply system being: a power grid, a power generation facility, an energy storage device, or any combination thereof.

In some embodiments, a well site layout includes a plurality of fracturing apparatuses and a control room. A centralized control system is provided in the control room for centralized control of each of the plurality of fracturing apparatuses. From the power supply system is collectively supplied to each of the plurality of fracturing apparatuses through the control room.

In some embodiments, the high pressure manifold is shared by a plurality of the fracturing apparatuses and mounted on a manifold skid.

BRIEF DESCRIPTION OF THE DRAWINGS

In order to more clearly illustrate the technical solutions of the embodiments of the disclosure, the drawings of the embodiments will be briefly described in the following; it is obvious that the described drawings below are only related to some embodiments of the disclosure and thus are not limitative to the disclosure.

DETAILED DESCRIPTION

In order to make objectives, technical details and advantages of the embodiments of the present disclosure more clearly, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art may obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "include," "including," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

With the continuous development of fracturing apparatus, the plunger pump in fracturing apparatus is gradually changed from being driven by a diesel engine to being driven by an electric motor or a turbine engine to meet higher environmental protection requirements. In this case, such fracturing apparatus also has the advantages of high power and low construction cost.

Figure 1:
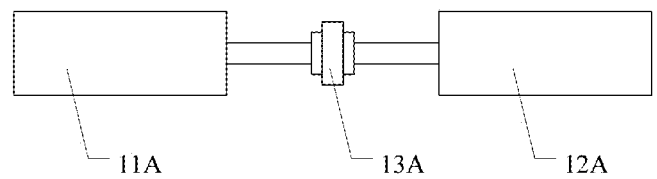
FIG. 1 is a schematic diagram of a fracturing apparatus.

FIG. 1 is a schematic diagram of a fracturing apparatus. As illustrated by FIG. 1, the fracturing apparatus 100 includes a plunger pump 11A and an electric motor 12A. A power output shaft of the electric motor 12A is connected with a power input shaft of the plunger pump 11A through a clutch 13A. Plunger pump is a device that uses the reciprocating motion of a plunger in a cylinder to pressurize liquid. Plunger pump has the advantages of high rated pressure, compact structure, and high efficiency, so it is used in fracturing technology. Because of frequent engagement or disengagement, the clutch 13A has a relatively high damage frequency. On the other hand, in fracturing operation, the plunger pump needs to operate stably and continuously, so the requirements on the stability of clutch is very high. Therefore, if there is a problem in the clutch of the fracturing apparatus during operation, and the problem cannot be judged and treated in time, it will cause great economic losses to the fracturing operation. It should be noted that the fracturing apparatus illustrated in FIG. 1 may adopt a mode of one engine and one pump (that is, one electric motor drives one plunger pump) or a mode of one engine and two pumps (that is, one electric motor drives two plunger pumps).

On the other hand, before or at the end of fracturing apparatus operation, maintenance personnel are required to carry out maintenance evaluation, and maintenance personnel shall check and judge faults according to experience. However, as mentioned above, fracturing apparatus has high requirements on stability, and belongs to construction operation equipment with high power (the rated maximum output power of a single plunger pump is usually higher than 2000 hp) and high pressure (the rated pressure of the plunger pump is usually not smaller than 10000 psi) (the maximum pressure may usually exceed 40 MPa during construction), and maintenance personnel cannot check and repair nearby during operation. Therefore, once the fracturing apparatus has problems during the operation, it will bring risks to the fracturing operation. In addition, a potential failure in the fracturing apparatus, if cannot be detected by maintenance personnel, will bring great potential safety hazards to fracturing operation.

In this regard, embodiments of the present disclosure provide a fracturing apparatus, a control method of the fracturing apparatus, and a fracturing system. The fracturing apparatus includes a plunger pump, a prime mover, a clutch, and a clutch hydraulic system. The plunger pump includes a power end and a liquid end, the prime mover includes a power output shaft, and the clutch includes a first connection portion, a second connection portion and a clutch portion between the first connection portion and the second connection portion. The power end of the plunger pump includes a power input shaft, the first connection portion is connected with the power input shaft, the second connection portion is connected with the power output shaft of the prime mover, and the clutch hydraulic system is configured to provide hydraulic oil to the clutch. The fracturing apparatus further includes a first pressure sensor arranged in the clutch hydraulic system and configured to detect the hydraulic pressure of the clutch hydraulic system. Therefore, upon the first pressure sensor detecting that the pressure of the hydraulic oil provided by the clutch hydraulic system to the clutch is smaller than a preset pressure value, the fracturing apparatus may control the clutch to disengage, so that the clutch slip phenomenon caused by lower liquid pressure may be avoided, further deterioration of the fault may be avoided, and pertinent overhaul and maintenance may be carried out.

Hereinafter, the fracturing apparatus provided by the embodiments of the present disclosure will be described in detail with reference to the accompanying drawings.

Figure 2A:
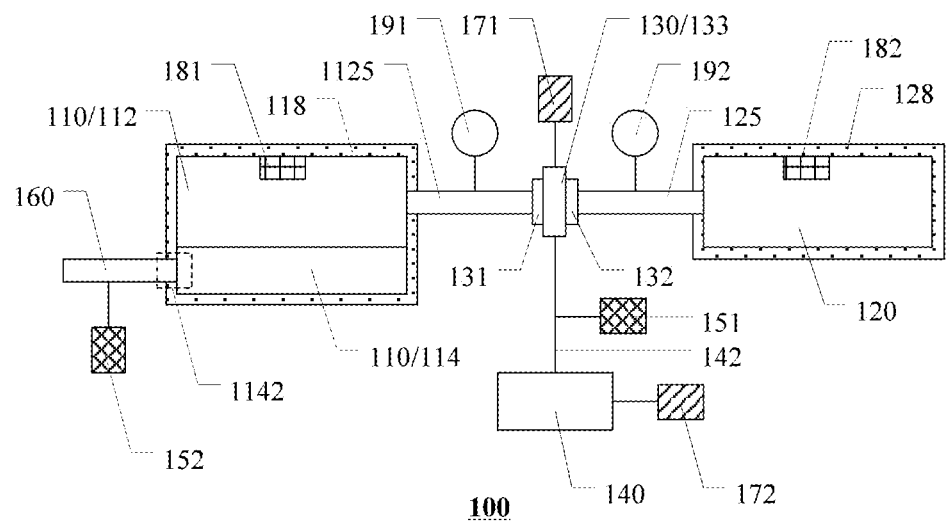
FIG. 2A is a schematic diagram of a fracturing apparatus according to various embodiments of the present disclosure.
Figure 2B:
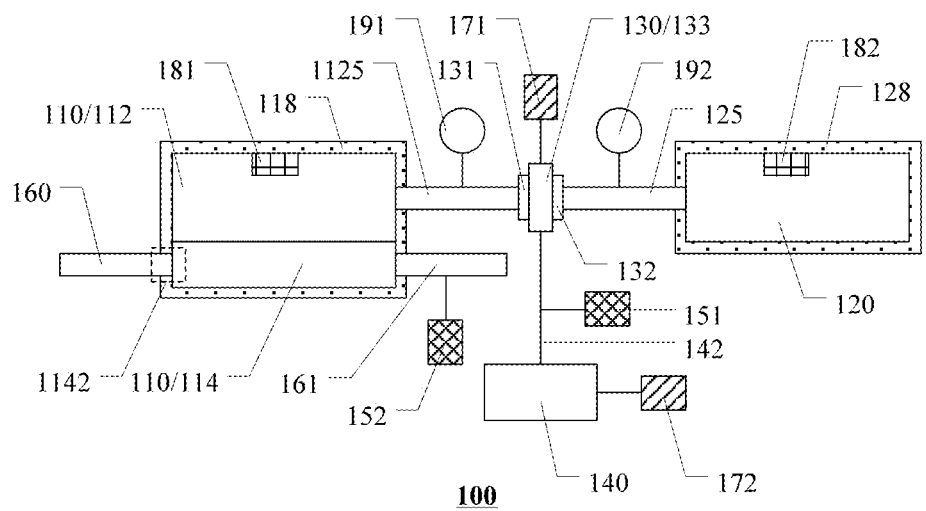
FIG. 2B is a schematic diagram of another fracturing apparatus according to various embodiments of the present disclosure.

An embodiment of the present disclosure provides a fracturing apparatus. FIG. 2A is a schematic diagram of a fracturing apparatus according to an embodiment of the present disclosure; FIG. 2B is a schematic diagram of another fracturing apparatus according to an embodiment of the present disclosure. As illustrated by FIGS. 2A and 2B, the fracturing apparatus 100 includes a plunger pump 110, a prime mover 120, a clutch 130 and a clutch hydraulic system 140. The plunger pump 110 includes a power end 112 and a hydraulic end 114, the prime mover 120 includes a power output shaft 125, and the clutch 130 includes a first connection portion 131, a second connection portion 132, and a clutch portion 133 between the first connection portion 131 and the second connection portion 132. The power end 112 of the plunger pump 110 includes a power input shaft 1125, the first connection portion 131 is connected with the power input shaft 1125, the second connection portion 132 is connected with the power output shaft 125 of the prime mover 120, and the clutch hydraulic system 140 is configured to provide hydraulic oil to the clutch 130. The fracturing apparatus 100 further includes a first pressure sensor 151 configured to detect the hydraulic pressure of the clutch hydraulic system 140, that is, the pressure value of the hydraulic oil provided by the clutch hydraulic system 140 to the clutch 130. It should be noted that various "pressures" or "pressure values" in the present disclosure are pressure values obtained by pressure gauges or pressure sensors. In a fracturing apparatus, the clutch hydraulic system is configured to provide hydraulic oil to the clutch. If the pressure of hydraulic oil does not meet the requirements because of oil leakage and other reasons, the clutch will have a slip phenomenon. In addition, if it is not treated in time, more serious faults may occur, which will bring greater potential safety hazards and greater economic losses to fracturing operations. However, the fracturing apparatus provided by the embodiments of the present disclosure detects the hydraulic value of the hydraulic oil provided to the clutch by the clutch hydraulic system through the first pressure sensor, upon the first pressure sensor detecting that the hydraulic value of the hydraulic oil provided to the clutch by the clutch hydraulic system is smaller than the preset pressure value, the fracturing apparatus may control the clutch to disengage, so that the clutch slip phenomenon caused by lower hydraulic pressure may be avoided, thus further deterioration of the fault may be avoided, and pertinent overhaul and maintenance may be carried out. In addition, the hydraulic pressure of the hydraulic oil provided to the clutch by the clutch hydraulic system detected by the first pressure sensor may be displayed remotely, so that remote operation may be realized, and the operation difficulty and cost may be reduced.

In some examples, the prime mover includes one of a diesel engine, an electric motor, and a turbine engine. Of course, the embodiments of the present disclosure include but are not limited thereto, and the prime mover may also be other machines that provide power.

Figure 3:
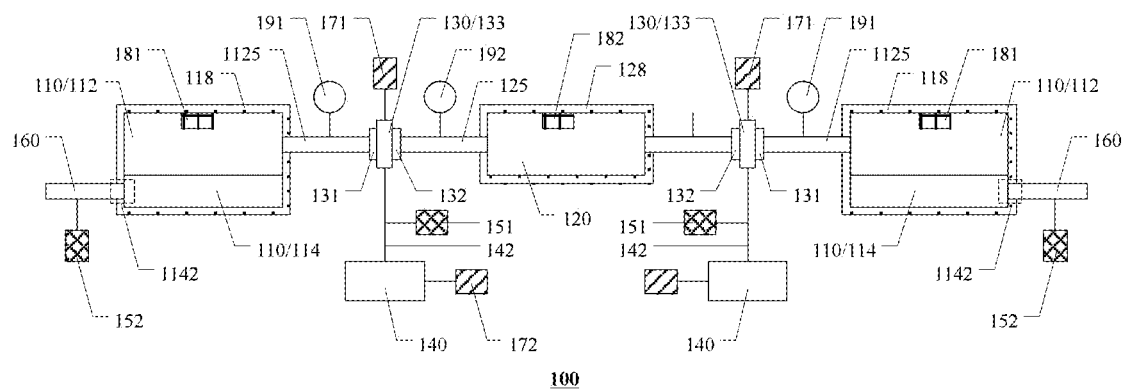
FIG. 3 is a schematic diagram of another fracturing apparatus according to various embodiments of the present disclosure.

FIG. 3 is a schematic diagram of another fracturing apparatus according to an embodiment of the present disclosure. As illustrated by FIG. 3, the fracturing apparatus 100 includes two plunger pumps 110 and one prime mover 120. One prime mover 120 may drive two plunger pumps 110 at the same time. In this case, the fracturing apparatus 100 may include two clutches 130, two clutch hydraulic systems 140, and two first pressure sensors 151. The two first pressure sensors 151 are arranged in one-to-one correspondence with the two clutch hydraulic systems 140, and each first pressure sensor 151 is configured to detect the hydraulic pressure of the corresponding clutch hydraulic system 140. Therefore, upon the first pressure sensor detecting that the hydraulic value of the hydraulic oil provided by any one of the two clutch hydraulic systems is smaller than the preset pressure value, the corresponding clutch may be controlled to disengage, thereby ensuring the normal operation of the other plunger pump.

In some examples, as illustrated by FIG. 2A, the clutch hydraulic system 140 includes an oil supply pipeline 142, the oil supply pipeline 142 is connected with the clutch 130 so as to provide hydraulic oil for the clutch 130. In this case, the first pressure sensor 151 may be arranged on the oil supply pipeline 142, so that the hydraulic pressure of the clutch hydraulic system 140 may be better detected. Of course, the embodiments of the present disclosure include but are not limited thereto, and the first pressure sensor may also be arranged at other suitable positions as long as it may detect the hydraulic pressure of the clutch hydraulic system.

In some examples, because the clutch rotates in the working state, the oil supply pipeline may be connected with the clutch through a rotary joint. Of course, the embodiments of the present disclosure include but are not limited thereto, and the oil supply pipeline may also be connected with the clutch in other ways. In addition, the type of rotary joint may be selected according to the actual situation. In some examples, as illustrated by FIG. 2A, the fracturing apparatus 100 further includes a second pressure sensor 152. The hydraulic end 114 of the plunger pump 110 includes a liquid output end 1142, and the second pressure sensor 152 is configured to detect the pressure of the liquid output from the liquid output end 1142. Upon the fracturing apparatus performing fracturing operations, it is needed for the fracturing apparatus to provide fracturing liquid meeting the preset pressure value. If the pressure of the liquid output from the liquid output end 1142 of the plunger pump 110 is greater than the safe pressure value (for example, 90 MPa), it is needed to protect the transmission and high-pressure components of the apparatus. In this case, the fracturing apparatus may quickly disengage the clutch and protect the transmission and high-pressure components of the apparatus, thus playing a safe role.

For example, upon the pressure of the liquid output by the liquid output end of the plunger pump being greater than the safe pressure value, the fracturing apparatus may control the clutch hydraulic system through the control system to make the clutch quickly disengage. Of course, the embodiments of the present disclosure include but are not limited thereto, the fracturing apparatus may also play a safe role by stopping the rotation of the electric motor, stopping the power supply of the electric motor, or stopping the output of the electric motor frequency converter through the control system upon the pressure of the liquid output by the liquid output end of the plunger pump being greater than the safe pressure value.

In some examples, as illustrated by FIG. 3, the fracturing apparatus 100 includes two plunger pumps 110 and a prime mover 120. One prime mover 120 may drive two plunger pumps 110 at the same time. In this case, the fracturing apparatus 100 may include two clutches 130, two clutch hydraulic systems 140, and two second pressure sensors 152. The two second pressure sensors 152 are arranged in one-to-one correspondence with the two liquid output ends 1142 of the two plunger pumps 110, and each second pressure sensor 151 is configured to detect the hydraulic pressure of the corresponding liquid output end 1142. Therefore, upon the second pressure sensors detects that the hydraulic pressure provided by any one of the two liquid output ends being greater than the safe pressure value, the clutch may be quickly disengaged to protect the transmission and high-pressure components of the apparatus, thus playing a safe role.

In some examples, as illustrated by FIG. 2A, the fracturing apparatus 100 further includes a discharge manifold 160, the discharge manifold 160 is connected with the liquid output end 1142. In this case, the second pressure sensor 152 may be arranged on the liquid output end 1142 or the discharge manifold 160, so as to better detect the pressure of the liquid output by the liquid output end 1142. Of course, the embodiments of the present disclosure include but are not limited thereto, and the second pressure sensor may also be arranged at other suitable positions as long as it may detect the pressure of the liquid output by the liquid output end; for example, the second pressure sensor may be arranged on a pressure relief manifold.

For example, as illustrated by FIG. 2A, the discharge manifold 160 of the fracturing apparatus 100 is only arranged on a side of the plunger pump 110 away from the clutch 130, in addition, as illustrated by FIG. 2B, the fracturing apparatus 100 also has an auxiliary manifold 161 on a side of the plunger pump 110 away from the discharge manifold 160. In this case, the second pressure sensor 152 may also be arranged on the auxiliary manifold 161, and the auxiliary manifold 161 may be configured to discharge high-pressure liquid or relieve pressure.

In some examples, as illustrated by FIGS. 2A and 2B, the fracturing apparatus 100 further includes a first temperature sensor 171 configured to detect the temperature of the clutch 130. Therefore, the fracturing apparatus detects the temperature of the clutch through the first temperature sensor, and upon the first temperature sensor detects that the temperature of the clutch being higher than a preset temperature value, the clutch may be controlled to disengage, so that various faults caused by high clutch temperature may be avoided, further deterioration of faults may be avoided, and pertinent overhaul and maintenance may be carried out. In addition, the temperature of the clutch detected by the first temperature sensor may be displayed remotely, so that remote operation may be realized, and the operation difficulty and cost may be reduced. It should be noted that the first temperature sensor is configured to detect the temperature of the clutch, but the first temperature sensor is not needed to be installed on the clutch, because the clutch will rotate, and the stability of the first temperature sensor using wiring or wireless connection is easy to have problems, so the first temperature sensor may use non-contact temperature measurement methods such as infrared temperature measurement.

In some examples, as illustrated by FIGS. 2A and 2B, the fracturing apparatus 100 further includes a second temperature sensor 172, the second temperature sensor 172 is configured to detect the temperature of the clutch hydraulic system 140. Therefore, the fracturing apparatus detects the temperature of hydraulic oil in the clutch hydraulic system through the second temperature sensor, and upon the second temperature sensor detecting that the temperature of hydraulic oil in the clutch hydraulic system is higher than the preset temperature value, it may control the clutch to disengage, thus avoiding various faults caused by high clutch temperature, thus avoiding further deterioration of faults, and carrying out pertinent overhaul and maintenance.

In some examples, as illustrated by FIG. 3, the fracturing apparatus 100 includes two plunger pumps 110 and one prime mover 120. One prime mover 120 may drive two plunger pumps 110 at the same time. In this case, the fracturing apparatus 100 may include two clutches 130, two clutch hydraulic systems 140, two first temperature sensors 171 and two second temperature sensors 172. The two first temperature sensors 171 are arranged in one-to-one correspondence with the two clutches 130, and each first temperature sensor 171 is configured to detect the temperature of the corresponding clutch 130. The two second temperature sensors 172 are arranged in one-to-one correspondence with the two clutch hydraulic systems 140, and each second temperature sensor 172 is configured to detect the temperature of the corresponding clutch hydraulic system 140. Therefore, upon the first temperature sensors detecting that the temperature of any one of the two clutches is abnormal or the second temperature sensors detecting that the temperature of any one of the two clutch hydraulic systems is abnormal, the corresponding clutch may be controlled to disengage, thus ensuring the normal operation of the other plunger pump.

In some examples, as illustrated by FIGS. 2A and 2B, the fracturing apparatus 100 further includes a first vibration sensor 181, the first vibration sensor 181 is configured to detect the vibration of the plunger pump 110. The fracturing apparatus 100 further includes a plunger pump base 118, the plunger pump 110 is arranged on the plunger pump base 118, and the first vibration sensor 181 is located on the plunger pump 110 or the plunger pump base 118. During the operation process of the fracturing apparatus, upon the clutch failing, the transmission between the clutch and the plunger pump will be abnormal, resulting in higher vibration value of the plunger pump. The fracturing apparatus provided in this example detects the vibration of the plunger pump through the first vibration sensor, upon the vibration of the plunger pump being greater than a preset vibration value, the clutch may be controlled to disengage, and the input power of the plunger pump may be completely cut off, so that the further deterioration of the fault may be avoided, and the pertinent overhaul and maintenance may be carried out. In addition, because the first vibration sensor is located on the plunger pump (such as the housing of the plunger pump) or the plunger pump base, the first vibration sensor is rigidly connected with the plunger pump in this case, and the first vibration sensor may better reflect the vibration of the plunger pump.

In some examples, as illustrated by FIG. 3, the fracturing apparatus 100 includes two plunger pumps 110 and one prime mover 120. One prime mover 120 may drive two plunger pumps 110 at the same time. In this case, the fracturing apparatus 100 may include two clutches 130, two clutch hydraulic systems 140, and two first vibration sensors 181. Therefore, upon the first vibration sensor 181 detecting that the vibration of any one of the two plunger pumps is greater than the preset vibration value, the corresponding clutch may be controlled to disengage, thereby ensuring the normal operation of the other plunger pump.

In some examples, as illustrated by FIGS. 2A and 2B, the fracturing apparatus 100 further includes a second vibration sensor 182, the second vibration sensor 182 is configured to detect the vibration of the prime mover 120. The fracturing apparatus 100 further includes a prime motor base 128, the prime mover 120 is arranged on the prime motor base 128, the second vibration sensor 182 is arranged on the prime mover 120 or the prime motor base 128. During the operation process of the fracturing apparatus, upon the clutch failing, the transmission between the clutch and the prime mover will be abnormal, resulting in high vibration value of the prime mover. The fracturing apparatus provided in this example detects the vibration of the prime mover through the first vibration sensor, and upon the vibration of the prime mover being greater than the preset vibration value, the clutch may be controlled to disengage, so that the further deterioration of the fault may be avoided, and pertinent overhaul and maintenance may be carried out. In addition, because the second vibration sensor is located on the prime mover (such as the housing of the prime mover) or the prime mover base, the second vibration sensor may better reflect the vibration of the prime mover.

In some examples, as illustrated by FIGS. 2A and 2B, the fracturing apparatus 100 further includes a first rotation speed sensor 191 and a second rotation speed sensor 192. The first rotation speed sensor 191 is configured to detect the actual rotation speed of the power input shaft 1125 of the plunger pump 110. The second rotation speed sensor 192 is configured to detect the actual rotation speed of the power output shaft 125 of the prime mover 120. Therefore, upon the actual rotation speed detected by the first rotation speed sensor 191 not matching the actual rotation speed detected by the second rotation speed sensor 192, for example, the transmission ratio being not conformed, it may be determined that the clutch is abnormal. In this case, the clutch may be controlled to disengage, so that further deterioration of the fault may be avoided, and pertinent overhaul and maintenance may be carried out.

In some examples, as illustrated by FIGS. 2A and 2B, the first rotation speed sensor 191 may be arranged on the power input shaft 1125 of the plunger pump 110, so that the space that may be fixed and protected is larger. It should be noted that if the rotation speed sensor is installed on the clutch or its upper and lower regions, there is a greater risk of damage to the rotation speed sensor upon the clutch being overhauled or oil leakage occurs. Moreover, the fault jitter of clutch may easily cause the deviation of detection data.

However, the fracturing apparatus provided in this example may install the first rotation speed sensor on the power input shaft of the plunger pump, which will not be affected by clutch failure or clutch overhaul.

In some examples, as illustrated by FIG. 3, the fracturing apparatus 100 includes two plunger pumps 110 and one prime mover 120. One prime mover 120 may drive two plunger pumps 110 at the same time. In this case, the fracturing apparatus 100 may include two clutches 130, two clutch hydraulic systems 140, two first rotation speed sensors 191 and one second rotation speed sensor 192. Therefore, upon the rotation speed of any one of the two plunger pumps detected by the two first rotation speed sensors 191 being not match the rotation speed of the prime mover detected by the second rotation speed sensor 192, the corresponding clutch may be controlled to disengage, thereby ensuring the normal operation of the other plunger pump.

It should be noted that both the fracturing apparatus illustrated in FIGS. 2A and 2B and the fracturing apparatus illustrated in FIG. 3 may be provided with at least three kinds of the above-mentioned first pressure sensor, second pressure sensor, first temperature sensor, first vibration sensor, second vibration sensor, first rotation speed sensor and second rotation speed sensor at the same time, so as to evaluate the state of the clutch from different aspects, thus controlling the clutch to disengage upon the clutch being abnormal, thus avoiding further deterioration of the fault, and pertinent overhaul and maintenance may be carried out.

Figure 4:
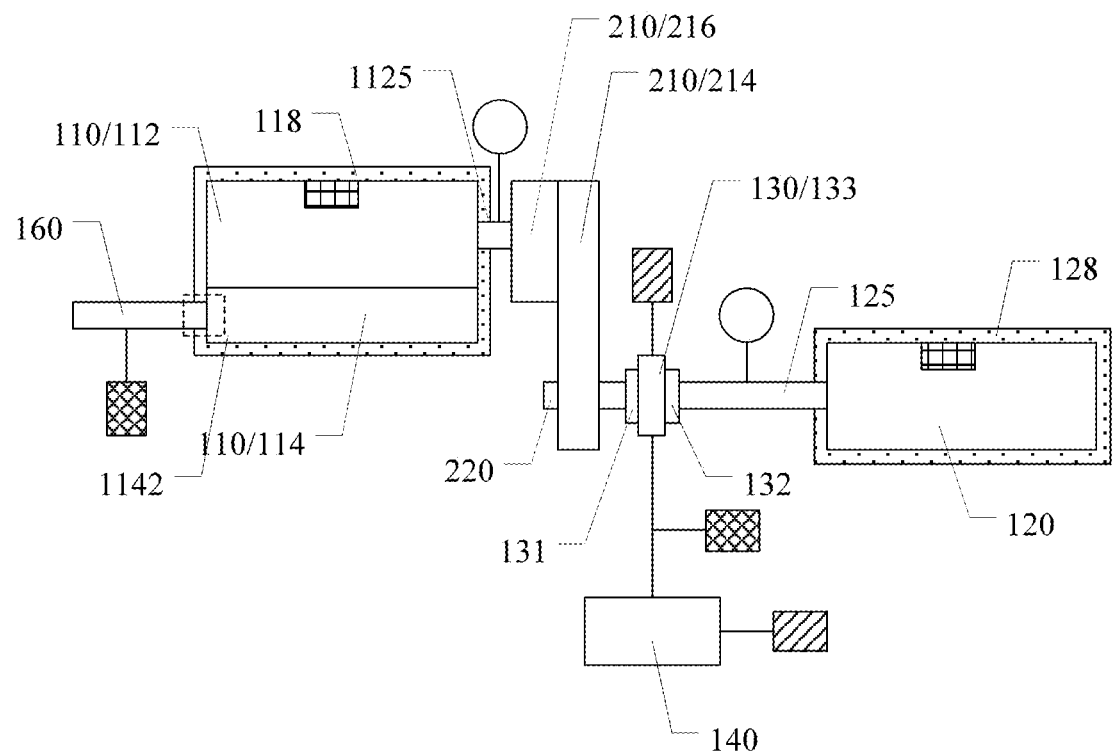
FIG. 4 is a schematic diagram of another fracturing apparatus according to various embodiments of the present disclosure.

FIG. 4 is a schematic diagram of another fracturing apparatus according to an embodiment of the present disclosure. As illustrated by FIG. 4, the fracturing apparatus 100 may further include a gearbox (e.g., reduction gearbox 210), the reduction gearbox 210 includes an input gear shaft 212. The input gear shaft 212 is directly connected with the first connection portion 131 of the clutch 130, and the power input shaft 1125 is directly connected with the reduction gearbox 210. The clutch 130 is optional. That is, the gearbox may connect the power input shaft 1125 with the power output shaft 125. The reduction gearbox 210 may include a planetary gearbox 216 and a parallel shaft gearbox 214, in this case, the parallel shaft gearbox 214 is connected with the input gear shaft 212, and the power input shaft 1125 is directly connected with the planetary gearbox 216. The reduction gearbox 210 is also connected to the power output shaft 125 at input gear shaft 220 of the power output shaft 125. In some embodiments, FIG. 4 may be combined with FIG. 3 such that the fracturing apparatus 100 includes two gearboxes correspondingly connecting two power input shafts with two power output shafts.

In a common fracturing apparatus, the clutch is connected with the power input shaft of the plunger pump. In the operation process of fracturing apparatus, the vibration or jitter of the plunger pump itself is obviously higher than the vibration or jitter of the prime mover because of the crankshaft structure of the power input shaft and the instantaneous pressure fluctuation of the inlet and outlet of the plunger pump. In addition, the clutch itself is heavy, and the clutch also includes a moving mechanism and a sealing structure, so connecting the clutch with the power input shaft of the plunger pump is prone to failure. In addition, the power input shaft of the plunger pump needs to be directly connected with the clutch, and the plunger pump itself is usually provided with a plunger pump reduction gearbox, so the power input shaft of the plunger pump needs to pass through the plunger pump body and the plunger pump reduction gearbox and be connected with the clutch, thus resulting in a large length of the power input shaft; in addition, the power input shaft needs to form a hydraulic oil hole penetrating through the power input shaft, and the long length of the power input shaft will also lead to the long length of the hydraulic oil hole need to be formed, resulting in high processing difficulty and cost.

However, the fracturing apparatus provided in this example directly connects the first connection portion of the clutch with the input gear shaft of the planetary gearbox, and the planetary gearbox is directly connected with the power input shaft, so there is no need to connect the clutch with the power input shaft of the plunger pump. Therefore, the fracturing apparatus may reduce the failure rate of the clutch. On the other hand, the power input shaft of the plunger pump does not need to be directly connected with the clutch, which may greatly reduce the length of the power input shaft of the plunger pump, thereby greatly reducing the processing difficulty of the power input shaft and hydraulic oil holes in the power input shaft and reducing the cost.

For example, upon the plunger pump being a five-cylinder plunger pump, the length of the power input shaft may be reduced from more than 2 meters to smaller than 0.8 meters, thus greatly reducing the processing difficulty of the power input shaft and reducing the cost.

Figure 5:
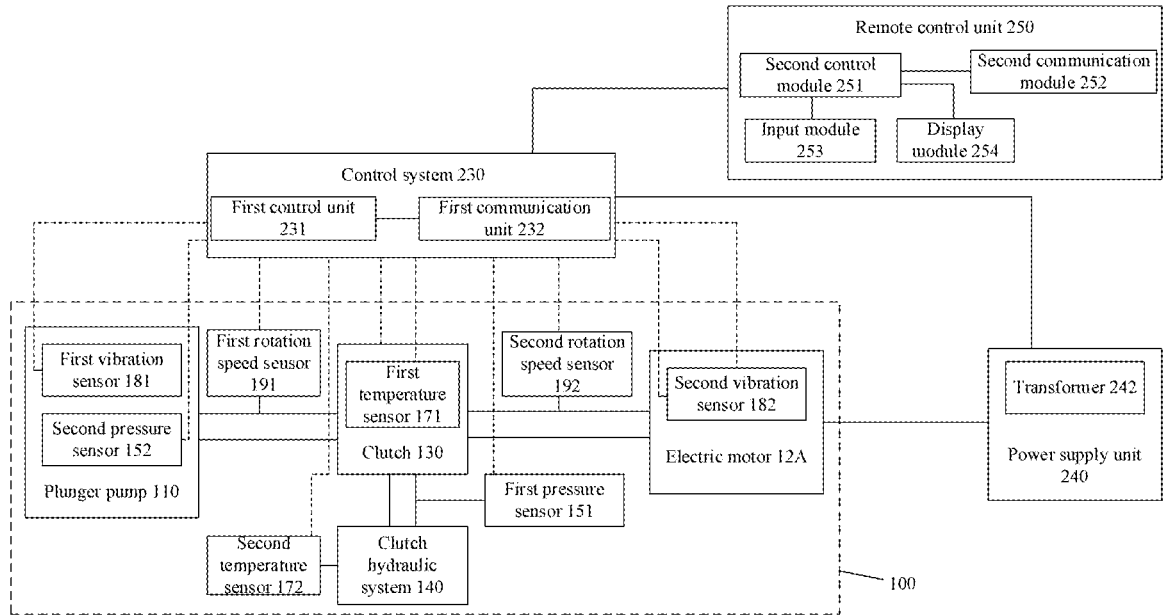
FIG. 5 is a schematic diagram of a fracturing system according to various embodiments of the present disclosure.

FIG. 5 is a schematic diagram of a fracturing system according to an embodiment of the present disclosure. The fracturing system 300 includes the fracturing apparatus 100 provided by any one of the above examples. The fracturing system 300 further includes a control system 230; the control system 230 includes a first control unit 231 and a first communication module 232. The control system 230 is electrically connected with the clutch 130; the control system 230 is communicatively connected with the first pressure sensor 151, the second pressure sensor 152, the first temperature sensor 171, the second temperature sensor 172, the first vibration sensor 181, the second vibration sensor 182, the first rotation speed sensor 191 and the second rotation speed sensor 192. The control system 230 may control the clutch 130 according to the parameters fed back by the first pressure sensor 151, the second pressure sensor 152, the first temperature sensor 171, the second temperature sensor 172, the first vibration sensor 181, the second vibration sensor 182, the first rotation speed sensor 191 and the second rotation speed sensor 192.

For example, upon the first pressure sensor detecting that the hydraulic pressure value of the hydraulic oil provided by the clutch hydraulic system to the clutch being smaller than the preset pressure value, the control system may control the clutch to disengage as to avoid the clutch slip phenomenon caused by the lower hydraulic pressure, thus avoiding the further deterioration of the fault, and carrying out pertinent overhaul and maintenance. For the control method of the control system according to the parameters fed back by other sensors, please refer to the description of the relevant sensors, which will not be repeated here.

It should be noted that the control system 230 may be connected with the above-mentioned sensors in a wired manner, or may be connected with the above-mentioned sensors in a wireless manner.

In some examples, as illustrated by FIG. 5, the fracturing system 300 further includes a remote control unit 250. The remote control unit 250 includes a second control module 251, a second communication module 252, an input module 253 and a display module 254. The remote control unit 250 may communicate with the first communication module 232 of the control system 230 through the second communication module 252. The second control module 251 is respectively connected with the input module 253 and the display module 254. Therefore, the remote control unit 250 may receive the data of the control system 230 and display it on the display module 254. The user may also send control instructions to the control system 230 through the input module 253 of the remote control unit 250.

In some examples, as illustrated by FIG. 5, the fracturing system 300 further includes a power supply unit 240, the power supply unit 240 includes a transformer 242. Upon the prime mover 120 being an electric motor, the power supply unit 240 may be connected with the prime mover 120 to supply power to the prime mover 120. In addition, the power supply unit 240 may also be connected with the control system 230 to supply power to the control system 230.

Figure 6:
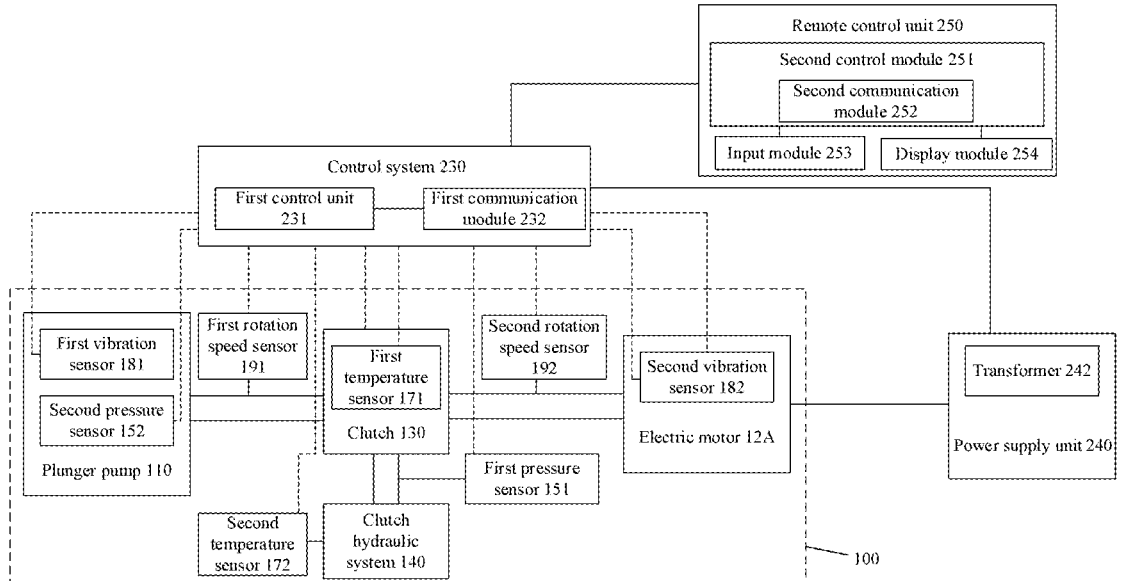
FIG. 6 is a schematic diagram of a fracturing system according to various embodiments of the present disclosure.

FIG. 6 is a schematic diagram of another fracturing system according to an embodiment of the present disclosure. As illustrated by FIG. 6, in the remote control unit 250, the second communication module 252 may be integrated in the second control module 251, thereby improving the integration of the remote control unit. Therefore, the second control module 251 may directly receive the data of the control system 230 and display it on the display module 254. The user may also send control instructions to the control system 230 through the input module 253 of the remote control unit 250.

At least one embodiment of the present disclosure further provides a control method of a fracturing apparatus. The fracturing apparatus may be the fracturing apparatus provided by any of the above examples. In this case, the control method includes: detecting the hydraulic pressure of the clutch hydraulic system; and controlling the clutch to disengage if the detected hydraulic pressure of the clutch hydraulic system is smaller than a first preset pressure value.

In the control method provided by the embodiment of the present disclosure, Upon the hydraulic pressure value of the hydraulic oil provided to the clutch by the clutch hydraulic system being smaller than the first preset pressure value, the clutch is controlled to disengage, so that the clutch slip phenomenon caused by lower hydraulic pressure may be avoided, further deterioration of faults may be avoided, and pertinent overhaul and maintenance may be carried out.

For example, the hydraulic pressure of the clutch hydraulic system may be detected by the above-mentioned first pressure sensor, that is, the hydraulic pressure value of the hydraulic oil provided by the clutch hydraulic system to the clutch.

In some examples, the control method further includes: detecting the pressure of the liquid output by the plunger pump; and controlling the clutch to disengage if the detected pressure of the liquid output by the plunger pump is higher than a second preset pressure value. Therefore, if the pressure of the liquid output by the liquid output end of the plunger pump is higher than the second preset pressure value, there may be a problem with the clutch. In this case, the fracturing apparatus may control the clutch to disengage, so that the fault may be found and treated in time. It should be noted that the above-mentioned second preset pressure value may be a safe pressure value.

For example, the pressure of the liquid output by the plunger pump may be detected by the second pressure sensor described above.

In some examples, the control method further includes: detecting the temperature of the clutch; and controlling the clutch to disengage if the detected temperature of the clutch is higher than a first preset temperature value. Therefore, upon the temperature of the clutch being higher than the preset temperature value, the clutch may be controlled to disengage, so that various faults caused by high clutch temperature may be avoided, further deterioration of faults may be avoided, and pertinent overhaul and maintenance may be carried out.

For example, the temperature of the clutch may be detected by the first temperature sensor.

In some examples, the control method further includes: detecting the temperature of hydraulic oil in the clutch hydraulic system; and controlling the clutch to disengage if the detected temperature of the hydraulic oil in the clutch hydraulic system is higher than a second preset temperature value. Therefore, upon the temperature of hydraulic oil in the clutch hydraulic system being higher than the second preset temperature value, the clutch may be controlled to disengage, so that various faults caused by higher clutch temperature may be avoided, further deterioration of faults may be avoided, and pertinent overhaul and maintenance may be carried out.

For example, the temperature of the hydraulic oil in the clutch hydraulic system may be detected by the second temperature sensor.

In some examples, the control method further includes: detecting the vibration of the plunger pump; and controlling the clutch to disengage if the detected vibration of the plunger pump is higher than a first preset vibration value. During the operation process of fracturing apparatus, upon the clutch failing, the transmission between the clutch and the plunger pump will be abnormal, resulting in high vibration value of the plunger pump. Upon the vibration of the plunger pump being greater than the first preset vibration value, the control method may control the clutch to disengage and completely cut off the input power of the plunger pump, thus avoiding the further deterioration of the fault and carrying out pertinent overhaul and maintenance.

For example, the vibration of the plunger pump may be detected by the first vibration sensor described above.

In some examples, the control method further includes: detecting vibration of the prime mover; and controlling the clutch to disengage if the detected vibration of the prime mover is higher than a second preset vibration value. Upon the clutch failing, the transmission between the clutch and the prime mover will be abnormal, resulting in high vibration value of the prime mover. Upon the vibration of the prime mover being greater than the second preset vibration value, the control method may control the clutch to disengage, thus avoiding the further deterioration of the fault, and carrying out pertinent overhaul and maintenance.

In some examples, the control method further includes: detecting a first actual rotation speed of the power input shaft of the plunger pump; detecting a second actual rotation speed of the power output shaft of the prime mover; calculating a ratio of the first actual speed and the second actual speed, and controlling the clutch to disengage if the ratio is smaller than a first preset ratio or greater than a second preset ratio. Therefore, upon the ratio of the first actual speed of the power input shaft of the plunger pump to the second actual speed of the power output shaft of the prime mover being smaller than the first preset ratio or greater than the second preset ratio (i.e., there is no match), it may be judged that the clutch is abnormal. In this case, the control method may control the clutch to disengage, so as to avoid the further deterioration of the fault, and may carry out pertinent overhaul and maintenance.

In the working sites of fracturing in oil and gas fields, the power driving modes for plunger pumps mainly include the following two ways. One driving mode is that a diesel engine is connected to a transmission to drive the fracturing plunger pump through a transmission shaft to work. In other words, a diesel engine is used as the power source, a transmission and a transmission shaft are used as the transmission devices, and a plunger pump is used as the actuating element. This configuration mode has the following disadvantages: (1) large volume and heavy weight: when a diesel engine drives a transmission to drive a plunger pump through a transmission shaft, a large volume is occupied, a heavy weight is involved, the transportation is restricted, and the power density is low; (2) environmental problems: during operations on a well site, the fracturing apparatus driven by the diesel engine would generate engine waste gas pollution and noise pollution. The noise exceeding 105 dBA will severely affect the normal life of nearby residents; (3) cost inefficiency: the fracturing apparatus driven by the diesel engine requires relatively high initial purchase costs and incurs high fuel consumption costs for unit power during operation, and the engine and the transmission also require very high routine maintenance costs.

The other driving mode is that an electric motor is connected to a transmission shaft or a coupling to drive the plunger pump to work. In other words, an electric motor is used as the power source, a transmission shaft or a coupling is used as the transmission device, and a plunger pump is used as the actuating element, i.e., electric drive fracturing.

Existing electric drive fracturing apparatus is usually provided with special power supply equipment to provide the driving power. The power supply equipment and the electric fracturing apparatus are usually arranged one-to-one, or one high-power power supply equipment is used to drive several electric fracturing apparatuses (hereinafter referred to as one-to-many). However, no matter one-to-one or one-to-many, in the practical use of a well site, it takes too much time to arrange the electric fracturing apparatus and the power supply equipment (i.e., electric fracturing apparatus and power supply equipment should be used in complete sets). Furthermore, each electric fracturing apparatus should be connected to the power supply equipment, so that the electric fracturing apparatus could enter working state; the above processes are all time and labor consuming, and there are also too many connection wires between equipment, and it seems relatively cumbersome. Therefore, there is an urgent need for an economical and environmentally friendly electric fracturing apparatus with small volume and simple connection.

Figure 7:
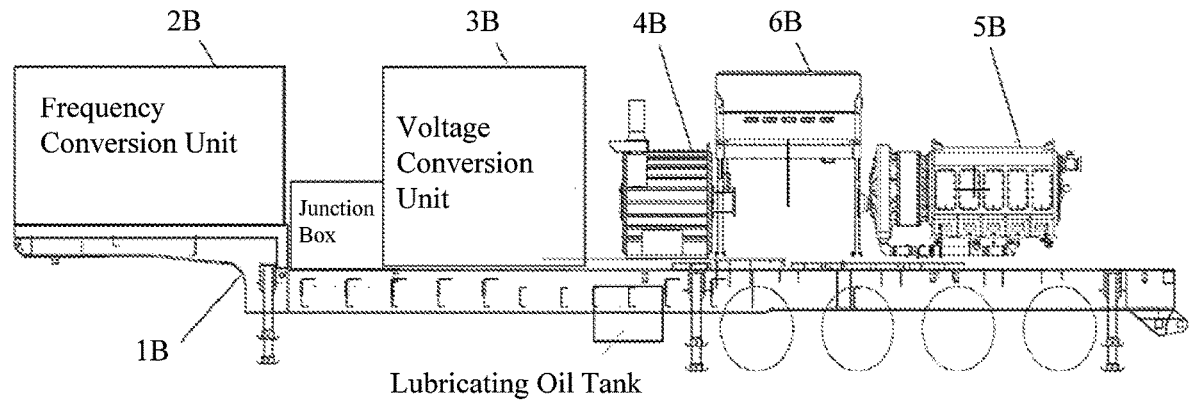
FIG. 7 is a schematic structural diagram of a single-motor single-pump electric drive fracturing semi-trailer according to various embodiments of the present disclosure.
Figure 8:
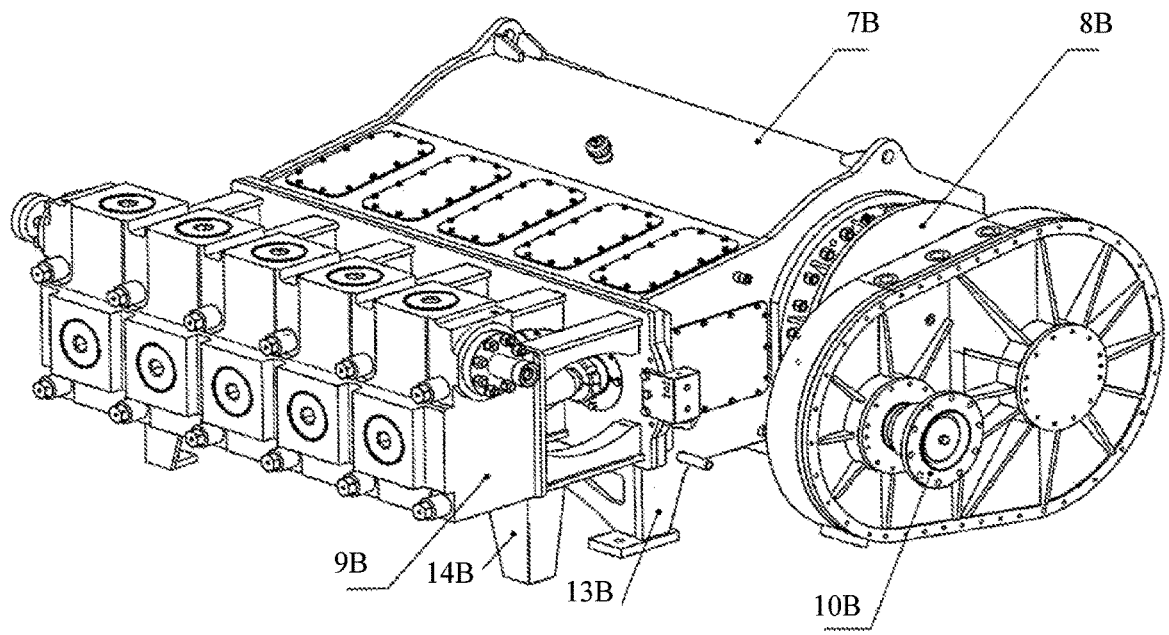
FIG. 8 is a schematic structural diagram of a five cylinder plunger pump according to various embodiments of the present disclosure.
Figure 9:
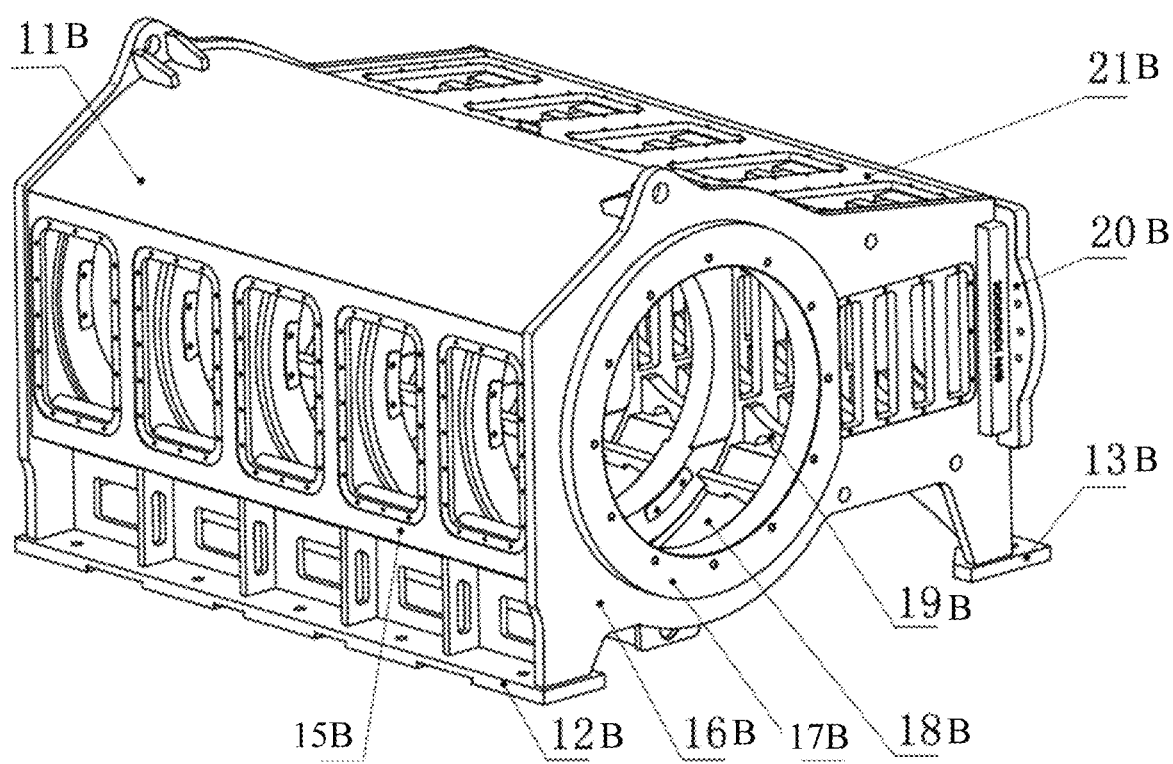
FIG. 9 is a schematic structural diagram of a power end housing according to various embodiments of the present disclosure.

Legends for FIGS. 7-9 are provided as follows: 1B power supply platform, 2B frequency conversion unit, 3B voltage conversion unit, 4B electric motor, 5B plunger pump, 6B radiator, 7B power end assembly, 8B reduction gearbox assembly, 9B hydraulic end assembly, 10B driving flange, 11B power end housing, 12B crankshaft support, 13B crosshead support, 14B hydraulic support, 15B back cover plate, 16B vertical plate, 17B bearing seat, 18B base plate, 19B support plate, 20B front end plate, and 21B upper cover plate.

As shown in FIGS. 7-9, various embodiments provide a single-motor single-pump electric drive fracturing semi-trailer, including a power supply platform 1B, a plunger pump 5B, a radiator 6B, a power supply unit, and an electric motor 4B. The power supply unit, the electric motor 4B, the radiator 6B, and the plunger pump 5B are installed on the power supply platform 1B. The power supply platform may include, e.g., a semi-trailer body. In some embodiments, there are one electric motor 4B, one radiator 6B, and one plunger pump 5B. The power supply unit provides power for the electric motor 4B, the electric motor 4B is connected to the plunger pump 5B, and the radiator 6B cools the lubricating oil of the plunger pump 5B. The power supply unit includes a voltage conversion unit 3B and a frequency conversion unit 2B, the frequency conversion unit 2B is connected to the voltage conversion unit 3B, the voltage conversion unit 3B is disposed at one end of the power supply platform 1B near the electric motor 4B, and the frequency conversion unit 2B is disposed on a gooseneck of the power supply platform 1B. The number of axles of the power supply platform 1B is 4. The semi-trailer is further provided with an electrical control cabinet to implement local manipulation of the semi-trailer. A traditional power supply semi-trailer and a fracturing semi-trailer are optimally merged together to realize the function of a semi-trailer for supplying power and fracturing simultaneously. Compared to that of the existing power supply semi-trailer and a fracturing semi-trailer are used as a complete set, (for example, when one power supply semi-trailer is used to drive multiple fracturing semi-trailers, wiring is relatively tedious, there would be a lot of wiring accumulation and intricate lines in the field, and it may take up a lot of time on the arrangements of every power supply semi-trailer and multiple fracturing semi-trailers), in field uses, the power supply semi-trailer and the fracturing semi-trailer are separately transported, moved, and then wired and installed. The single-motor single-pump electric drive fracturing semi-trailer only need to be moved once, and it may be connected to a high voltage power supply only through a set of high voltage cable to reach working state. Compared with diesel-driven fracturing, electric drive fracturing generates low noise and no waste emission pollution; driven by electricity, it is cheaper to use than diesel.

The voltage conversion unit 3B has a cabin structure with multiple compartments, in which a switch and a transformer are arranged, and the switch is connected to the transformer. The frequency conversion unit 2B has a cabin structure with multiple compartments, in which a frequency converter is arranged, an input end of the frequency converter is connected to the voltage conversion unit 3B, specifically, the input end of the frequency converter is connected to the transformer, and an output end of the frequency converter is connected to the electric motor 4B.

The plunger pump 5B is a five cylinder plunger pump which includes a power end assembly 7B, a hydraulic end assembly 9B and a reduction gearbox assembly 8B, one end of the power end assembly 7B is connected to the hydraulic end assembly 9B, the other end of the power end assembly 7B is connected to the reduction gearbox assembly 8B, the power end assembly 7B includes a crankcase, a crosshead case and a spacer frame which are connected in sequence.

The stroke of the five cylinder plunger pump is 10" or above. The design of long stroke is beneficial to realize the operation requirement of large displacement and enhance the operation efficiency.

In some embodiments, the power of the five cylinder plunger pump is 5000 hp or above. In one embodiment, the power of the five cylinder plunger pump is 7000 hp. The cylinder spacing of the five cylinder plunger pump is 13-14 inches, ensuring the high-power output of the five cylinder plunger pump. The high-power five cylinder plunger pump may effectively address the problems of narrow area and many fracturing apparatuses being required in shale gas fracturing wellsite, thus reducing the use of equipment and facilitating the arrangement of the wellsite.

The crankcase and the crosshead case are welded to constitute a power end housing 11B which is connected to the spacer frame, the power end housing 11B includes six vertical plates 16B, six bearing seats 17B, a front end plate 20B, a back cover plate 15B, a base plate 18B, a support plate 19B and an upper cover plate 21B; each vertical plate 16B is connected to a corresponding bearing seat 17B, and the six vertical plates 16B are arranged in parallel to constitute a power end chamber; the base plate 18B is mounted at the bottom of the power end chamber, the upper cover plate 21B is mounted on the top of the power end chamber, the front end plate 20B is mounted at the front end of the power end chamber, and the back cover plate 15B is mounted at the back end of the power end chamber; and the support plate 19B is disposed between two adjacent vertical plates 16B arranged in parallel. The crankcase and the crosshead case in the power end assembly 7B of the five cylinder plunger pump are welded so that the power end assembly 7B has a higher structural strength and a better support stability to reduce vibration of the whole pump. A crankshaft is disposed in the crankcase. A crosshead, a crosshead cap and a crosshead bearing bush are disposed in the crosshead case. A connecting rod, a connecting rod cap and a connecting rod bearing bush are disposed between the crankcase and the crosshead case. The crankshaft adopts a setting of five-crank and six-journal. One end of the crankshaft is connected to the reduction gearbox assembly 8B, the other end of the crankshaft is connected to the connecting rod through a connecting rod cap and a connecting rod bearing bush, the other end of the connecting rod is connected to the crosshead through a crosshead cap and a crosshead bearing bush, the other end of the crosshead is connected with a pull rod, and the other end of the pull rod is connected to a hydraulic end valve housing through a plunger and a clamp. The crankshaft is mounted on the bearing seat 17B of the power end housing 11B through six cylindrical roller bearings to allow the crankshaft rotation. The support plate 19B is fixedly installed with two slide rails to form a semi-circular space. A crosshead is mounted within the semi-circular space to allow linear motion. The reduction gearbox assembly 8B includes a planetary reduction gearbox and a parallel reduction gearbox, the transmission gears of which are all bevel gears. The planetary reduction gearbox includes a sun gear, four planetary gears, a planetary carrier, and an inner gear ring, constituting a planetary gear mechanism, with the sun gear at the center of the planetary gear mechanism; the parallel reduction gearbox includes a pinion and a bull gear, the pinion is connected to an input end, the bull gear is connected to a sun gear of the planetary reduction gearbox. A reduction gearbox is used to slow down and increase the torque. A driving flange 10B is disposed outside the planetary reduction gearbox, through which an external power source is connected for power input. The parallel reduction gearbox is connected to the crankshaft for power output.

A crankshaft support 12B is disposed at the bottom of the crankcase, which is used to support the crankcase. A crosshead support 13B is disposed at the bottom of the crosshead case, which is used to support the crosshead case. A hydraulic support 14B is disposed at the bottom of the spacer frame, which is used to support the hydraulic end assembly 9B. The multi-point support design of the crankcase, the crosshead case and the hydraulic end assembly 9B may enhance the support strength of the five cylinder plunger pump and reduce the vibration, thus better ensuring high load operation and more smoothly running.

The operating principle of the plunger pump 5B: An external power or rotating speed is transferred through the driving flange 10B to drive the reduction gearbox assembly 8B to rotate. Power and torque are transferred to the crankshaft through the two-stage speed shifting of the planetary reduction gearbox and the parallel reduction gearbox. The crankshaft rotates within the power end housing 11B, driving the motion of the connecting rod, the crosshead, and the pull rod, converting the rotational motion of the crankshaft into the reciprocating linear motion of the pull rod. The pull rod drives the plunger through a clamp to move back and forth within the valve housing, thus realizing the low pressure liquid suction and high pressure liquid discharge, i.e., realizing the pumping of liquid.

The operating principle of the single-motor single-pump electric drive fracturing semi-trailer: an input end of the high voltage switch is connected to the power supply through cables, an output end of the switch is connected to the transformer. The switch is configured to control the power supply on and off of the whole single-motor single-pump electric drive fracturing semi-trailer. High voltage electricity is dropped by a transformer to supply power to the frequency converter, the frequency converter drives the electric motor 4B to work, and the electric motor 4B drives the plunger pump 5B to work. The radiator 6B cools lubricating oil of the plunger pump 5B.

FIGS. 10-14 provide a fracturing system for fracturing operation at the well site. Legends in FIGS. 10-14 are provided as follows: 1C plunger pump, 2C transmission device, 3C carrier, 4C noise reduction device, 5C oil tank, 6C main motor, 7C cooler, 8C primary exhaust silencer, 9C secondary exhaust silencer, 10C air inlet silencer, 11C high-pressure pipeline, 12C low-pressure pipeline, 13C cooler window, 14C cooling fan, and 15C lubrication driving device.

Figure 10:
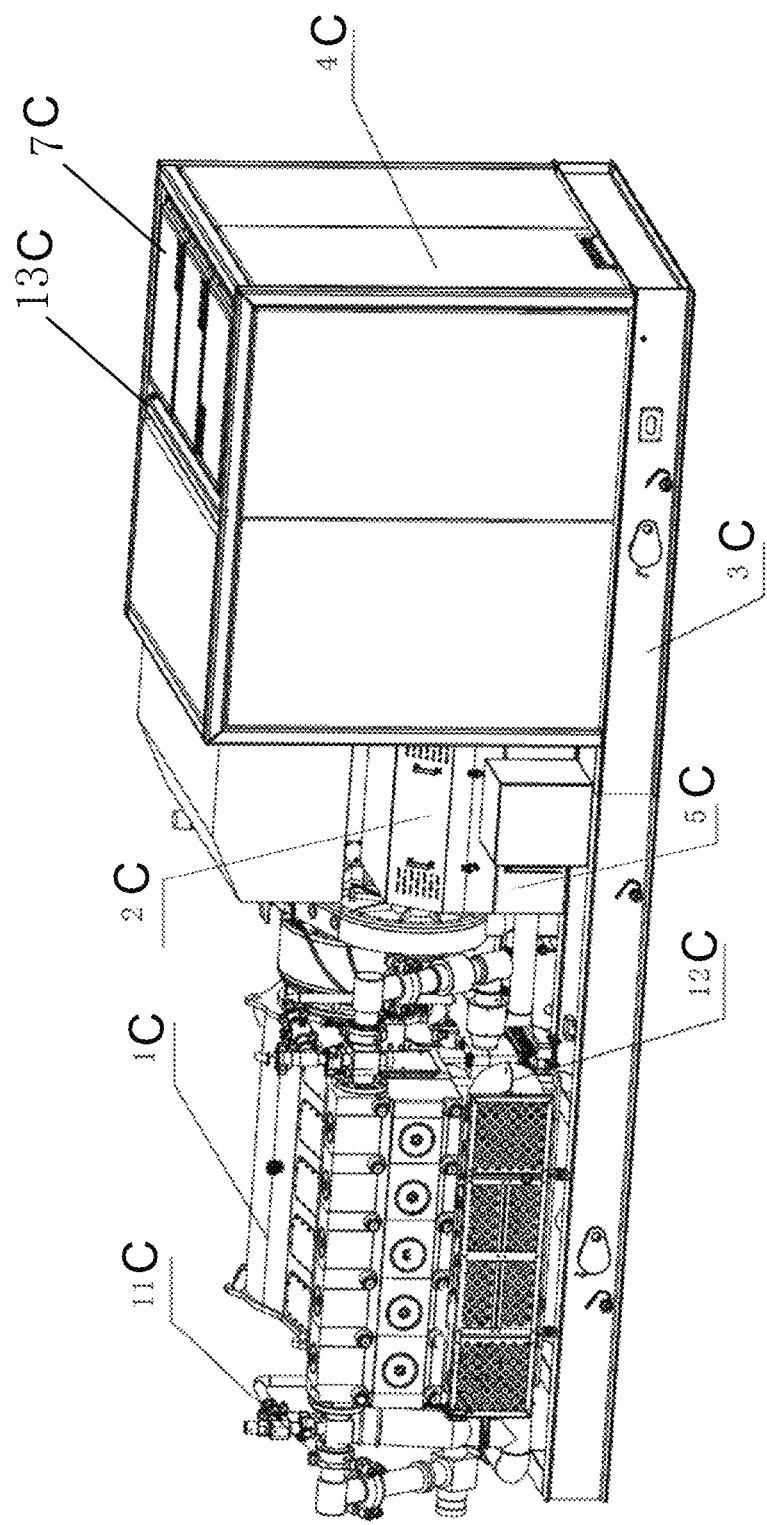
FIG. 10 is a perspective view of a fracturing apparatus according to various embodiments of the present disclosure.
Figure 11:
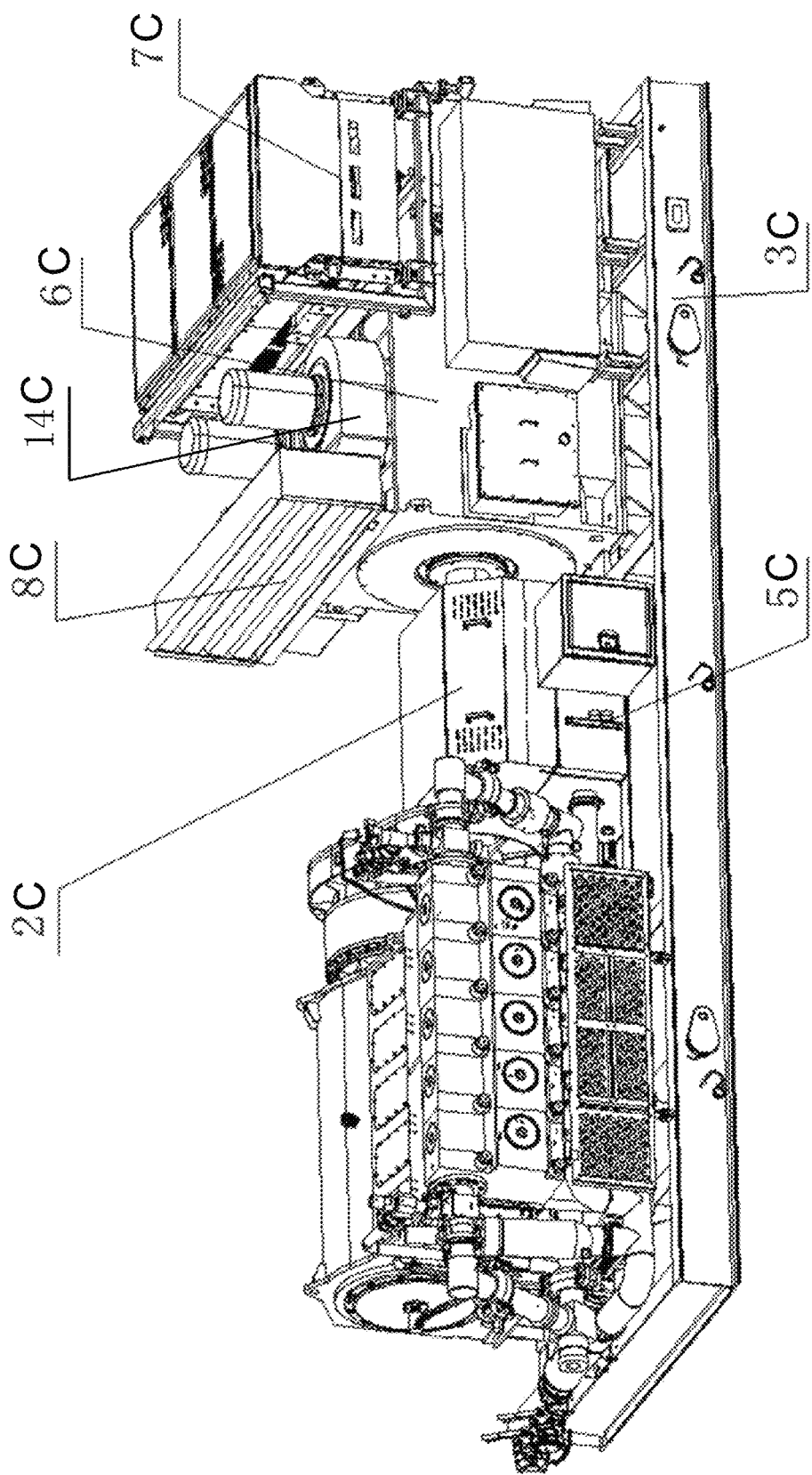
FIG. 11 is another perspective view of a fracturing apparatus shown in FIG. 10 with the noise reduction device omitted according to various embodiments of the present disclosure.

FIGS. 10 and 11 illustrate the fracturing apparatus according to some embodiments of the present disclosure, comprising a plunger pump 1C and a main motor 6C. The plunger pump 1C is used for pressurizing liquid with its liquid inlet end being connected to a low-pressure pipeline 12C for inputting low-pressure liquid into the plunger pump 1C. A liquid outlet end of the plunger pump 1C is connected to a high-pressure line 11C which is used for discharging the pressurized liquid from the plunger pump 1C. The main motor 6C is connected to the plunger pump 1C via a transmission device 2C such as transmission shaft or shaft coupling to provide driving force to the plunger pump 1C. Compared with diesel engine driving, electric driving may obviously reduce the noise generated during operation.

According to the present disclosure, the fracturing apparatus further comprises a noise reduction device 4C. As shown in FIG. 10, the noise reduction device 4C is configured as a cabin structure, which covers outside the main motor 6C and isolates the main motor 6 from the plunger pump 1C and the transmission device 2C. On the one hand, the noise reduction device 4C may reduce the intensity of noise transmitted to the outside during operation of the main motor 6C; On the other hand, the noise reduction device 4C may isolate the high-voltage hazardous area where the main motor 6C is located, thus ensuring safety during operation. The thickness of the wall of the noise reduction device 4C is greater than or equal to 5 mm, so as to increase the structural strength of the noise reduction device 4C while isolating noise, thereby protecting the internal devices.

In some embodiments, the wall of the noise reduction device 4C is constructed as a sandwich structure which is filled with a noise reduction material. Such a structure may further reduce the noise intensity transmitted from the inside of the noise reduction device 4C to the outside. The noise-reducing material may be a porous, loose, and breathable material, which is able to absorb noise. More specifically, the noise reduction material may be one or more of polyester fiber, aluminum silicate cotton, rubber plate, urea formaldehyde foam plastic and the like, which may be flexibly selected according to actual needs. In addition, the main motor 6C may also be wrapped by the above-mentioned noise reduction material to achieve a further noise reduction effect.

Still referring to FIG. 11, the fracturing apparatus also includes an oil tank 5C, a lubrication pump and a lubrication motor. The oil tank 5C contains lubricating oil and is fluidly connected to the plunger pump 1C. The lubricating oil is used to lubricate the plunger pump 1C. The lubrication pump is respectively fluidly connected with the oil tank 5C and the plunger pump 1C for driving the lubricating oil to flow, and the lubrication motor is connected to the lubrication pump by transmission to provide a driving force to the lubrication pump. According to the present disclosure, the lubrication pump and the lubrication motor are arranged in the noise reduction device 4C, so as to reduce noise transmitted to the outside during operation. In some embodiments, the lubrication pump and the lubrication motor may be integrated as one device, such as the lubrication drive device 15C shown in FIG. 14.

Figure 14:
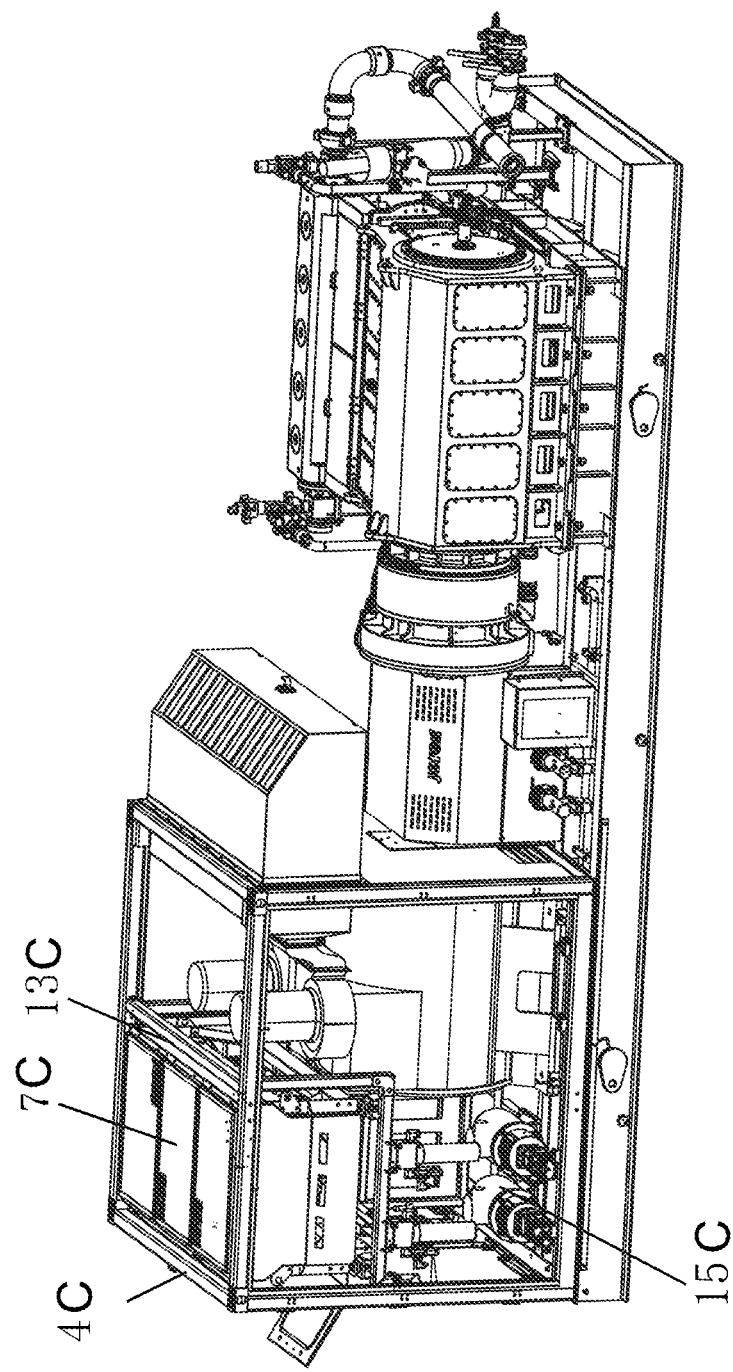
FIG. 14 is another perspective view of the fracturing apparatus shown in FIG. 10 according to various embodiments of the present disclosure.

The lubricating oil may also take away the heat generated by the operation of the plunger pump 1C, playing a cooling role while providing lubrication. Therefore, the lubricating oil is at a relatively high temperature after flowing out of the plunger pump 1C and needs to be cooled down. According to the present disclosure, the fracturing apparatus further comprises a cooler 7C with a fan, which may cool the lubricating oil by means of air blast cooling. In addition, the fracturing apparatus also includes a cooler motor that drives the fan. As shown in FIG. 14, the fan and the cooler motor are integrated in the cooler 7C. The cooler 7C is arranged inside the noise reduction device 4C so as to reduce the noise intensity transmitted to the outside during operation.

As shown in FIGS. 11 and 14, the cooler 7 may be constructed in a cuboid structure, which is arranged above the main motor 6 within the noise reduction device 4C. In this way, the cooler 7C may be arranged more flexibly under the condition that the space inside the noise reduction device 4C is limited. Furthermore, there may be at least two fans arranged along the length direction of the cooler 7C, and more fans may be arranged within a limited space to improve the heat dissipation capability. Still referring to FIGS. 10 and 12, a cooler window 13C is provided at the top of the noise reduction device 4C at a position corresponding to the cooler 7C. The top of the radiator 7C may dissipate heat outward through the cooler window 13C.

As shown in FIG. 11, the main motor 6C includes a cooling fan 14C which cools the main motor 6C by means of air suction cooling. Compared with the conventional air blast cooling method, the noise intensity generated by air suction cooling is lower during operation. The cooling fan 14C is arranged inside the noise reduction device 4C together with the main motor 6C to facilitate its connection with the main motor 6C such that the air inlet of the cooling fan 14C may be arranged at a position corresponding to the main motor 6C, and furthermore, the noise reduction device 4C may also reduce the intensity of noise transmitted to the outside during the operation of the cooling fan 14C.

In some embodiments, the fracturing apparatus further includes a primary exhaust silencer 8C, which is arranged inside the noise reduction device 4C and connected with an exhaust port of the cooling fan 14C. The airflow discharged from the cooling fan 14C enters the primary exhaust silencer 8C, so that the noise generated by the air flow may be reduced.

Figure 13:
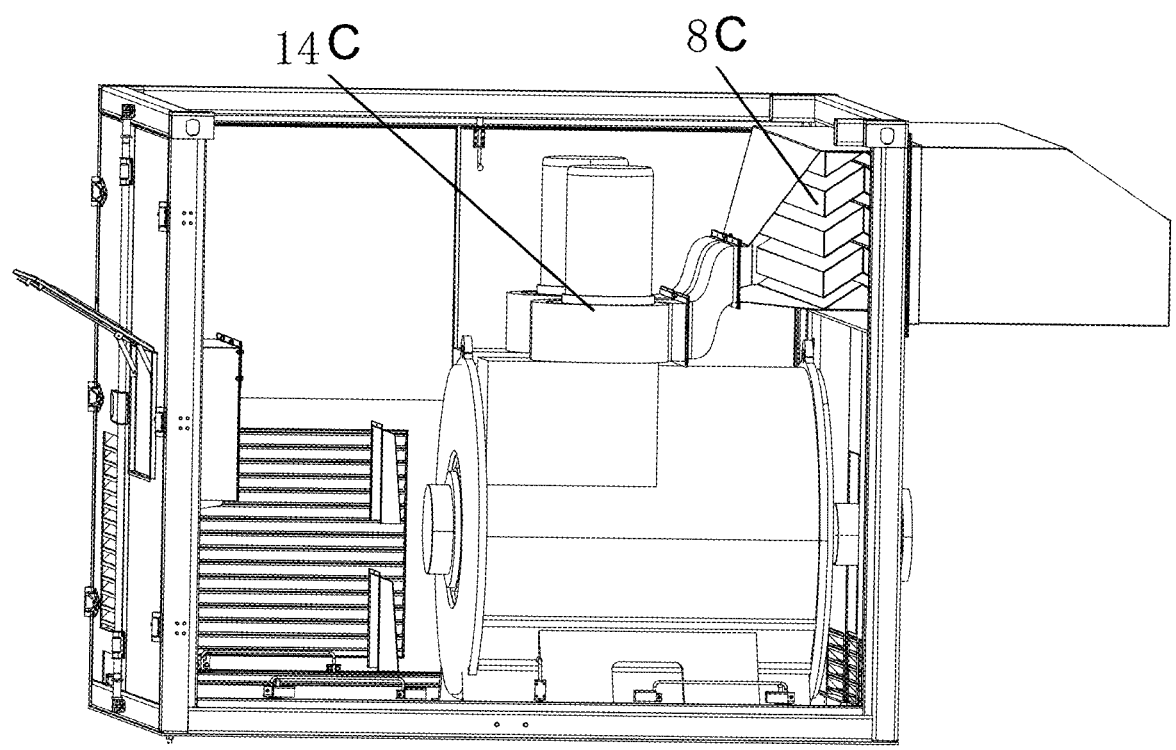
FIG. 13 is a partial view of vertical section of the fracturing apparatus shown in FIG. 10 according to various embodiments of the present disclosure.

As shown in FIG. 13, the exhaust port of the cooling fan 14C may be connected to the primary exhaust silencer 8C via a soft connection. More specifically, a flexible material such as rubber may be applied to form a connecting exhaust channel between the exhaust port of the cooling fan 14C and the primary exhaust silencer 8C. Compared with the hard connection method, the soft connection has lower requirements on the positioning accuracy between devices, so that the connection is simpler and more convenient for installation and maintenance. In addition, the soft connection may also compensate the displacement caused by vibration between the cooling fan 14C and the primary exhaust silencer 8C during operation, thereby preventing the primary exhaust silencer 8C from being damaged.

In some embodiments, an exhaust channel formed by the soft connection is configured such that a flow area of the exhaust channel gradually increases along an air flow direction from the cooling fan 14C toward the primary exhaust silencer 8C, which makes air flows more smoothly. In one embodiment, the soft connection may be designed to be tapered to achieve such technical effects.

In some embodiments, the fracturing apparatus also includes a secondary exhaust silencer 9C which corresponds to an exhaust port of the primary exhaust silencer 8C. The airflow discharged from the primary exhaust silencer 8C enters the secondary exhaust silencer 9C, and then is discharged into the outside after noise reduction by the secondary exhaust silencer 9C. Therefore, the exhaust noise of the cooling fan 14C is reduced to the greatest extent by dual noise reduction of the primary exhaust silencer 8C and the secondary exhaust silencer 9C. In some embodiments, the secondary exhaust silencer 9 may be integrated within the noise reduction device 4C so as to make the structure compact and easy to install.

Figure 12:
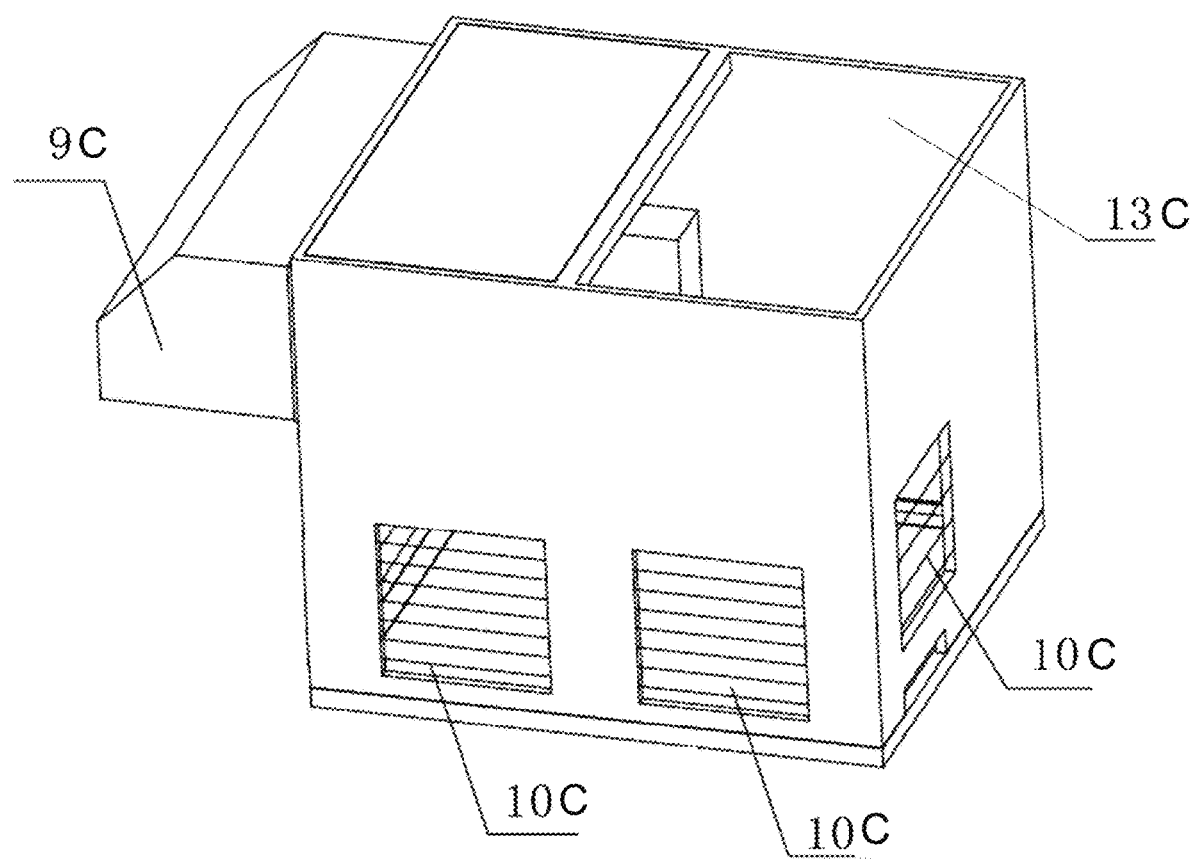
FIG. 12 a perspective view of the noise reduction device of the fracturing apparatus shown in FIG. 10 according to various embodiments of the present disclosure.

As shown in FIG. 12, the side surface of the noise reduction device 4C is provided with an air inlet, and an air inlet silencer 10C is provided at the position of the air inlet. Such arrangement may meet the air intake requirements of the cooling fan 14C and the cooler 7C, and the noise intensity generated by the airflow flowing through the air inlet may be reduced by the air inlet silencer 10C. In some embodiments, under the premise of ensuring the strength, safety and noise reduction effect, the air inlet and corresponding air inlet silencer 10C may be provided on each side of the noise reduction device 4C. In addition, according to area size, each side surface may be provided with more than one air inlets and corresponding air inlet silencers 10C.

In some embodiments, the fracturing apparatus may further comprise a carrier 3C. The foregoing devices are integrally installed on the carrier 3C, so that the fracturing apparatus forms a whole, thereby being more convenient to transport. In the illustrated embodiment, the carrier 3C may be a skid-mounted base. While in other embodiments the carrier may also be a chassis vehicle or semi-trailer.

According to some embodiments of the present disclosure, the fracturing apparatus is provided with a noise reduction device which covers outside power devices such as the main motor, the lubrication motor, the cooler, the cooler motor and the like and isolates these devices that generate loud noises during operation from the outside environment, thus reducing the noise intensity transmitted to the outside. Meanwhile, the plunger pump may be isolated from the foregoing power equipment to isolate the high-pressure dangerous area and ensure safe operation. Noise reduction material is wrapped outside the main motor and filled within the wall of the noise reduction device. In addition, the main motor is set to dissipate heat by means of air suction cooling, and dual exhaust silencers are provided at the exhaust port of the cooling fan of the main motor, which may further reduce the noise generated by the main motor. By arranging an air inlet silencer on the noise reduction device, the noise generated by the air intake of the cooler and the air suction cooling of the main motor is effectively reduced while meeting the air intake requirements of power equipment.

At oil and gas field fracturing sites around the world, the configuration of the powertrain used in traditional fracturing apparatus is as follows: The transmission includes a gearbox and a transmission shaft, and a diesel engine (which is the power source) is connected to the transmission's variable speed box, and then drive the plunger pump (which is the actuator) of the fracturing apparatus to work through the transmission shaft of the transmission device. The disadvantages brought by the above configuration of the power transmission system to the traditional fracturing apparatus are that (1) the diesel engine needs to drive the plunger pump of the fracturing apparatus through the gearbox and the transmission shaft, which leads to the volume of the fracturing apparatus; (2) due to the use of diesel engines as the power source, such fracturing apparatus will produce engine exhaust pollution and noise pollution during the operation of the well site (for example, the noise exceeds 105 dBA), which seriously affects the normal life of the surrounding residents; (3) for the fracturing apparatus driven by the diesel engine through the gearbox and the transmission shaft, the initial procurement cost of the equipment is relatively high, and the fuel consumption cost per unit of power when the equipment is running is relatively high, and the daily maintenance costs of the engine and transmission are also high. In view of the fact that the global oil and gas development equipment is developing in the direction of "low energy consumption, low noise, and low emission," the above-mentioned shortcomings of traditional fracturing apparatus using diesel engines as power sources largely hinder unconventional oil and gas energy sources development process.

To address the shortcomings of the above-mentioned traditional fracturing apparatus, electric-driven fracturing apparatus using electric motors to replace diesel engines have been developed. In such electric-driven fracturing apparatus, the power source is the electric motor, the powertrain is a transmission shaft (which can be equipped with a coupling or clutch), and the actuator is a piston pump. Because the electric motor is used to drive the plunger pump, the electric drive fracturing apparatus has the advantages of small size, light weight, economy, energy saving, and environmental protection.

Figure 15:
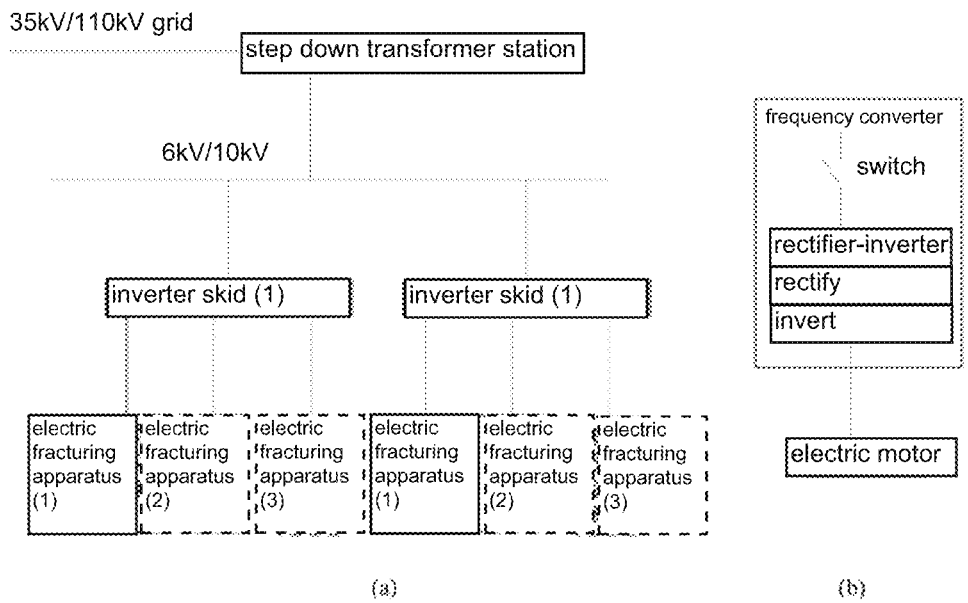
FIG. 15 illustrates the structure of a frequency converter in the prior art, an electric motor whose voltage and frequency are regulated by the frequency converter, and a connection mode between an existing electric-driven fracturing apparatus including the electric motor and a power supply system.
Figure 16A:
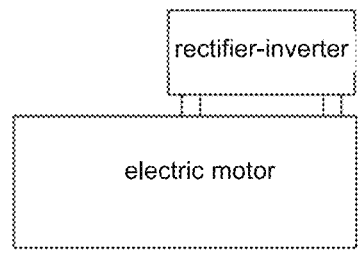
FIG. 16A to 16D illustrate schematic diagrams of the integrated frequency-converting speed-varying machine according to some embodiments of the present disclosure.
Figure 16B:
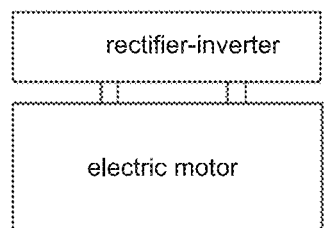
Figure 16C:
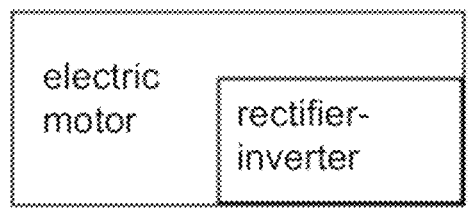
Figure 16D:
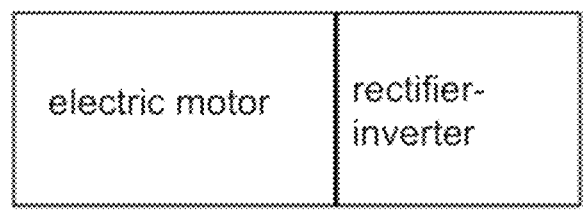

However, in the existing electric-driven fracturing apparatus, for example, a frequency converter as shown in (b) in FIG. 15 is usually used to perform voltage transformation and speed regulation to drive the electric motor. The inverter includes a power supply switch, a rectifier transformer, and functional components such as a rectifier part and an inverter part. At present, the power supply voltage of the power grid is relatively high, and the output voltage of the frequency converter is usually inconsistent with the input voltage, so the above-mentioned rectifier transformer needs to be provided in the frequency converter to adjust the voltage. As a result, since the inverter needs to include a rectifier transformer, the volume and weight are large, so the inverter can only be placed separately from the motor. Therefore, more external wiring is required between the motor and the inverter, which occupies a large area, and the well site layout is relatively complicated. Moreover, because each frequency converter and motor are independent of each other, for example, as shown in (a) in FIG. 15, in the actual application site of the existing electric drive fracturing apparatus, in order to facilitate the layout and transportation, it is necessary to use at least one inverter skid (inverter skid (1), inverter skid (2) . . . ), at least one inverter is centrally installed on each inverter skid, and at least one existing inverter electric fracturing apparatus (electric fracturing apparatus (1), electric fracturing apparatus (2), electric fracturing apparatus (3) . . . ), is connected to the power supply via a frequency converter skid system. This layout, which requires the use of frequency converter skids, further leads to an expansion of the floor space and complexity of the well site layout.

Because the existing electric-driven fracturing apparatus is not highly integrated and occupies a large area, there is often not enough area to place the various components of the existing electric-driven fracturing apparatus during the construction of the well site, or even if it can be placed. There is also an expensive implementation cost. In addition, different well sites have different site conditions, and there is no electric fracturing apparatus with a high degree of integration that can be easily adapted to various well site conditions.

The present disclosure provides an equipment layout of a fracturing apparatus with a high degree of integration, which adopts an integrated frequency conversion speed regulation machine and integrates the integrated frequency-converting speed-varying machine with the fracturing apparatus. Piston pumps are integrally mounted together. The frequency conversion and speed regulation all-in-one machine itself can withstand voltage by adjusting parameters, so it does not need to be additionally equipped with a rectifier transformer for voltage adjustment, but can be directly connected to a high-voltage power supply system. Further, the equipment layout of the present disclosure obtains the equipment layout of the fracturing apparatus with a high degree of integration by integrating such a frequency conversion speed regulation integrated machine with the plunger pump of the fracturing apparatus. Such fracturing apparatus is convenient and universal for most well sites.

In order to achieve the above objective, the fracturing apparatus driven by an integrated frequency conversion and speed regulation machine according to various embodiments of the present disclosure includes an integrated frequency conversion and speed regulation machine and a plunger pump. The integrated frequency-converting speed-varying machine includes: a drive device for providing driving force; and an inverter integrally mounted on the drive device. The inverter supplies power to the drive device. The plunger pump is integrally installed with the integrated frequency-converting speed-varying machine, and the plunger pump is mechanically connected to and driven by the drive device of the integrated frequency-converting speed-varying machine.

The wellsite layout of some embodiments of the present disclosure includes: a plurality of the above-described fracturing apparatuses; and a control room. A centralized control system is provided in the control room for centralized control of each of the plurality of fracturing apparatuses. Additionally or alternatively, power provided from the power supply system is centrally supplied to each of the plurality of fracturing apparatuses via the control room.

Integrated frequency-converting speed-varying machine adopted in the equipment layout of the fracturing apparatus of the present disclosure does not need to be additionally equipped with a rectifier transformer for voltage adjustment, so it has small size and light weight. The equipment layout of the present disclosure can reduce the floor space of the equipment and optimize the equipment layout of the well site by integrating such an integrated frequency-converting speed-varying machine and the plunger pump of the fracturing apparatus on a skid. The obtained equipment layout has a high integration, and is more convenient, more economical, and environmentally friendly.

1. Integrated Frequency-Converting Speed-Varying Machine

FIGS. 16A to 16D are schematic diagrams of the integrated frequency-converting speed-varying machine according to some embodiments of the present disclosure, respectively. As shown in FIGS. 16A to 16D, the integrated frequency-converting speed-varying machine according to some embodiments of the present disclosure includes a motor and a rectifier inverter integrally mounted on the motor.

An electric motor (also called a motor) refers to an electromagnetic device that realizes the conversion or transfer of electrical energy according to the law of electromagnetic induction. Its main function is to generate driving torque, which can be used as a power source for well site equipment. The electric motor may be an AC motor. In one example, the bottom surface of the motor may be arranged on a base (or carrier). When the frequency conversion and speed control integrated machine is placed in the working scene, the above-mentioned base (or carrier) is in contact with the ground, so as to enhance the stability of the frequency conversion and speed control all-in-one machine.

The rectifier inverter is electrically connected to the motor through the power supply cable. Usually, when the rectifier inverter performs frequency conversion on the alternating current from the power supply system, the alternating current is first converted into direct current (that is, "rectification"), and then the direct current is converted into variable frequency alternating current (that is, "inverting"), which is then supplied to the motor.

The motor used in the present disclosure has a certain voltage resistance by adjusting its own parameters so as to be compatible with the power supply system, so there is no need to use a rectifier transformer to adjust the voltage, and only a rectifier inverter needs to be used for frequency conversion and/or pressure adjustment. Such a rectifier inverter can be directly integrated on a motor because its volume and weight are much smaller than those of the existing frequency converter including a rectifier transformer. The rectifier inverter and the electric motor may each have a casing (an example of the electric motor 10 and the casing 12 for accommodating the electric motor 10 will be described in detail later with reference to, e.g., FIG. 23, etc.). The first housing of the integrated frequency-converting speed-varying machine is integrally (tightly) mounted on the bottom surface (in the case where the bottom surface does not fully contact the carrier or base), the side surface (e.g., with the motor, the extension direction of the transmission output shaft is perpendicular to either of the two side surfaces) or the top surface, whereby the output wire of the rectifier inverter can be directly connected to the inside of the motor, which effectively shortens the wiring. The wiring of the rectifier inverter and the motor is inside the second housing of the motor, which can reduce the disturbance of the well site. For example, the first casing of the rectifier inverter is installed on the top surface of the second casing of the motor, whereby the top surface of the second casing plays a fixed support role for the rectifier inverter, and the rectifier inverter does not require an independent floor space, and this installation method greatly saves installation space and makes the overall equipment more compact.

In some embodiments, the shapes of the first housing of the rectifier inverter and the second housing of the motor may be cylindrical bodies such as a rectangular parallelepiped, a cube, or a cylinder, and their shapes are not limited in the embodiments of the present disclosure. When the shape of the first casing and the second casing is a cuboid or a cube, it is favorable to fix the first casing of the rectifier inverter on the second casing of the motor, so as to enhance the stability of the whole device. The first housing may be directly connected to the second housing by means of bolts, screws, riveting or welding, or may be fixedly connected to the second housing via a mounting flange. A plurality of holes or a plurality of terminals may be arranged in the connection surfaces of both the first housing and the second housing for allowing cables to pass through, and the cables may include a power supply for electrically connecting the rectifier inverter to the motor a cable is used to directly output the AC power after frequency conversion and/or voltage regulation by the rectifier inverter to the motor, thereby driving the motor to run at an adjustable speed.

The embodiments of the present disclosure do not limit the connection position and connection method between the rectifier inverter (or its casing) and the motor (or its casing), as long as they can be integrally and fixedly installed together.

Rectifier inverter and the motor are integrated in the integrated frequency-converting speed-varying machine of the embodiments of the present disclosure, but the rectifier transformer is not included. Therefore, only the rectifier inverter can be provided on the motor, which reduces the overall volume and weight of the integrated frequency-converting speed-varying machine.

2. Fracturing Apparatus Driven by Frequency Conversion Speed Control Integrated Machine 2.1 Structure of Fracturing Apparatus 2.1.1 Overall Equipment Layout FIG. 3 is a perspective view of the overall layout of a fracturing apparatus including and driven by an integrated frequency-converting speed-varying machine according to a second embodiment of the present disclosure. FIGS. 18A and 18B are a schematic side view and a schematic top view of the overall layout of the fracturing apparatus shown in FIG. 17, respectively.

Figure 17:
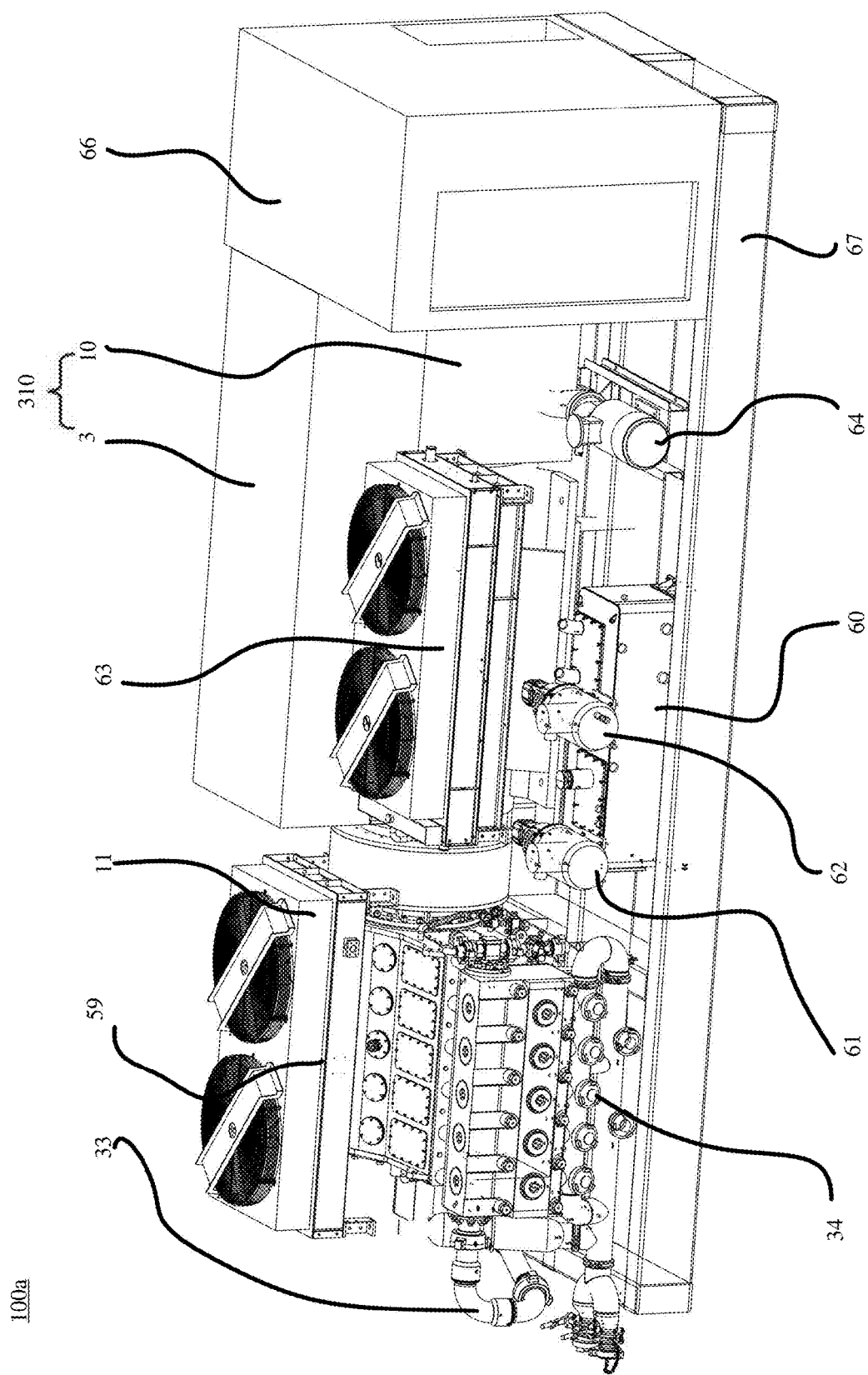
FIG. 17 illustrates a perspective view of the overall layout of a fracturing apparatus including and driven by an integrated frequency-converting speed-varying machine according to some embodiments of the present disclosure.
Figure 18A:
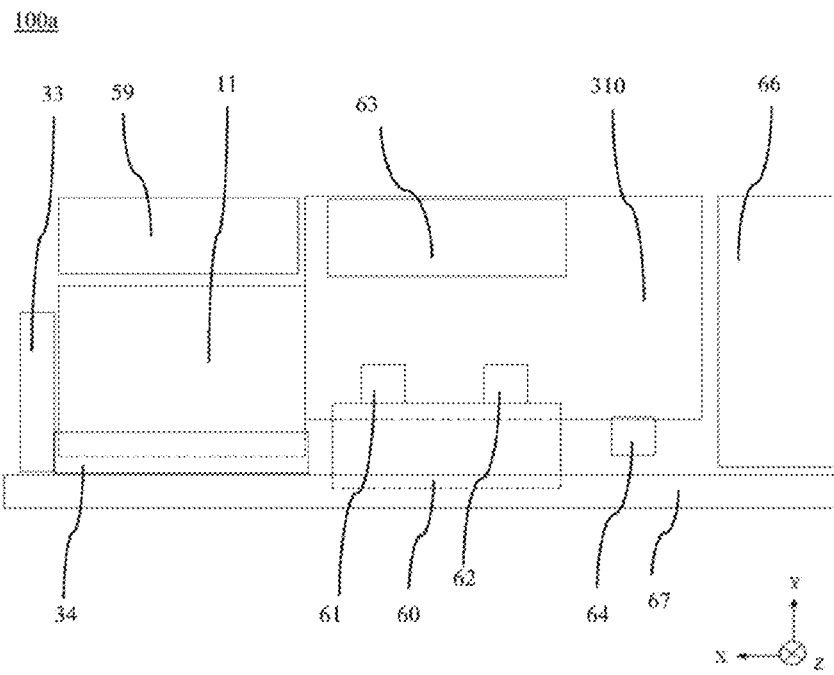
FIGS. 18A and 18B respectively illustrate a schematic side view and a schematic top view of the overall layout of the fracturing apparatus shown in FIG. 17 according to some embodiments of the present disclosure.
Figure 18B:
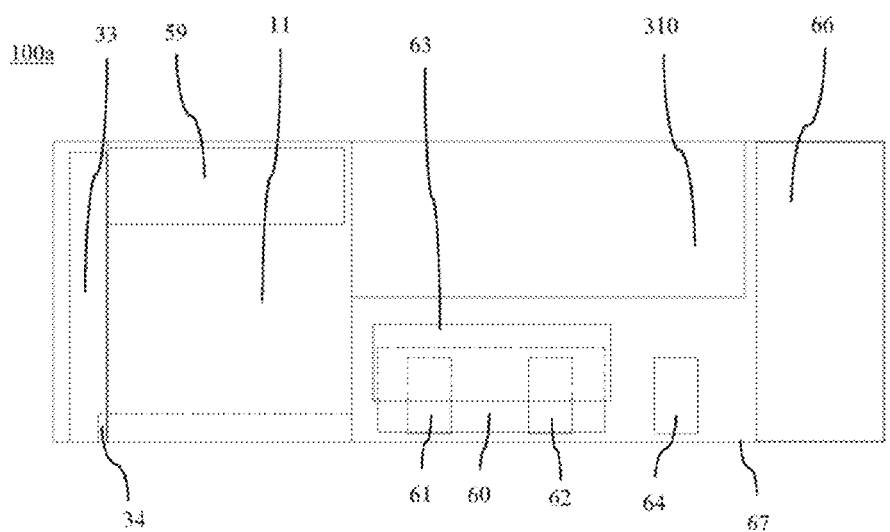

As shown in FIGS. 17, 18A, and 18B, the fracturing apparatus 100a includes a carrier 67. An integrated frequency-converting speed-varying machine 310 mounted on the carrier 67. The plunger pump 11 of the speed-varying machine 310. The integrated frequency-converting speed-varying machine 310 includes a motor 10 and a rectifier inverter 3 integrally mounted on the motor 10. The transmission output shaft of the electric motor 10 in the integrated frequency-converting speed-varying machine 310 may be directly connected to the power input shaft of the plunger pump 11 of the fracturing apparatus 100a. The two of them can be connected by splines, for example, the transmission output shaft of the electric motor 10 can have internal splines or external splines or flat keys or conical keys, and the power input shaft of the plunger pump 11 can have the above-mentioned keys. External or internal splines or flat or tapered keys. The transmission output shaft of the electric motor 10 may have a casing for protection, and the power input shaft of the plunger pump 11 may have a casing for protection are fixedly connected together. The flange can be in other forms such as round or square.

In FIGS. 17 and 18A, it is assumed that the direction in which the transmission output shaft of the electric motor 10 extends horizontally outwards (the direction from the speed-varying machine 310 toward the plunger pump 11) is the X direction, and the upward direction perpendicular to the X direction is the Y direction, and the inward direction perpendicular to both the X direction and the Y direction and perpendicular to the paper surface of FIG. 18A is the Z direction.

The fracturing apparatus 100a may also include a control cabinet 66. For example, the control cabinet 66 is arranged at one end of the integrated variable frequency speed-varying machine 310 in the —X direction, and the plunger pump 11 of the fracturing apparatus 100a is arranged at the other end of the integrated variable frequency speed-varying machine 310 in the X direction at the end. The present disclosure does not limit the relative positions of the control cabinet 66, the integrated frequency-converting speed-varying machine 310 and the plunger pump 11, as long as their layout can enable the fracturing apparatus 100a to be highly integrated. The power transmitted from the power supply network, etc., can be directly supplied to the variable frequency speed regulation integrated machine, or can be provided to the variable frequency speed regulation integrated machine through the control cabinet (without being processed by the control cabinet or after being processed by the control cabinet). For example, the control cabinet 66 may control the fracturing apparatus 100a and may power any electrical consumers in the fracturing apparatus 100a. For example, a high-voltage switchgear and an auxiliary transformer can be integrated in the control cabinet 66. The auxiliary transformer in the control cabinet 66 can adjust the voltage of the electric power transmitted from the power grid or the like and then provide it to various electric devices in the fracturing apparatus. Alternatively, the auxiliary transformer in the control cabinet 66 can also adjust the voltage of the electric power transmitted from the power supply network, etc., and then provide it to auxiliary equipment other than the integrated frequency-converting speed-varying machine in the fracturing apparatus. As an example, the auxiliary transformer can output a low voltage of 300V~500V (AC) to supply power to auxiliary electrical devices such as a lubrication system, a heat dissipation system, and the like in the fracturing apparatus 100a.

Auxiliary electrical devices in the fracturing apparatus 100a include, for example: a lubrication system motor, a heat dissipation system motor, a control system, and the like.

As described in the foregoing embodiments, the integrated frequency-converting speed-varying machine 310 does not need to use a rectifier transformer. The rated frequency of the integrated frequency-converting speed-varying machine 310 can be 50 Hz or 60 Hz, and the rated frequency is the same as the power supply frequency of a power supply system such as a power supply network. It simplifies the power supply method and is more adaptable.

The whole fracturing apparatus 100a adopts the integrated frequency-converting speed-varying machine 310, the external wiring of the fracturing apparatus 100a can be directly connected to the high-voltage power supply system without the need for a rectifier transformer for voltage adjustment. The plunger pump 11 of the fracturing apparatus 100a is driven by the integrated frequency-converting speed-varying machine 310 to pump the fracturing fluid underground.

Low pressure manifold 34 may be provided at one side of the plunger pump 11 in the —Z direction for supplying the fracturing fluid to the plunger pump 11. A high pressure manifold 33 may be provided at one end of the plunger pump 11 in the X direction for discharging fracturing fluid. The fracturing fluid enters the plunger pump 11 through the low pressure manifold 34, and is then pressurized by the movement of the plunger pump 11, and then is discharged to the high pressure header outside the plunger pump 11 through the high pressure manifold 33.

The fracturing apparatus 100a may further include: a lubrication system; a lubricating oil cooling system; a cooling liquid cooling system, and the like. The lubricating system includes, for example: a lubricating oil tank 60; a first lubricating motor and a lubricating pump group 61; and a second lubricating motor and a lubricating pump group 62 and the like. The lubricating oil cooling system includes, for example, a lubricating oil radiator 59 and the like. The cooling liquid cooling system includes, for example: a cooling liquid radiator 63; and a water circuit motor and a water circuit pump group 64 and the like.

Figure 19A:
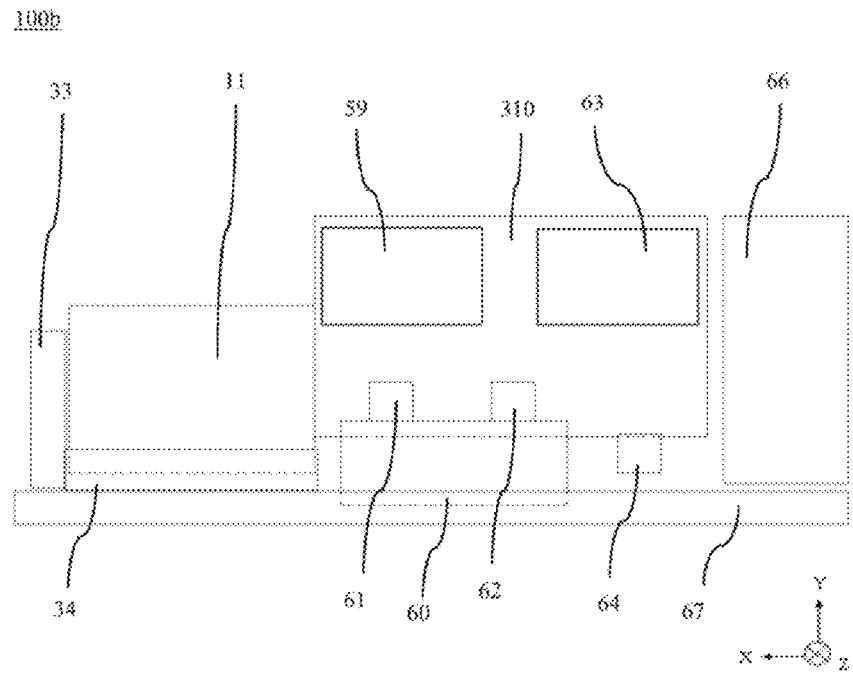
FIGS. 19A and 19B respectively illustrate a schematic side view and a schematic plan view as a modification of FIG. 18A and FIG. 18B according to some embodiments of the present disclosure.
Figure 19B:
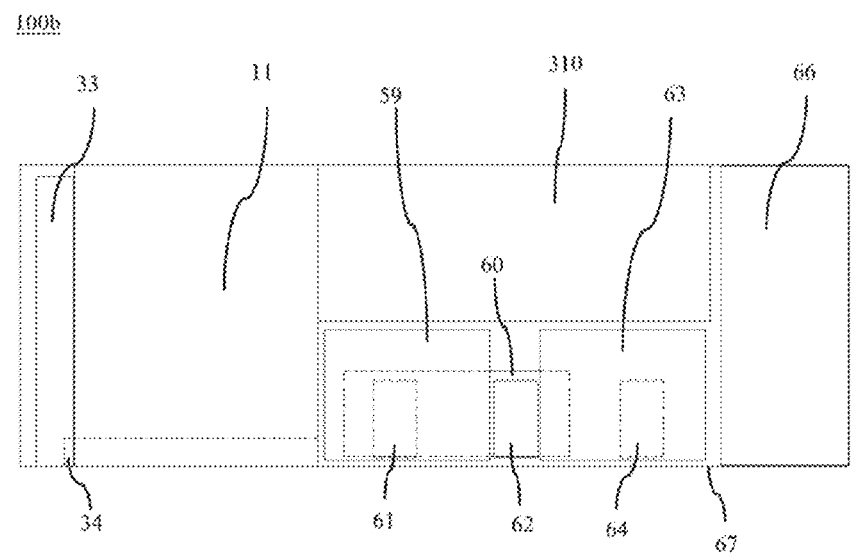

FIGS. 19A and 19B are a schematic side view and a schematic plan view, respectively, as a modification of FIG. 18A and FIG. 18B. The fracturing apparatus 100b in FIGS. 19A and 19B is different from the fracturing apparatus 100a in FIGS. 18A and 18B in that, from a top view, the lubricating oil radiator 59 is arranged on the plunger pump 11 in FIG. 18B. The side in the Z direction and the cooling liquid radiator 63 is arranged at the side in the —Z direction of the integrated frequency-converting speed-varying machine 310, and in FIG. 19B the lubricating oil radiator 59 and the cooling liquid radiator 63 are installed. They are arranged approximately side by side at the side of the integrated frequency-converting speed-varying machine 310 in the –Z direction. Other aspects of the fracturing apparatus 100b are the same as those of the fracturing apparatus 100a, and will not be repeated here. Hereinafter, the fracturing apparatus 100a and the fracturing apparatus 100b are both referred to as the fracturing apparatus 100 when no distinction is required.

In addition, the above-mentioned lubricating system, lubricating oil cooling system, and cooling liquid cooling system may be arranged at any suitable position on the carrier, for example, may be arranged at the top or side of the plunger pump 11 or the top of the integrated frequency-converting speed-varying machine 310 or at the side, as long as the location enables a high level of integration in the device layout. In addition, the above-mentioned lubricating oil heat dissipation system is used to provide heat dissipation for the lubricating oil. The above cooling liquid heat dissipation system is used to provide heat dissipation for the plunger pump 11 and/or the integrated frequency-converting speed-varying machine 310. The above-mentioned lubricating oil heat dissipation system and cooling liquid heat dissipation system may be at least partially replaced with an air-cooled heat dissipation system as needed. In addition, the above-mentioned lubricating oil radiator and coolant radiator may be a horizontal radiator, a vertical radiator or a square radiator as shown in FIGS. 20A to 22, and the air flow paths and the coolant or lubricating oil flow inside them. The paths are not limited to the examples shown in the drawings, but may be appropriately changed or set according to actual needs. The heat dissipation system of the integrated frequency-converting speed-varying machine 310 will be described with specific examples later with reference to FIGS. 23 to 30.

2.1.2 Lubrication System

As mentioned above, the lubricating system of the fracturing apparatus 100 includes, for example: a lubricating oil tank 60; a first lubricating motor and lubricating pump set 61; and a second lubricating motor and lubricating pump set

62. The lubrication system can be divided into a high-pressure lubrication system and a low-pressure lubrication system. The high-pressure lubrication system is used to provide lubrication to the power end of the plunger pump, and the low-pressure lubrication system is used to provide lubrication to the gearbox and the like. The first lubricating motor and lubricating pump set 61 and the second lubricating motor and pump set 62 can be used in a high-pressure lubrication system and a low-pressure lubrication system, respectively. The lubricating oil tank 60 may be arranged on the carrier frame 67, for example, at the side of the integrated frequency-converting speed-varying machine 310, or at other positions that facilitate the integrated layout of the equipment. Lubricating oil for the high pressure lubrication system and/or the low pressure lubrication system is stored in the lubricating oil tank 60.

2.1.3 Cooling System

As mentioned above, the heat dissipation system of the fracturing apparatus 100 includes, for example, a lubricating oil heat dissipation system, which is used to cool the lubricating oil at the power end of the plunger pump, so as to ensure the normal operating temperature of the plunger pump 11 during operation. The lubricating oil cooling system can be composed of a lubricating oil radiator, a cooling fan, and a cooling motor, wherein the cooling fan is driven by the cooling motor. For example, the lubricating oil cooling system may be installed at the top or side of the plunger pump 11, and may also be installed at the top or the side of the integrated frequency-converting speed-varying machine 310. During the process of lubricating oil cooling, after the lubricating oil enters the interior of the lubricating oil radiator, the air is driven by the rotation of the blades of the cooling fan. The cooled lubricating oil enters the inside of the plunger pump 11 to cool the power end of the plunger pump.

As mentioned above, the heat dissipation system of the fracturing apparatus 100 further includes, for example, a cooling liquid heat dissipation system. The integrated frequency-converting speed-varying machine 310 will generate heat during operation. In order to avoid damage to the equipment caused by the heat during long-term operation, cooling liquid may be used for cooling. The coolant cooling system has a coolant radiator and a radiator fan, as well as drives such as a motor and a pump for pumping the coolant. The coolant cooling system can also be replaced with air cooling, in which case a cooling fan is required.

For example, the cooling liquid cooling system may be installed at the top or side of the plunger pump 11, or may be installed at the top or the side of the integrated frequency-converting speed-varying machine 310. For example, when dissipating heat from the integrated frequency-converting speed-varying machine 310, the cooling medium (e.g., anti-freeze liquid, oil, water, etc.) is driven by the water circuit motor and the water circuit pump group (the water circuit motor drives the water pump, and the water pump can be a vane pump, such as a centrifugal pump or an axial flow pump or a multi-stage pump, etc.) to circulate inside the integrated frequency-converting speed-varying machine 310 and the coolant radiator 63. When the cooling medium enters the interior of the cooling liquid radiator 63, the air is driven by the rotation of the blades of the radiator fan, and the air exchanges heat with the cooling medium inside the cooling liquid radiator to reduce the temperature of the cooling medium. The cooled cooling medium entering into the integrated frequency-converting speed-varying machine 310 to conduct heat exchange with the integrated frequency-converting speed-varying machine 310, thereby reducing the temperature of the integrated frequency-converting speed-varying machine 310, and ensuring that the operating temperature of the integrated frequency-converting speed-varying machine 310 is normal.

Figure 20A:
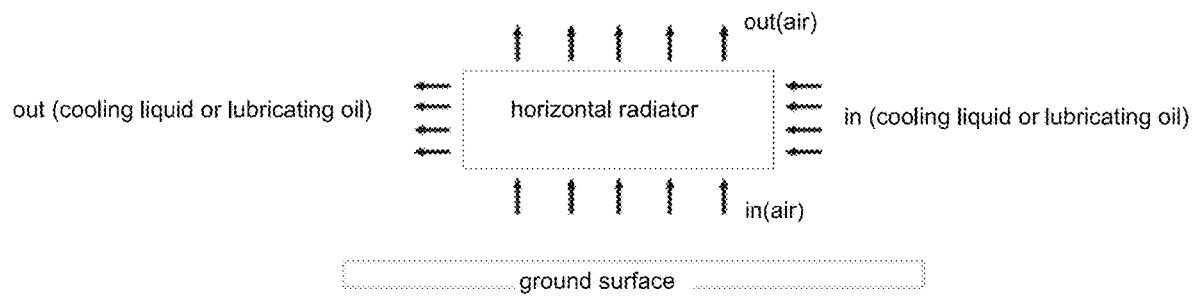
FIGS. 20A and 20B respectively illustrate a schematic working diagram of an example of a horizontal heat sink according to some embodiments of the present disclosure.
Figure 20B:
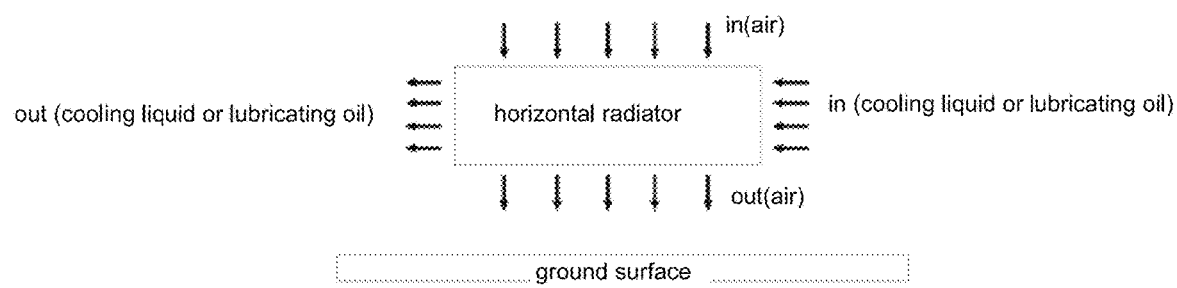
Figure 21A:
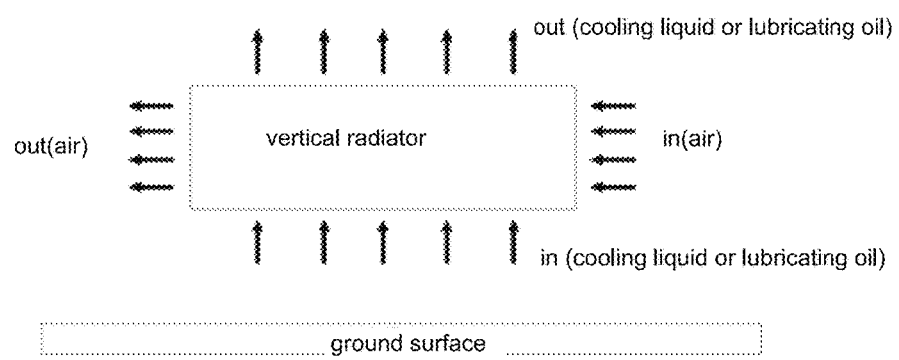
FIGS. 21A and 21B respectively illustrate a schematic working diagram of an example of a vertical heat sink according to some embodiments of the present disclosure.
Figure 21B:
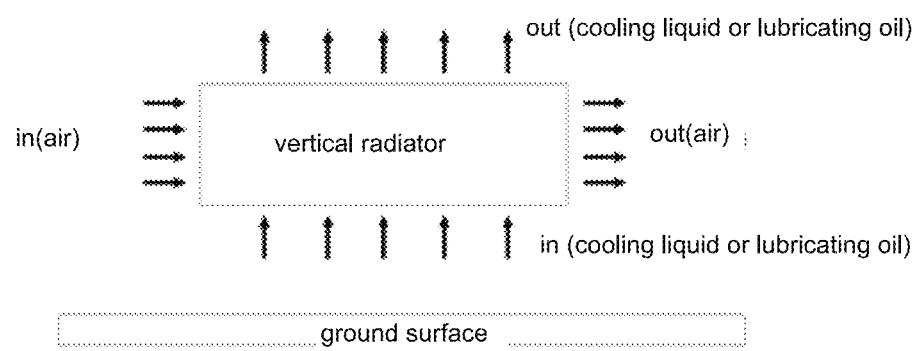
Figure 22:
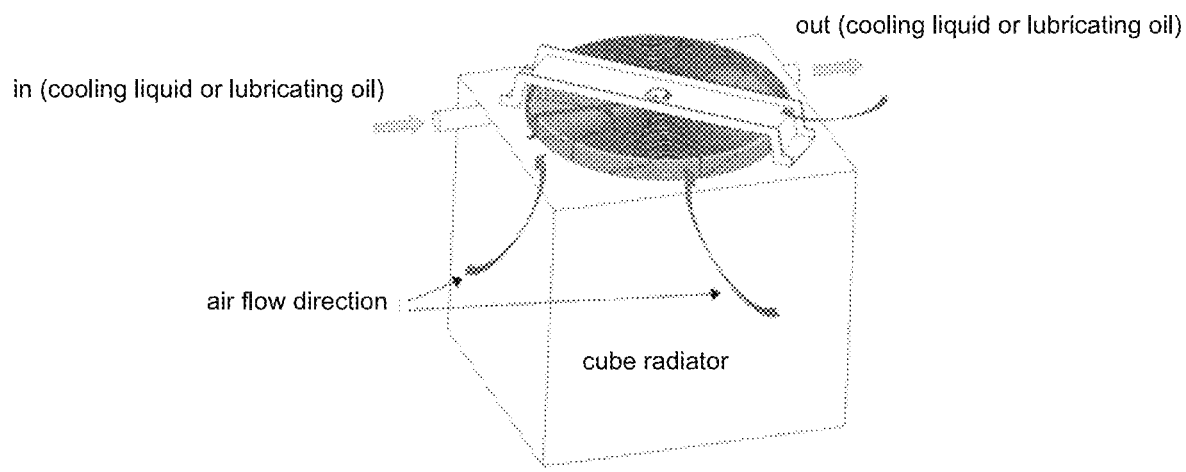
FIG. 22 illustrates a schematic working diagram of an example of a square heat sink according to some embodiments of the present disclosure.

FIGS. 20A and 20B respectively show a working schematic diagram of an example of a horizontal radiator, the shape of the horizontal radiator and the flow paths of the air and coolant medium (water or oil, etc.) are not limited to the examples shown in the FIGS. 21A and 21B respectively show a working schematic diagram of an example of a vertical radiator, the shape of the vertical radiator and the flow paths of air and coolant medium (water or oil, etc.) are not limited to the examples shown in the figures. FIG. 22 shows a schematic working diagram of an example of a square heat sink. For a square radiator, the flow direction of the air is, for example, that the air enters the square radiator from the outside via at least one vertical side (e.g., 4 sides), and is then discharged through the top. For example, the inlet and outlet ends of the cooling pipes for circulating coolant or lubricating oil may be located in the upper part (near the top) of the square radiator. The present disclosure is not limited to this example. The cooling liquid radiator and the lubricating oil radiator of the present disclosure can be a horizontal radiator, a vertical radiator, or a square radiator.

The following describes an example of a specific arrangement of the integrated frequency-converting speed-varying machine 310 and a heat dissipation system that provides heat dissipation.

Figure 23:
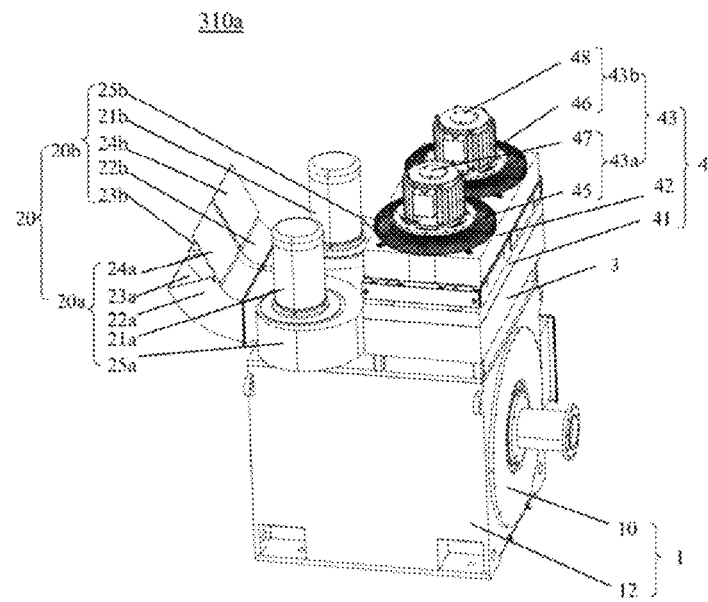
FIG. 23 illustrates a schematic perspective view of an integrated frequency-converting speed-varying machine and a heat dissipation system thereof according to some embodiments of the present disclosure.
Figure 24:
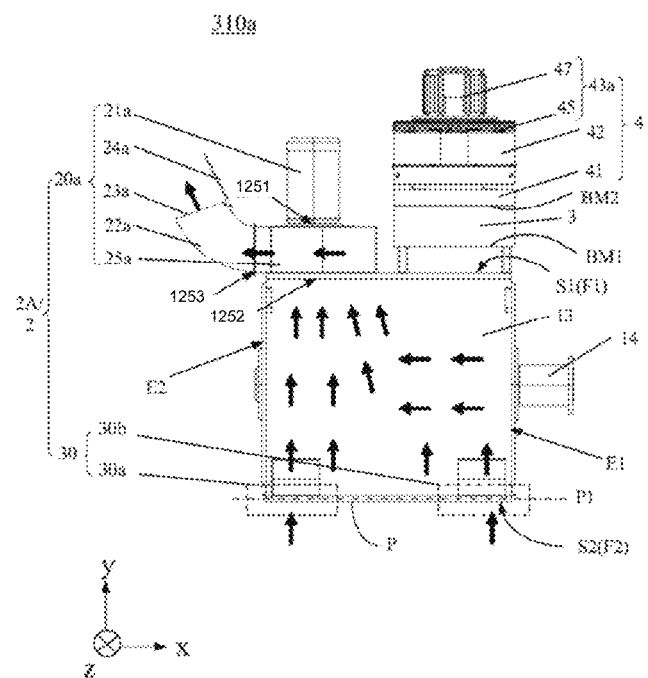
FIG. 24 illustrates a schematic structural diagram of the integrated frequency-converting speed-varying machine and its heat dissipation system shown in FIG. 23 according to some embodiments of the present disclosure.

FIG. 23 is a schematic perspective view of an integrated frequency-converting speed-varying machine and a heat dissipation system thereof according to some embodiments of the present disclosure. FIG. 24 is a schematic structural diagram of the integrated frequency-converting speed-varying machine and its heat dissipation system shown in FIG. 23.

As shown in FIG. 23 to FIG. 24, the integrated frequency-converting speed-varying machine 310a provided in this embodiment includes a drive device 1, a motor cooling device 2 (in this example, only an air-cooled cooling mechanism 2A is included), a rectifier inverter 3 and a rectifier Inverter cooling device 4. The drive device 1 includes an electric motor 10 and a housing 12 for accommodating the electric motor 10. The housing 12 defines a cavity 13 for accommodating the electric motor 10. The transmission output shaft 14 of the drive device 1 protrudes from the end cover of the housing 12 and extends in a first direction (e.g., the x-direction shown in FIG. 24). The housing 12 includes a first side S1 (upper side shown in FIG. 24) and a second side S2 (FIG. 24) opposing each other in a second direction perpendicular to the x direction (e.g., the y direction shown in FIG. 24) shown on the lower side). The housing 12 has a top surface F1 and a bottom surface F2 corresponding to the upper side and the lower side, respectively. The housing 12 also includes a third side S3 and a fourth side S4 opposite to each other in a third direction (e.g., the z-direction shown in FIG. 24), and accordingly, the housing 12 has a third side S3 and a fourth side S4 corresponding to the third side S3 and the fourth side S4, respectively. The two side surfaces F3, F4 of the four sides S4. The housing 12 also includes a first end E1 and a second end E2 opposite each other in the x-direction.

As shown in FIG. 23 and FIG. 24, the integrated frequency-converting speed-varying machine heat sink 4 is disposed on the side of the integrated frequency-converting speed-varying machine 3 away from the casing 12. That is, both the rectifier inverter 3 and the rectifier inverter heat sink 4 are disposed on the same side of the housing 12, and the rectifier inverter 3 is located between the housing 12 and the rectifier inverter heat sink 4. If the rectifier inverter 3 and the rectifier inverter heat sink 4 are respectively arranged on different sides of the housing 12, then the rectifier inverter 3 and the rectifier inverter heat sink 4 are located on different surfaces of the housing 12. The setting method will increase the overall volume of the all-in-one integrated frequency-converting speed-varying machine 310a. In addition, since the integrated frequency-converting speed-varying machine heat-dissipating device 4 uses cooling liquid to dissipate heat to the integrated frequency-converting speed-varying machine 3, when the two are located on different surfaces of the housing 12, the length of the cooling pipeline for providing the cooling liquid needs to be designed. If it is longer, this will affect the heat dissipation effect of the rectifier inverter heat dissipation device 4 on the rectifier inverter 3. In the integrated frequency-converting speed-varying machine 310a in one embodiment of the present disclosure, by arranging the rectifier inverter 3 and the rectifier inverter heat sink 4 to be located on the same side of the housing 12, not only the structure of the integrated frequency-converting speed-varying machine is further improved. It is compact and can also ensure the heat dissipation effect of the rectifier inverter heat dissipation device 4 on the rectifier inverter 3.

The rectifier inverter heat dissipation device 4 includes a cooling plate 41 (for example, when water is used as a cooling liquid medium, it is also called a water cooling plate), a cooling liquid storage assembly 42 and a fan assembly 43. The fan assembly 43 has a first fan assembly 43a and a second fan assembly 43b. The first fan assembly 43a includes a cooling fan 45 and a cooling motor 47, and the second fan assembly 43b includes a cooling fan 46 and a cooling motor 48. Using the two fan assemblies 43a and 43b can simultaneously cool the cooling liquid in the cooling liquid storage chamber 52 in the cooling liquid storage assembly 42, thereby enhancing the cooling effect. In addition, the air cooling mechanism 2A includes an air inlet assembly 30 and an air outlet assembly 20. The air intake assembly 30 is located at the bottom surface of the housing 12 and includes a first air intake assembly 30a and a second air intake assembly 30b. The bottom surface of the housing 12 is also provided with a protective net P covering at least the first air inlet assembly 30a and the second air inlet assembly 30 b respectively to prevent foreign debris from being sucked into the cavity 13. The air outlet assembly 20 includes a first air outlet assembly 20a and a second air outlet assembly 20b. The first air outlet assembly 20an includes: a cooling fan 21a, an air exhaust duct 22a and a fan volute 25a. The exhaust duct 22an is provided with an air outlet 23a and an air outlet cover 24a. The first side 1251 of the fan volute 25a is communicated with the cooling fan 21a, the second side 1252 is communicated with the cavity 13 of the housing 12, and the third side 1253 is communicated with the exhaust duct 22a. The second air outlet assembly 20b has a similar configuration to the first air outlet assembly 20a. The rectifier inverter 3 includes a first surface BM1 close to the casing 12 and a second surface BM2 away from the casing 12. That is, the first surface BM1 and the second surface BM2 are opposed to each other in a direction perpendicular to the transmission output shaft 14 (e.g., they direction shown in the figure). The cooling plate 41 is located on the second surface BM2 and is in direct contact with the second surface BM2.

Figure 25:
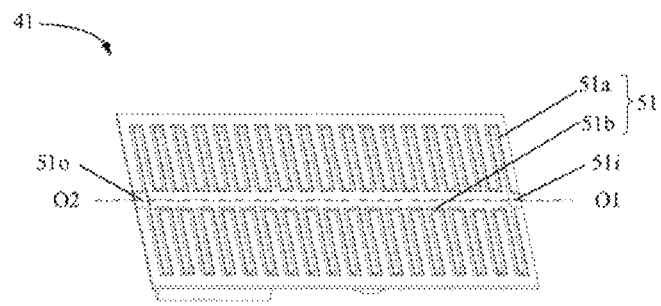
FIG. 25 illustrates a schematic structural diagram of a cooling plate in the heat dissipation system shown in FIG. 23 according to some embodiments of the present disclosure.

FIG. 25 is a schematic structural diagram of the cooling plate 41 in the heat dissipation system shown in FIG. 23. For example, as shown in FIG. 25, the cooling plate 41 includes, for example, cooling channels. The cooling channel includes at least one cooling pipe 51 (51a and 51b), a cooling channel inlet 51i and a cooling channel outlet 51o. When the cooling liquid flows in at least one cooling pipe of the cooling plate 41, heat can be exchanged for the rectifier inverter 3 located under the cooling plate 41, so as to achieve the purpose of cooling the rectifier inverter 3. In order to enhance the cooling effect, there is direct contact between the cooling plate 41 and the rectifier inverter 3. In one example, the cooling fluid includes water or oil, or the like. In the embodiment of the present disclosure, by allowing the two cooling pipes 51a, 51b to share one cooling channel inlet 51i and one cooling channel outlet 51o, not only the heat exchange area of the cooling plate can be increased, the cooling effect can be enhanced, but also the manufacturing of the cooling plate can be simplified process to reduce manufacturing costs. In some embodiments, the pipeline directions of the cooling pipe 51a and the cooling pipe 51b are S-shaped, zigzag, straight, etc., which is not limited in this embodiment of the present disclosure.

Figure 26:
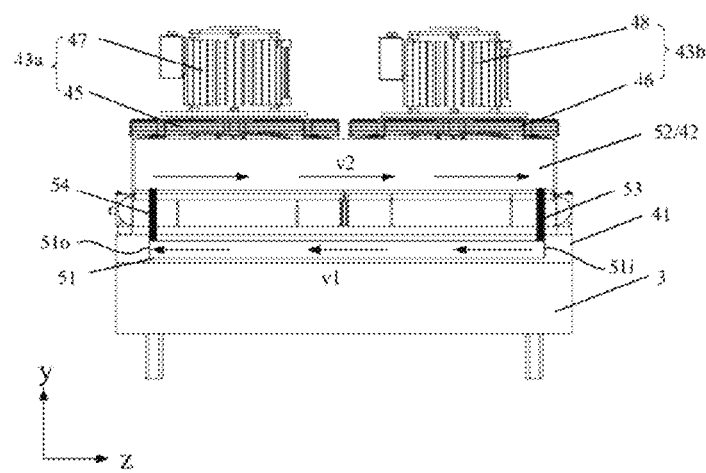
FIG. 26 illustrates a schematic structural diagram of the rectifier inverter and the rectifier inverter heat sink shown in FIG. 24 according to some embodiments of the present disclosure.

FIG. 26 is a schematic structural diagram of the rectifier inverter and the rectifier inverter heat sink shown in FIG. 24. For example, as shown in FIG. 26, the cooling liquid storage assembly 42 is provided on the side of the cooling plate 41 away from the rectifier inverter 3, and includes a cooling liquid storage chamber 52 communicating with the cooling plate 41 for storing the cooling liquid and the cooling liquid is supplied to the cooling plate 41. The right end of the cooling liquid storage chamber 52 is connected to the cooling channel inlet 51i through the first connecting pipe 53, and the left end of the cooling liquid storage chamber 52 is connected to the cooling channel outlet 51O through the second connecting pipe 54. In this embodiment, the cooling liquid flows from the cooling liquid storage chamber 52 into the cooling liquid storage chamber 52 through the first connecting pipe 53, and flows back from the cooling liquid plate 41 to the cooling liquid storage chamber 52 through the second connecting pipe 54 along the first moving direction v1. Next, the cooling liquid returned to the cooling liquid storage chamber 52 flows along the second moving direction v2, thereby achieving the purpose of recycling.

As described above, arranging the cooling plate 41, the cooling liquid storage assembly 42, and the fan assembly 43 in the rectifier inverter 4 in the embodiments of the present disclosure not only improves the heat dissipation effect on the rectifier inverter 3, but also reduces the heat dissipation effect on the rectifier inverter 3. The overall volume of the frequency conversion speed control integrated machine. In addition, because the cooling liquid is recyclable, it not only reduces the production cost, but also reduces the discharge of waste water and avoids environmental pollution.

Figure 27:
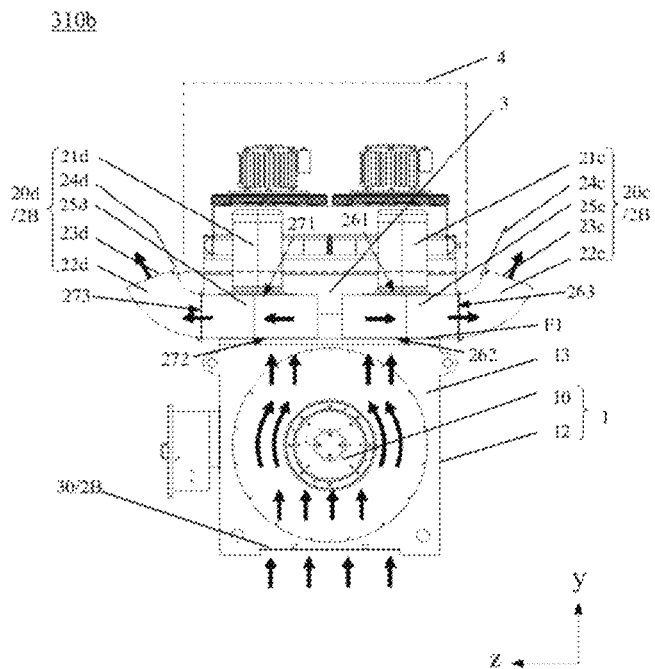
FIG. 27 illustrates a schematic structural diagram of an integrated frequency-converting speed-varying machine and a heat dissipation system thereof according to some embodiments of the present disclosure.

FIG. 27 is a schematic structural diagram of an integrated frequency-converting speed-varying machine 310b and a heat dissipation system thereof according to some embodiments of the present disclosure. The difference between the integrated frequency-converting speed-varying machine in FIG. 27 and FIG. 23 is that the motor cooling device 2 (i.e., the air-cooled cooling mechanism 2B) in FIG. 27 includes a third air outlet assembly 20c and a fourth air outlet assembly 20d to replace the first air outlet assembly 20a and the second air outlet assembly 20b. The third air outlet assembly 20c and the fourth air outlet assembly 20d have the same structure but different air outlet directions (as shown in FIG. 27, for example, air outlet 23d points to upper left direction and air outlet 23c points to the upper right direction). For other specific structures and setting manners, reference may be made to the descriptions of the foregoing embodiments, which will not be repeated here.

Figure 28:
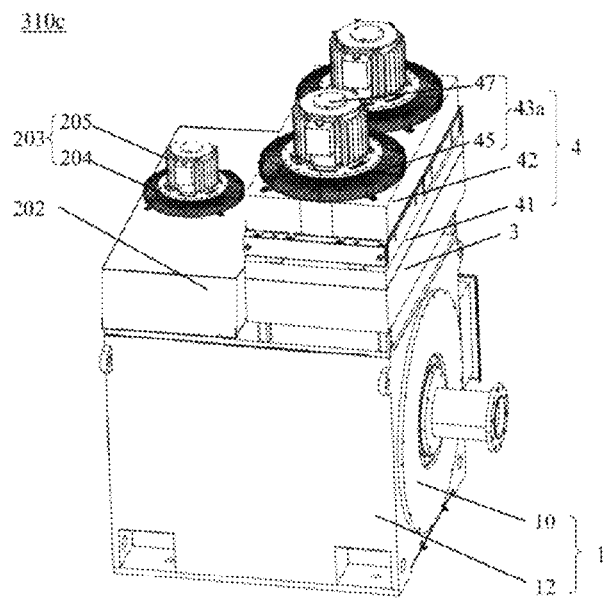
FIG. 28 illustrates a schematic perspective view of an integrated frequency-converting speed-varying machine and a heat dissipation system thereof according to some embodiments of the present disclosure.

FIG. 28 is a schematic perspective view of an integrated frequency-converting speed-varying machine and a heat dissipation system thereof according to yet another example of the first embodiment of the present disclosure. As shown in FIG. 14, the integrated frequency-converting speed-varying machine 310c provided in this embodiment includes a drive device 1, a motor cooling device 2, a rectifier inverter 3 and a rectifier inverter cooling device 4. The motor cooling device 2 includes a cooling liquid storage assembly 202 and a fan assembly 203, and the fan assembly 203 includes a cooling fan 204, and a cooling motor 205. The difference between the integrated frequency-converting speed-varying machine shown in FIG. 28 and FIG. 23 is that in the frequency conversion speed regulation integrated machine shown in FIG. 28, both the rectifier inverter cooling device 4 and the motor cooling device 2 adopt the cooling liquid cooling method, but the cooling of the two is the liquid cooling systems are independent, each occupying approximately half the area on the top surface F1 of the housing 12.

Figure 29:
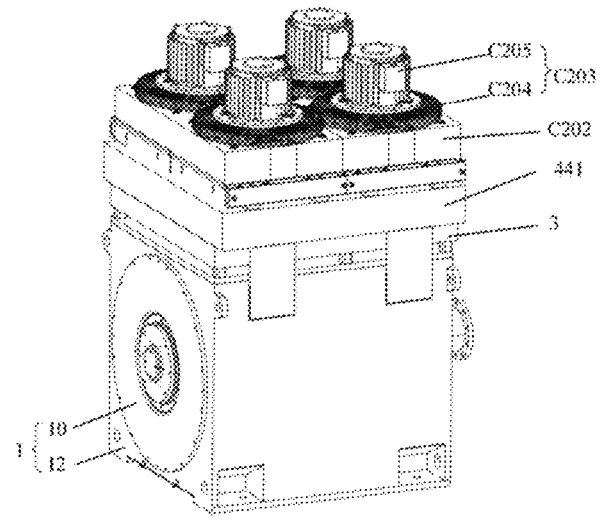
FIG. 29 illustrates a schematic perspective view of an integrated frequency-converting speed-varying machine and a heat dissipation system thereof according to some embodiments of the present disclosure.

FIG. 29 is a schematic perspective view of an integrated frequency-converting speed-varying machine and a heat dissipation system thereof according to still another example of the first embodiment of the present disclosure. As shown in FIG. 29, the integrated frequency-converting speed-varying machine 310d provided in this embodiment includes a drive device 1, a motor cooling device, a rectifier inverter 3 and a rectifier inverter cooling device. In some embodiments, both the rectifier inverter cooling device and the motor cooling device adopt the cooling liquid cooling method, and the two sets of cooling devices share the cooling plate 441, the cooling liquid storage component C202 and the fan component C203. The number of shared fan assemblies C203 may be one or more (four are shown in FIG. 29), and each fan assembly C203 includes a cooling fan C204 and a cooling motor C205.

Figure 30:
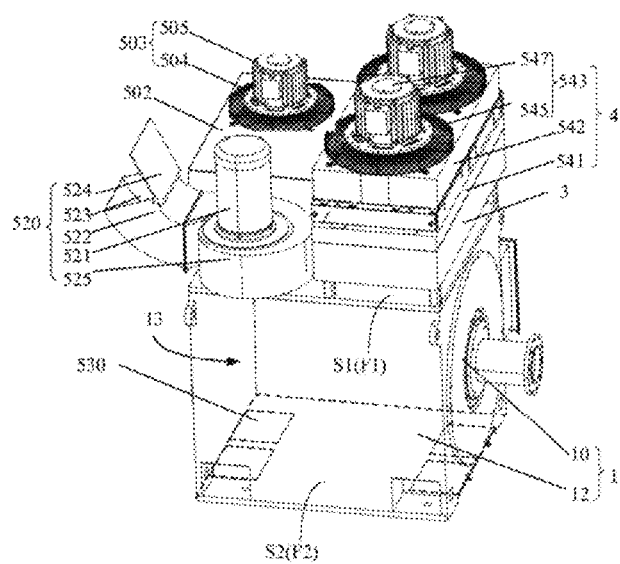
FIG. 30 illustrates a schematic perspective view of an integrated frequency-converting speed-varying machine and a heat dissipation system thereof according to some embodiments of the present disclosure.
Figure 31A:
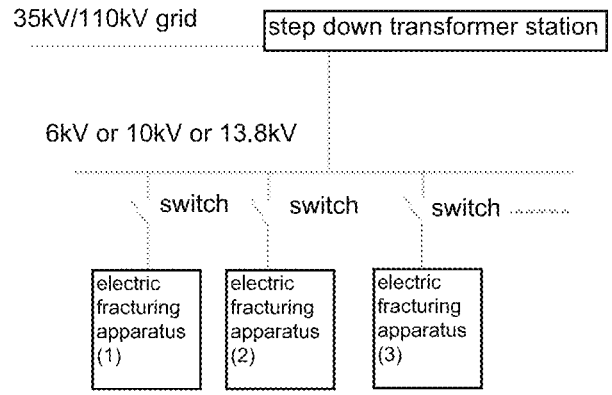
FIGS. 31A to 31F respectively illustrate the power supply modes of the fracturing apparatus including and driven by an integrated frequency-converting speed-varying machine according to some embodiments of the present disclosure.
Figure 31B:
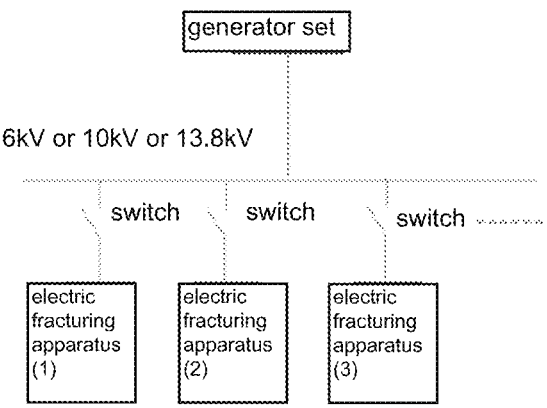
Figure 31C:
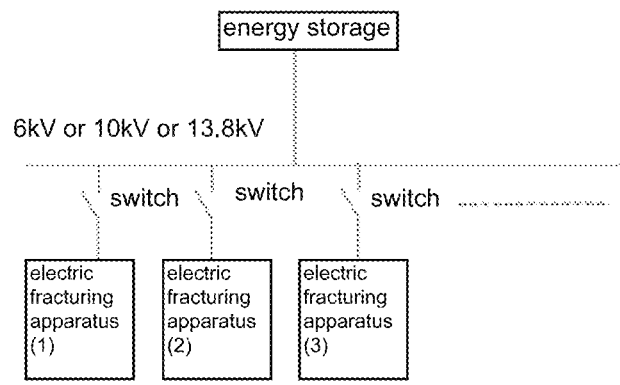
Figure 31D:
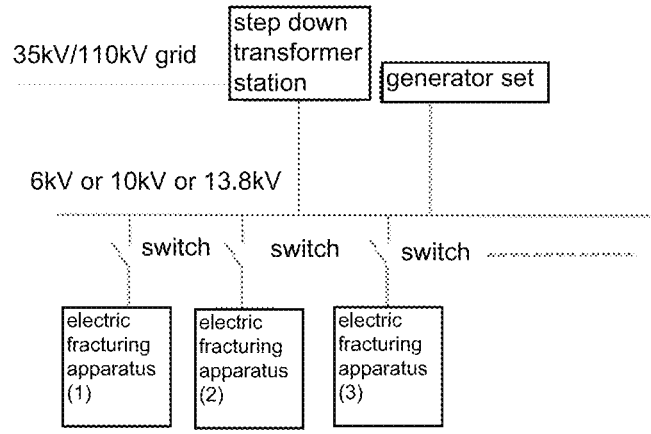
Figure 31E:
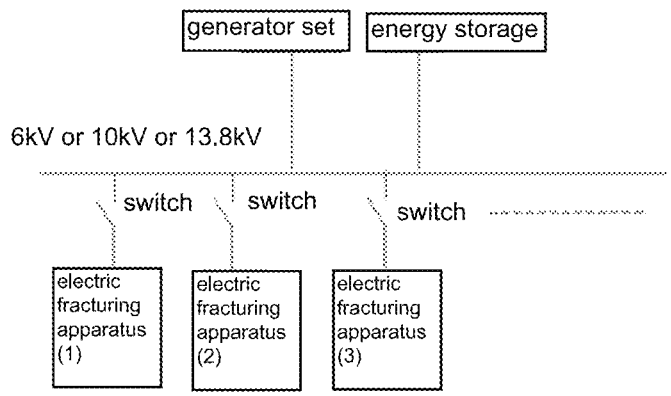
Figure 31F:
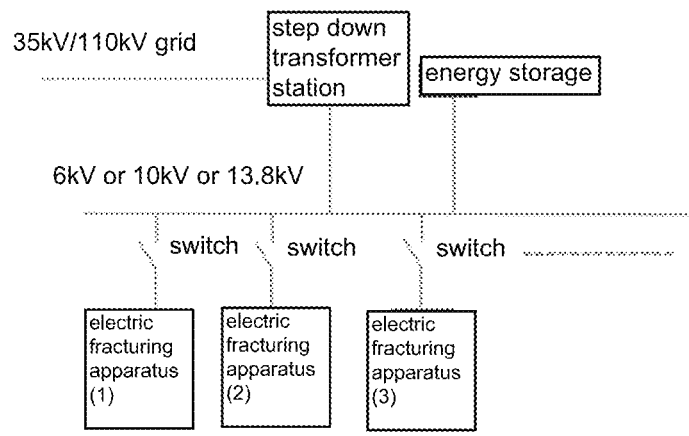

FIG. 30 is a schematic perspective view of an integrated frequency-converting speed-varying machine and a heat dissipation system thereof according to some embodiments of the present disclosure. As shown in FIG. 30, the integrated frequency-converting speed-varying machine 310e provided in this embodiment includes a drive device 1, a motor cooling device 2, a rectifier inverter 3 and a rectifier inverter cooling device 4. The difference between FIG. 30 and FIG. 23 is that the motor cooling device 2 in FIG. 30 dissipates heat to the drive device 1 in both air cooling and cooling liquid cooling methods. In this case, the motor cooling device 2 includes a fan. A cooling and cooling mechanism and a cooling liquid cooling mechanism, the air cooling mechanism includes an air outlet assembly 520 and an air inlet assembly 530, the cooling liquid cooling mechanism includes a cooling liquid storage assembly 502 and a fan assembly 503, and the fan assembly 503 includes a cooling fan 504 and a cooling fan Motor 505. Their specific structures are as described above. Compared to the cooling liquid storage assembly 202 of FIG. 28 which occupies approximately half of the top surface area, the cooling liquid storage assembly 502 in FIG. 30 occupies less space on the top surface F1 of the housing 12, so that it is beneficial to dispose the air outlet assembly 520 on the top surface F1 at the same time.

2.1.4 Power Supply and Control System

In terms of power supply form, the power grid is widely used in China (power supply voltage is mainly 10 kV/50 Hz distribution network), and foreign countries are more inclined to supply power from power generation equipment (for example, in the United States and other places, the common generator voltage is 13.8 kV/60 Hz). The integrated frequency-converting speed-varying machine of the present disclosure has pressure resistance after parameter adjustment, and can be directly connected to the power grid without going through a transformer for voltage transformation.

The fracturing apparatus 100 of the present disclosure, which includes and is driven by the integrated frequency-converting speed-varying machine 310, its power supply can come from the power grid, a generator, an energy storage device, or a combination thereof. FIGS. 31A to 31F respectively show the power supply modes of the fracturing apparatus including and driven by an integrated frequency-converting speed-varying machine according to some embodiments of the present disclosure.

Since the rectifier transformer is not arranged in the power supply path, the present disclosure makes the power supply simpler and more convenient, and because the link of the rectifier transformer is reduced, the wiring quantity is also reduced.

In order to meet the requirement of centralized control of equipment, the fracturing apparatus of the present disclosure can be provided with various instrumentation equipment, and the instrumentation equipment can directly or indirectly integrate the control systems of multiple devices of the fracturing apparatus of the present disclosure together, so as to achieve centralized control.

The fracturing apparatus 100 of the present disclosure may be provided with their own control systems. For example, an integrated frequency-converting speed-varying machine control system may be provided for the integrated frequency-converting speed-varying machine 3, and the integrated frequency-converting speed-varying machine control system may control the operation parameters of the integrated frequency-converting speed-varying machine 3. In addition, the plunger pump 11 may also include a plunger pump control system, and the plunger pump control system may adjust the operating parameters of the plunger pump. The fracturing apparatus 100 of the present disclosure may also include other devices for fracturing the wellsite and their corresponding control systems.

The fracturing apparatus 100 of the present disclosure may be provided with a centralized control system, which is connected in communication with the plunger pump control system, and the plunger pump control system is in communication with the rectifier and inverter control system. In this way, using the communication connection between the plunger pump control system and the rectifier inverter control system, the rectifier inverter 3 can be controlled by the plunger pump control system, and then the frequency of the alternating current output by the rectifier inverter can be controlled, so as to adjust the rotational speed of the electric motor 10 in the fracturing apparatus 100. Further, using the communication connection between the centralized control system and the plunger pump control system, the centralized control system can be indirectly communicated with the rectifier inverter control system, so that the rectifier inverter 3 can be controlled by the centralized control system and plunger pump 11, that is, to realize remote centralized control of electric drive fracturing operation.

For example, the centralized control system can realize the communication connection with the plunger pump control system, the rectifier inverter control system, and the control systems of other devices in the fracturing apparatus through a wired network or a wireless network.

For example, the remote centralized control of the electric fracturing operation of the present disclosure includes motor start/stop, motor speed adjustment, emergency stop, rectifier inverter reset, monitoring of key parameters (voltage, current, torque, frequency, temperature), etc. The fracturing apparatus of the present disclosure may include multiple plunger pump control systems and multiple rectifier inverter control systems. In the case where the plurality of plunger pump control systems and the plurality of rectifier and inverter control systems are all connected to the centralized control system, the present disclosure can control all the plunger pump devices and the rectifier and inverters through the centralized control system.

2.1.5 Skid Frame Assembly

Carrier is used to carry the above-mentioned parts of the fracturing apparatus of the present disclosure, and can be in the form of a skid, a semi-trailer, a chassis, or a combination thereof. The skid frame may have only one bottom plate, or only a frame without a directly connected vehicle body. FIG. 17 shows the carrier 67 at the bottom of the device. By using such a carrier, the fracturing apparatus integrated on one carrier can be easily transported and conveniently arranged into the well site.

Figure 33:
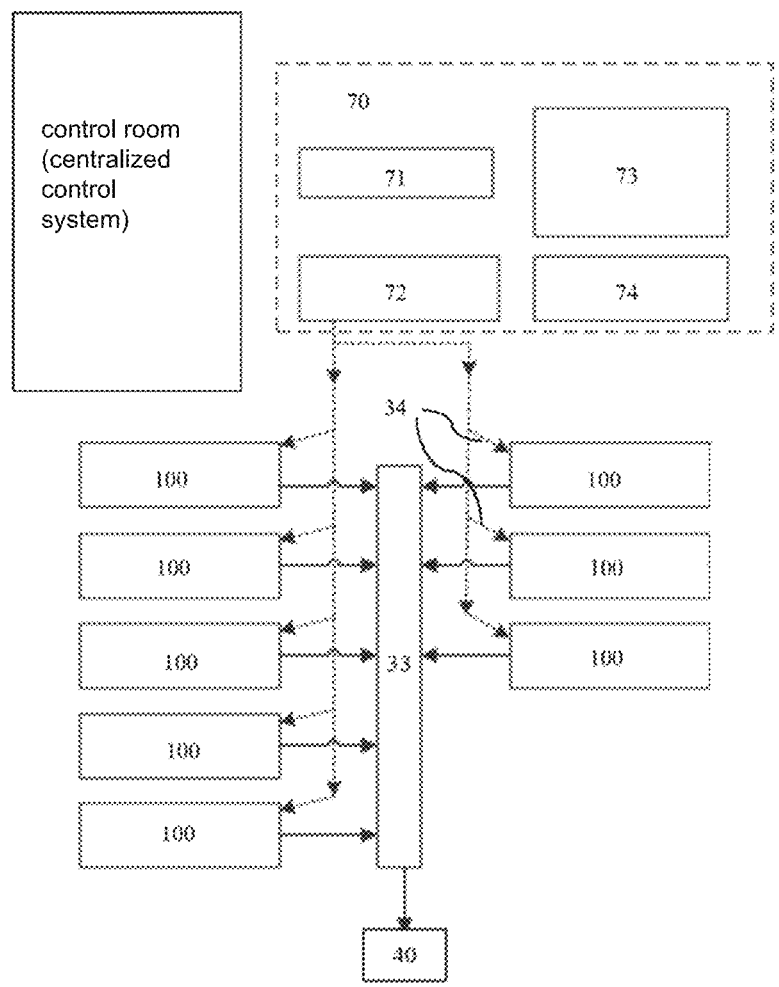
FIG. 33 illustrates an example of a wellsite layout of a fracturing apparatus according to some embodiments of the present disclosure.

In addition, for example, as shown in FIG. 33, the low-pressure manifolds 34 (shown by the dashed arrows) and the high-pressure manifolds 33 of multiple fracturing apparatus can be integrally arranged on a manifold skid (not shown), and the fracturing apparatus can share a high pressure manifold 33.

2.2 The Work and Effect of Fracturing Apparatus

The fracturing apparatus formed by adopting the integrated frequency-converting speed-varying machine of the present disclosure includes the integrated frequency-converting speed-varying machine, a plunger pump, and a control cabinet. The fracturing apparatus of the present disclosure integrates a frequency conversion speed regulation integrated machine and a plunger pump on a bearing frame. The fracturing apparatus can be started, controlled, and stopped through the control cabinet. The power transmitted from the power supply network can be directly supplied to the integrated frequency-converting speed-varying machine, or it can be provided to the frequency conversion speed regulation integrated machine through the control cabinet (after being processed by the control cabinet or not processed by the control cabinet). Alternatively, the auxiliary transformer provided in the control cabinet can adjust the voltage of the power transmitted from the power supply network and then provide it to various electrical devices in the fracturing apparatus. Alternatively, the auxiliary transformer provided in the control cabinet can adjust the voltage of the electric power transmitted from the power supply network and then provide it to auxiliary equipment other than the integrated frequency-converting speed-varying machine in the fracturing apparatus. The all-in-one variable frequency speed regulation machine driven by electricity provides the driving force to the power input shaft of the plunger pump through the transmission output shaft of the electric motor, so that the plunger pump works. Fracturing fluid is pumped underground.

In the integrated frequency-converting speed-varying machine of the fracturing apparatus of the present disclosure, the rectifier inverter is integrally installed on the motor, the casing of the rectifier inverter is closely installed with the casing of the motor, and the output of the rectifier inverter is the wire is directly connected to the inside of the motor. Since the wiring of the rectifier inverter and the motor is inside the motor, interference can be reduced. Especially when the rectifier inverter is integrated on the top of the motor, the rectifier inverter does not need to occupy an independent space, thus greatly saving installation space and making the overall device more compact.

In the fracturing apparatus of the present disclosure, the rated frequency of the integrated frequency-converting speed-varying machine is the same as the power supply frequency of the power supply network, so it has pressure resistance and does not require an additional transformer for voltage transformation. The external wiring of the fracturing apparatus of the present disclosure only needs to be connected to a set of high-voltage cables, so it can be directly connected to the high-voltage power supply grid, which simplifies the power supply mode and has stronger adaptability.

Transported and arranged in well sites under various conditions, it has high practicability and universality, and has low implementation cost during well site layout.

3. Connection and Drive Mode Between the Inverter and the Plunger Pump

As mentioned above, the integrated frequency-converting speed-varying machine 310 can be directly connected with the plunger pump 11. The internal transmission parts of both of them can be directly connected by means such as internal or external splines or flat or tapered keys. If each has a casing at the transmission part, the casings of both of them can be connected by a flange (the flange can be circular or square, etc.).

Considering the needs of different application places, the integrated frequency-converting speed-varying machine 310 and the plunger pump 11 may also adopt other connection methods, and then also be integrally installed on the carrier. FIG. 32A to 32E illustrate several examples of connection modes between the power input shaft of the plunger pump 11 and the transmission output shaft of the integrated frequency-converting speed-varying machine 310.

Figure 32A:
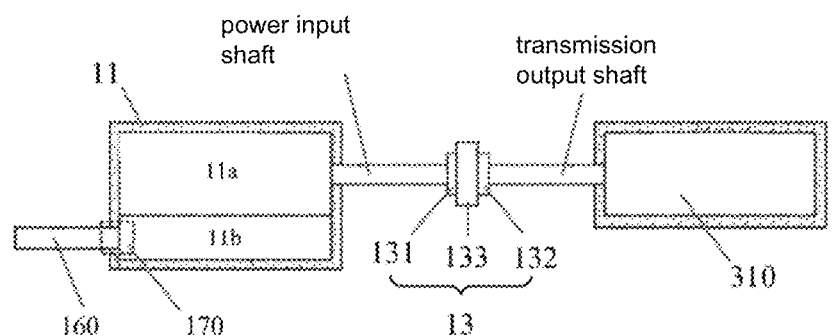
FIGS. 32A to 32E illustrate an example of the connection mode between the power input shaft of the plunger pump and the transmission output shaft of the integrated frequency-converting speed-varying machine in the fracturing apparatus according to some embodiments of the present disclosure.

As shown in FIG. 32A, a fracturing apparatus 100 according to some embodiments of the present disclosure includes a plunger pump 11 and an integrated frequency-converting speed-varying machine 310 for variable frequency speed regulation. The plunger pump 11 includes a power end 11a and a hydraulic end 11b. A fracturing fluid output end 170 is provided at one side of the hydraulic end 11b, and the discharge manifold 160 of the plunger pump 11 extends outward from the fracturing fluid output end 170. The plunger pump 11 further includes a power input shaft extending from the power end 11a, and the power input shaft and the transmission output shaft of the integrated frequency-converting speed-varying machine 310 can be connected via the clutch 13. The clutch 13 includes a first connection portion 131, a second connection portion 132, and a clutch portion 133 between the first connection portion 131 and the second connection portion 132. The power input shaft of the plunger pump 11 is connected with the first connection portion 131, and the second connection portion 132 is connected with the transmission output shaft of the integrated frequency-converting speed-varying machine 310. A shield can be provided outside the clutch 13 to protect the clutch. The front and rear ends of the shield are respectively tightly connected with the casing of the power input shaft of the plunger pump 11 and the casing of the transmission output shaft of the integrated frequency-converting speed-varying machine 310. Here, a clutch with very high stability can be used, on the one hand, in order to maintain the stable and continuous operation of the plunger pump during the fracturing operation, and on the other hand, in order to prevent the plunger pump from being frequently engaged or disengaged. The clutch will not be damaged either.

Figure 32B:
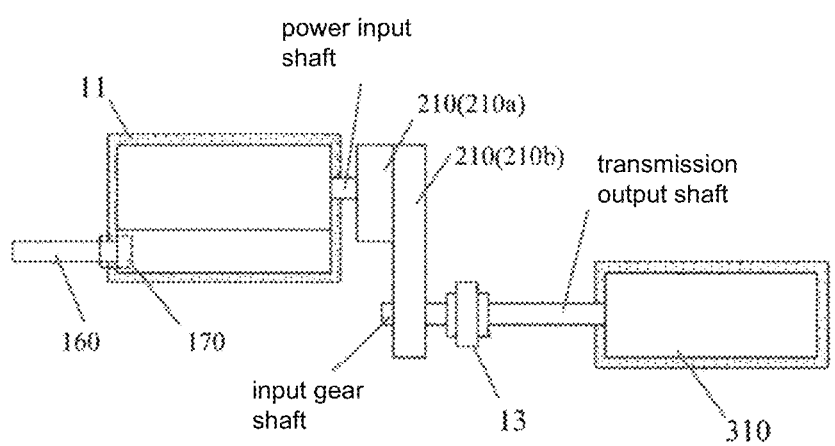

As shown in FIG. 32B, the fracturing apparatus 100 according to some embodiments of the present disclosure may further include a reduction gearbox 210 in addition to having the same parts as in FIG. 32A. The reduction gearbox 210 is provided with an input gear shaft. One end of the input gear shaft is connected to the first connection portion 131 of the clutch 13, and the other end of the input gear shaft is connected to the reduction gearbox 210. The reduction gearbox 210 may include a planetary gearbox 210a and a parallel shaft gearbox 210b. The parallel shaft gearbox 210b is connected to the other end of the above-mentioned input gear shaft, and the planetary gearbox 210a is connected to the power input shaft of the plunger pump 11.

In addition, in the fracturing apparatus 100, a quick connect/disconnect mechanism is provided at the connection portion of the plunger pump 11 and the reduction gearbox 210, and the bottom of the plunger pump 11 is mounted on the equipment base in an assembled structure, at the installation position there are hoisting points. When you want to disassemble a plunger pump and replace it, first stop the plunger pump through the control system, disconnect it through the quick connect/disconnect mechanism, and then use the lifting point to remove the plunger pump from the equipment. Remove it from the base and move it to the designated position, then hoist the new plunger pump to the equipment base, then connect the new plunger pump and the gearbox together through the quick connect/disconnect mechanism, and finally start in the control system Plunger pump.

3.1 Example of a Single Machine Driving a Single Pump

In the integrated frequency-converting speed-varying machine of the present disclosure, in order to improve the single pump power of the plunger pump, as shown in FIG. 32A and FIG. 32B, a design scheme of driving a single plunger pump by a single motor is adopted. As a result, the overall structure of the fracturing apparatus becomes simpler, and at the same time, the output power of the fracturing apparatus is greatly improved, which can better meet the needs of use. Note that the clutch 13 can also be replaced with a coupling.

3.2 Examples of Single-Machine-Driven Multi-Pumps

Figure 32C:
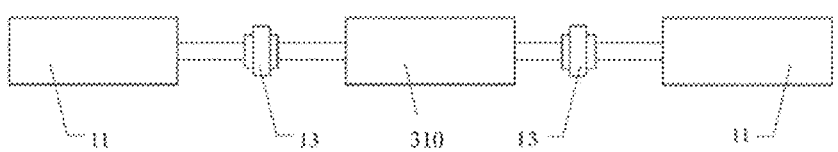
Figure 32D:
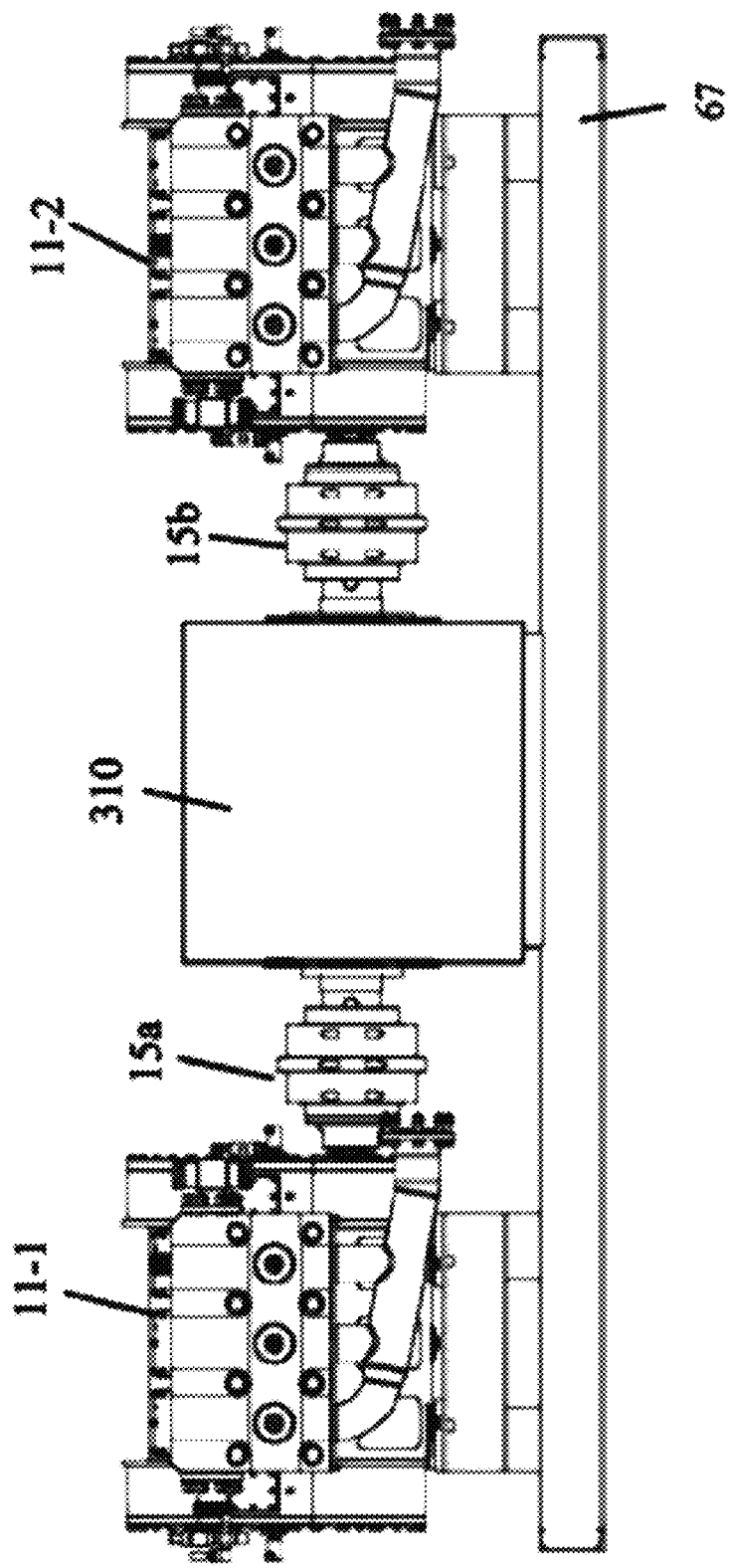
Figure 32E:
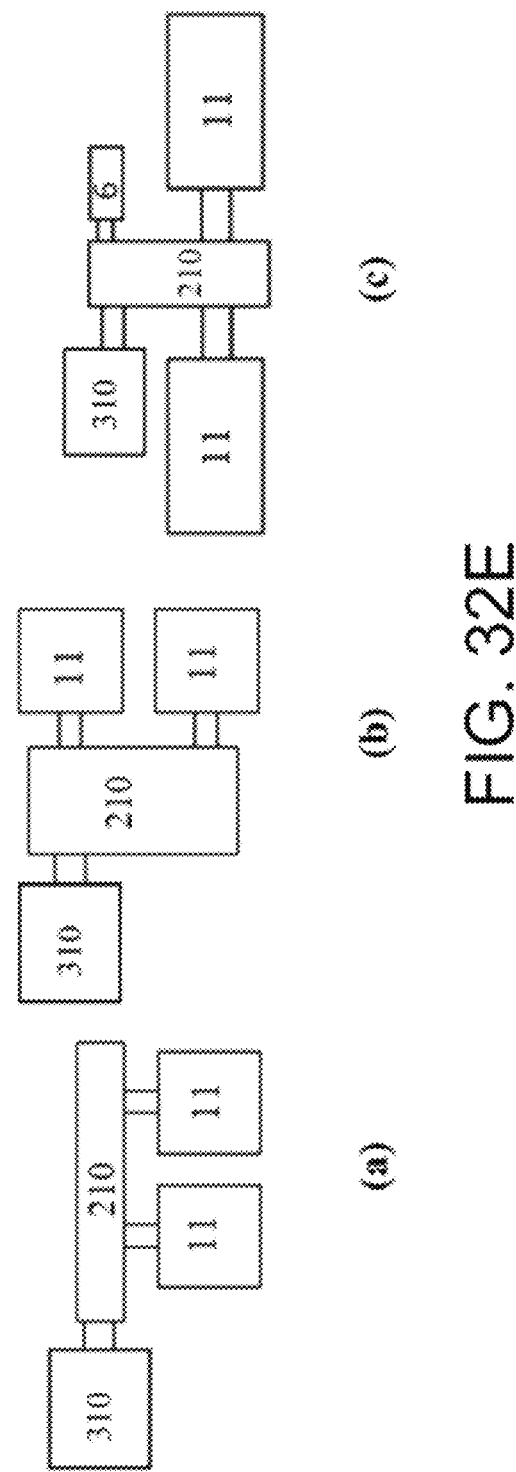

Integrated frequency-converting speed-varying machine of the present disclosure, in order to further save the floor space, a design scheme in which one motor drives a plurality of plunger pumps can be adopted. FIG. 32C to 32E show a connection mode in which one motor drives multiple (or more than two) plunger pumps.

As shown in FIG. 32C, the fracturing apparatus 100 according to some embodiments of the present disclosure includes two plunger pumps 11 and one integrated frequency-converting speed-varying machine 310, so that one integrated frequency-converting speed-varying machine 310 can drive the two plunger pumps 11 at the same time. At this time, the fracturing apparatus 100 may include at least one clutch 13, e.g., two clutches 13. Therefore, when any one of the two plunger pumps 11 is detected to have a problem, the corresponding clutch can be controlled to be disengaged immediately, thereby ensuring the normal operation of the other plunger pump.

In FIG. 32D, the fracturing apparatus 100 according to some embodiments of the present disclosure also includes an integrated frequency-converting speed-varying machine 310 and two plunger pumps 11 (11-1 and 11-2). Couplings 15a and 15b are respectively provided between the integrated frequency-converting speed-varying machine 310 and the plunger pump 11-1 and between the integrated frequency-converting speed-varying machine 310 and the plunger pump 11-2. One side of each coupling is connected with the transmission output shaft (driving shaft) of the integrated frequency-converting speed-varying machine 310, and the other side is connected with the power input shaft (driven shaft) of the plunger pump (11-1 or 11-2) connected. The coupling can make the driving shaft and the driven shaft rotate together and transmit torque. The piston pump can be quickly connected or disassembled by using the coupling, and the manufacturing difference and relative displacement of the driving shaft and the driven shaft can be compensated by using the coupling.

FIGS. 32A, 32C, and 32D may illustrate a single shaft output of a single motor. FIGS. 32B and 32E may illustrate a single-shaft output or multi-shaft output of a single motor. In the case of multi-shaft output, the transmission output shaft of the electric motor may be connected to each plunger pump via the reduction gearbox 210.

For example, as shown in FIG. 32E, an integrated frequency-converting speed-varying machine 310 is connected to the input end of the reduction gearbox 210, the reduction gearbox 210 has at least two output ends, and each plunger pump 11 is connected to a corresponding output end of the reduction gearbox 210. A transmission device may also be used to connect the plunger pump 11 and the reduction gearbox 210. For example, the reduction gearbox 210 may be equipped with a clutch at each output end thereof, so as to realize independent control of each output end, thereby also realizing quick disassembly and replacement of each plunger pump 11. The layout of the plurality of plunger pumps 11 relative to the reduction gearbox 210 can be appropriately arranged according to actual needs. For example, the plurality of plunger pumps 11 may be arranged side by side in a direction extending from the transmission output shaft of the integrated frequency-converting speed-varying machine 310 and at the same output side of the reduction gearbox 210 (as shown in (a) of FIG. 32E), or arranged side by side in a direction perpendicular to the extension direction of the transmission output shaft of the integrated frequency-converting speed-varying machine 310 and arranged on the same output side of the reduction gearbox 210 (as shown in (b) of FIG. 32E), or may be placed on different output sides of the reduction gearbox 210 (as shown in (c) of FIG. 32E). The integrated frequency-converting speed-varying machine 310 or the reduction gearbox 210 may also be provided with a power take-off port, through which the lubricating motor 6 is driven to provide power for the lubricating system (as shown in (c) of FIG. 32E).

3.3 Example of Replacing the Electric Motor with a Turbine

In the previous embodiment and its examples, the example of using the integrated frequency-converting speed-varying machine to drive the fracturing apparatus has been described, but the integrated frequency-converting speed-varying machine can also be replaced by a turbine, by connecting the turbine with the plunger of the fracturing apparatus. The pumps are integrally mounted together, and a highly integrated equipment layout can also be obtained.

It has been exemplarily described above, and an application example of the fracturing apparatus in a well site will be described next.

4. Well Site Layout of Fracturing Apparatus

FIG. 33 shows an example of a wellsite layout of a fracturing apparatus according to some embodiments of the present disclosure. In this wellsite layout, multiple fracturing apparatuses 100 each have their own low pressure manifold 34, but they share a high pressure manifold 33. The high-pressure fracturing fluid output from each fracturing apparatus 100 enters the high-pressure manifold 33, and is connected to the wellhead 40 through the high-pressure manifold 33 for injection into the formation. All manifolds can be integrated into a manifold skid for centralized observation and management.

In some examples, as shown in FIG. 33, the wellsite layout also includes a dosing area 70. The liquid mixing area 70 may include mixing liquid supply equipment 71, sand mixing equipment 72, liquid tank 73, sand storage and sand adding equipment 74 and the like. In some cases, the fracturing fluid injected downhole is a sand-carrying fluid, so it is necessary to suspend the sand particles in the fracturing fluid by mixing water, sand, and chemical additives. For example, clean water and chemical additives can be mixed in the mixing liquid supply equipment 71 to form a mixed liquid, and the mixed liquid in the mixed liquid supply equipment 71 and the sand in the sand storage and sand adding equipment 74 are jointly entered into the sand mixing equipment 72 to mix and form the sand-carrying fracturing fluid required for the operation. The low-pressure fracturing fluid formed by the sand mixing device 72 is sent to the liquid inlet of the fracturing apparatus 100, and the fracturing apparatus 100 pressurizes the low-pressure fracturing fluid and sends it to the high-pressure manifold 33.

For example, the power for the mixing and supplying equipment 71, the sand mixing equipment 72, the sand storage and adding equipment 74, etc., can come from power supply equipment such as a control cabinet on site.

In some examples, as shown in FIG. 33, the well site layout often also includes a control room, where a centralized control system is provided for controlling all the plunger pumps, variable frequency speed control integrated machines, and the like.

5. Other Modifications

Figure 34:
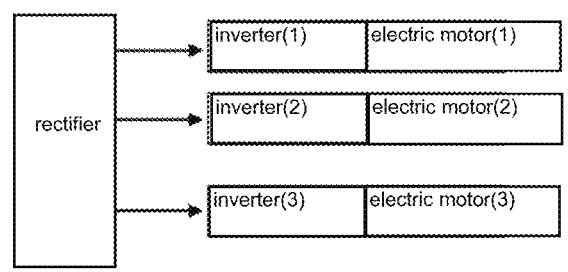
FIG. 34 illustrates an example of connecting a rectifier with a plurality of inverters respectively integrated on a motor according to some embodiments of the present disclosure.

FIG. 34 shows an example of connecting a rectifier with a plurality of inverters respectively integrated on a motor according to some embodiments of the present disclosure. The rectifier includes an input end and an output end, the inverter includes an input end and an output end, the output end of the rectifier is respectively connected to the input end of each inverter, and the respective output end of each inverter is connected to the corresponding motor input terminal. By connecting one rectifier with multiple inverters, the number of rectifiers can be reduced, making the well site layout smaller and more economical.

The rectifier can be arranged in the control cabinet, and each inverter is integrated on the corresponding motor. By only integrating the inverter on the motor, the weight of the integrated frequency-converting speed-varying machine can be further reduced, the space occupied by the integrated frequency-converting speed-varying machine can be saved, and the motor and inverter in the integrated frequency-converting speed-varying machine can be optimized and other devices, or facilitate the arrangement of other devices. Since the inverters are integrally arranged on the corresponding motors, it is not necessary to connect the inverters and the motor before each fracturing operation, thereby reducing the operational complexity.

For example, applying FIG. 34 to the wellsite layout shown in FIG. 33, the fracturing apparatus 100 in FIG. 33 can be divided into three groups, wherein each of the two groups includes three inverters and three motors, and the remaining one. The group includes two inverters and two electric motors. Each group is equipped with a rectifier. In this way, when the eight fracturing apparatuses 100 is in operation, only three straightening devices need to be equipped, thereby significantly reducing the number of straightening devices, reducing the area of the well site, and reducing the cost. The number of fracturing apparatuses 100 shown in FIG. 33 and the number of inverters sharing one rectifying device shown in FIG. 34 are only an example, and the embodiments of this aspect are not limited thereto.

In some embodiments, an objective of the present invention is to provide a power supply semi-trailer for electric drive fracturing equipment, including a combination of a gas turbine engine, a generator and a rectifying unit, the generator is connected to the rectifying units directly to obviate conventional rectifier transformer equipment. The rectifying unit is connected to the inversion unit through a common DC bus, so that the common DC bus can separately drive multiple inversion units, thus decreasing the wirings of power supply lines. A high voltage inversion unit is disposed on a gooseneck of the electric drive semi-trailer to optimize the spatial arrangement of equipment. The entire power supply equipment has a compact structure and low coast, occupies a small area, and is simple in wiring.

The objective may be achieved by the following technical measures: a power supply semi-trailer for electric drive fracturing equipment, including a power supply platform, one gas turbine engine, one generator, multiple sets of rectifying units and multiple sets of inversion units, wherein the gas turbine engine, the generator and the rectifying units are integrated on the power supply platform; one end of the generator is connected to the gas turbine engine, the other end of the generator is connected to the rectifying units, the multiple sets of rectifying units are arranged side by side; the inversion units are disposed on a gooseneck of the electric drive power supply platform, and the rectifying units are connected to the inversion units through a common DC bus.

In some embodiments, the generator is a double-winding generator. In one embodiment, the generator is connected to the rectifying units directly. In one embodiment, a phase difference of double winding of the generator is 30°, and the winding configuration is type Y-Y or type D-D. In one embodiment, the power of the generator is at least 10 MVA, and the frequency is 50-60 Hz or 100-120 Hz. In one embodiment, the voltages of the rectifying units range from 4000 VDC to 6500 VDC. In one embodiment, each of the inversion units includes two three-level inverters. In one embodiment, the inversion units disposed on another gooseneck of the semi-trailer are high voltage inversion units.

In some embodiments, the present application has the following technical improvements: 1. employing a combination of a gas turbine engine, a generator and rectifying units, the generator is connected to the rectifying units directly to obviate conventional rectifier transformer equipment; 2. the rectifying units are connected to the inversion units through a common DC bus, so that the common DC bus can separately drive multiple inversion units, thus decreasing the wirings of power supply lines; 3. a high voltage inversion unit is disposed on a gooseneck of the electric drive semi-trailer to optimize the spatial arrangement of equipment; 4. the entire power supply equipment has a compact structure, occupies a small area, and is simple in wiring; 5. the output power of the entire power supply equipment is high, providing a forceful guarantee for the high-power electric drive fracturing equipment.

Referring to FIGS. 35-38, references in the figures may include: 901. power supply platform, 902. gas turbine engine, 903. generator, 904. rectifying unit (or referred to as rectifier), 905. high voltage inversion unit (or referred to as high voltage inverter), 906. electric drive fracturing equipment, 907. gooseneck, 908. electric drive power supply platform, 909. double-winding generator, 910. three-level inverter, 911. common DC bus, and 912. plunger pump.

Figure 35:
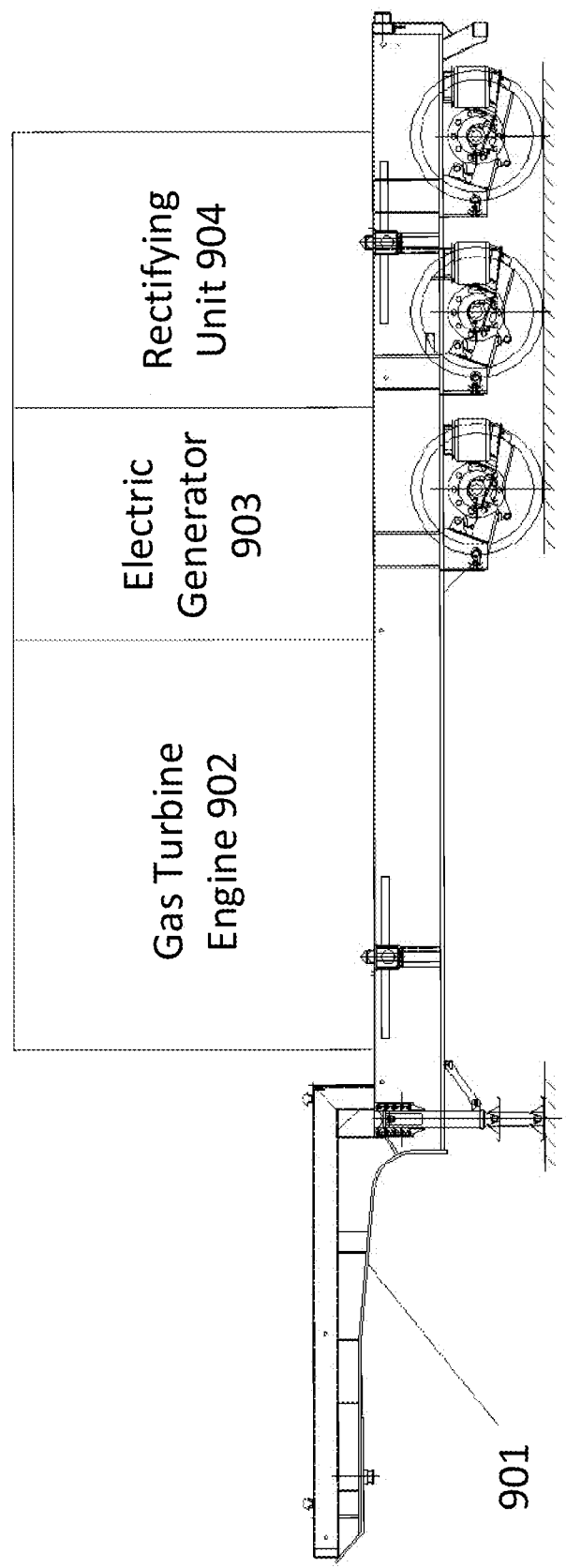
FIG. 35 is a schematic structural diagram of a power supply semi-trailer according to some embodiments of the present disclosure.
Figure 36:
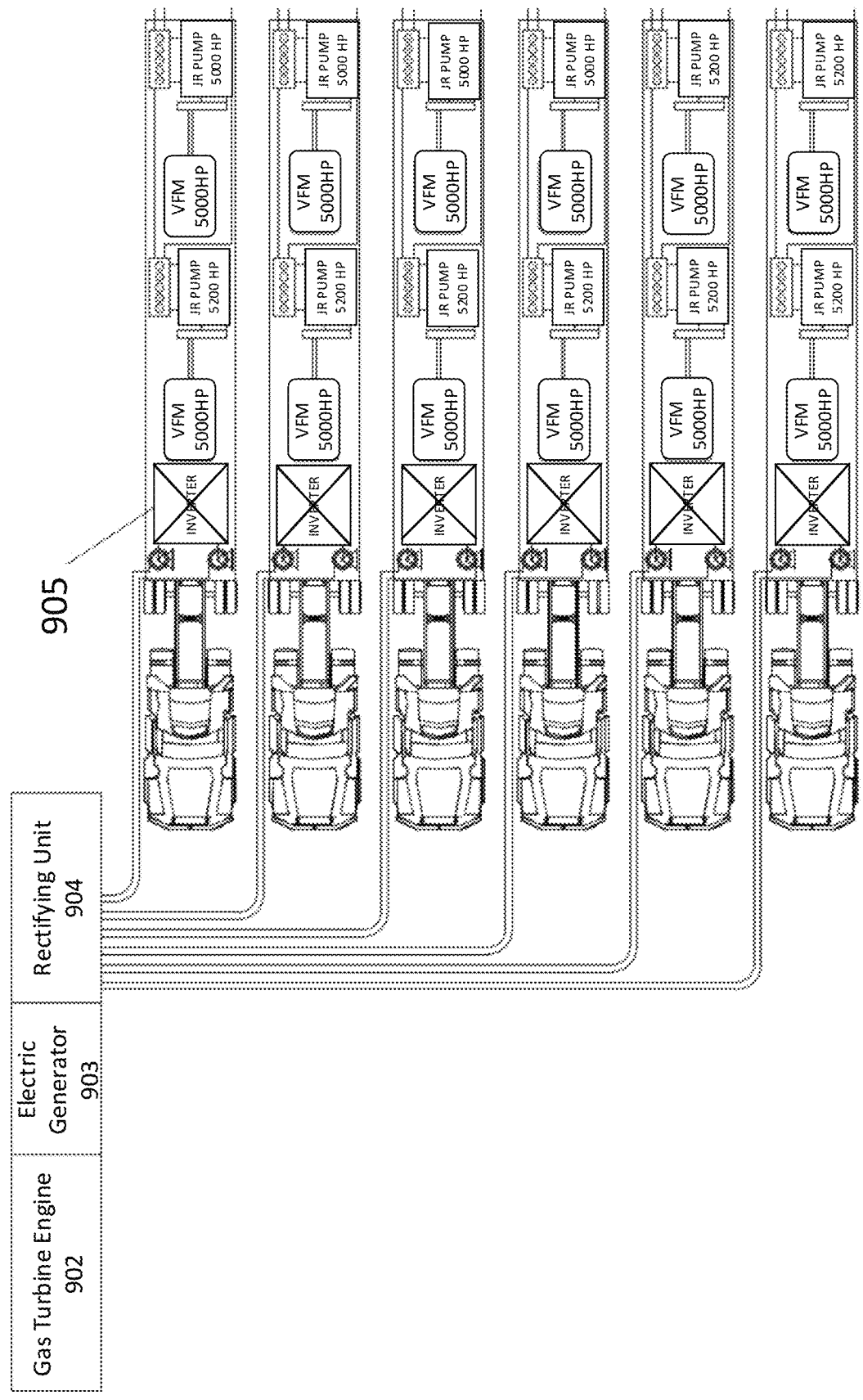
FIG. 36 is a schematic structural diagram of an electric drive fracturing equipment according to some embodiments of the present disclosure.
Figure 37:
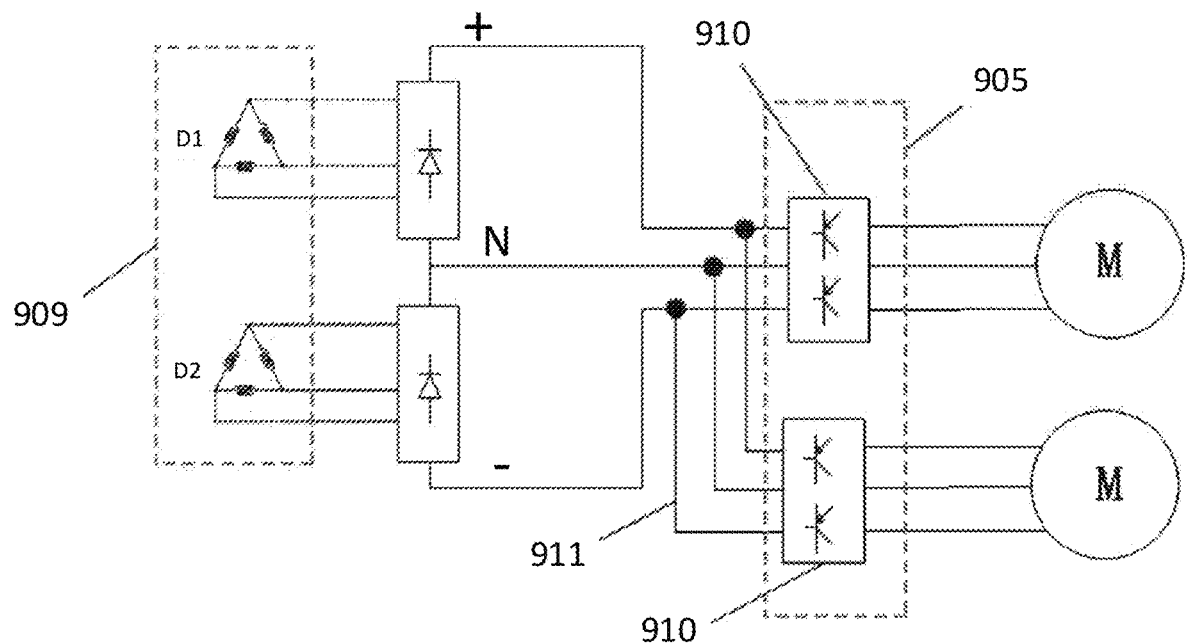
FIG. 37 is a schematic diagram of electrical connection of a generator in D-D configuration according to some embodiments of the present disclosure.
Figure 38:
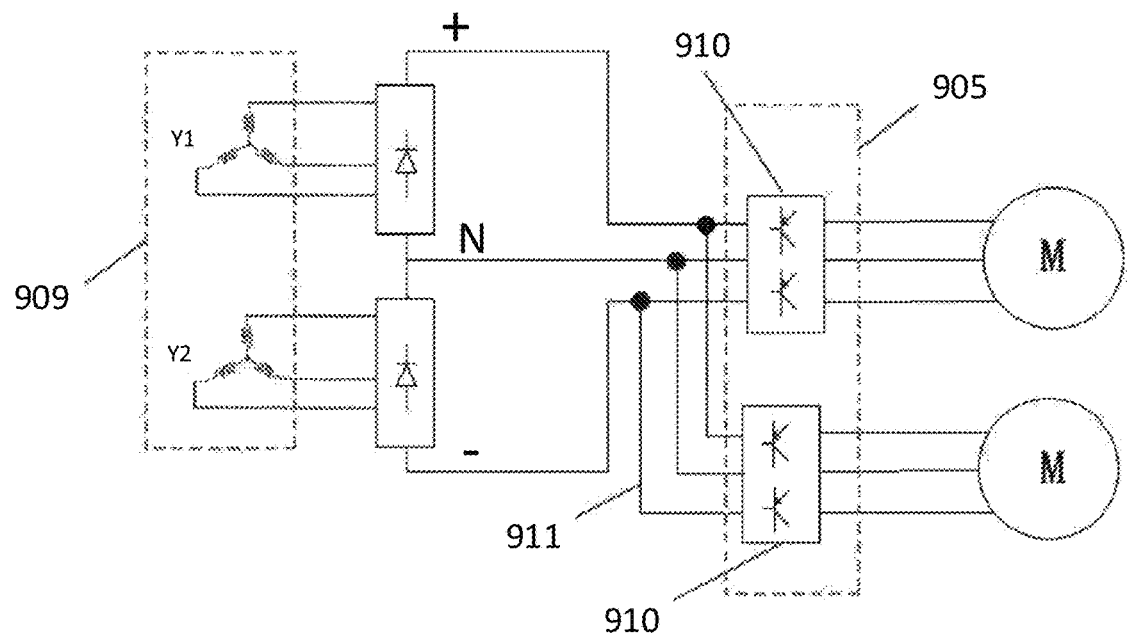
FIG. 38 is a schematic diagram of electrical connection of a generator in Y-Y configuration according to some embodiments of the present disclosure.

In some embodiments, as shown in FIGS. 35 to 36, a power supply semi-trailer for electric drive fracturing equipment includes a power supply platform 901, one gas turbine engine 902, one generator 903, multiple sets of rectifying units 904 and multiple sets of inversion units, wherein the gas turbine engine 902, the generator 903 and the rectifying units 904 are integrated on the power supply platform 901; one end of the generator 903 is connected to the gas turbine engine 902, the other end of the generator 903 is connected to the rectifying units 904, the multiple sets of rectifying units 904 are arranged side by side; the inversion units are disposed on a gooseneck of the electric drive power supply platform, and the rectifying units 904 are connected to the inversion units through a common DC bus. At least two of the following may be arranged on the power supply platform: the gas turbine engine, the generator, and the one or more rectifiers. The generator 903 is a double-winding generator. The generator 903 is connected to the rectifying units 904 directly. The power supply semi-trailer is a power supply semi-trailer matched with the electric drive fracturing equipment, which is provided with a combination of a gas turbine engine 902, a generator 903 and a rectifying unit 904 integrated on a power supply platform 901. The generator 903 is connected to the rectifying unit 904 directly. This power supply mode directly obviate the rectifier transformer equipment in conventional power supply, making the volume of the power supply semi-trailer smaller. The rectifying units 904 are connected to the inversion units through a common DC bus, so that the common DC bus can separately drive multiple inversion units, thus decreasing the wirings of power supply lines, and simplifying the circuit connection, the wiring becoming easier.

In some embodiments, the inversion units disposed on a gooseneck of the electric drive power supply platform are high voltage inversion units 905. The high voltage inversion units 905 are disposed on a gooseneck of the electric drive power supply platform to optimize the spatial arrangement of equipment, so that the entire electric drive fracturing equipment has a compact structure, and occupies a small area.

In some embodiments, the phase difference of double winding of the generator 903 is 30°, the winding configuration is type Y-Y or type D-D. The alternating voltage output from the generator 903 ranges from 1600 VAC to 2300 VAC.

In some embodiments, the power of the generator 903 is at least 10 MVA, the frequency is 50-60 Hz or 100-120 Hz, and the voltages of the rectifying units 904 are 4000 VDC or above, and further the voltages of the rectifying units range from 4000 VDC to 6500 VDC, ensuring that the power supply semi-trailer has a high output power to drive a high-power electric drive fracturing semi-trailer.

In some embodiments, FIG. 36 is a schematic diagram of connection between the power supply semi-trailer and the high-power electric drive fracturing semi-trailer. The rectifying units 904 on the power supply platform 901 are connected to the inversion units disposed on the gooseneck of the electric drive power supply platform through a common DC bus. Each of the inversion units has a compartment structure provided with two three-level inverters. Each inverter can drive one electric motor to work independently. Electric motors are used to drive the plunger pump to work, providing a forceful guarantee for the power supply of the high-power electric drive equipment. The lubricating oil radiator is used to cool the lubricating oil in the plunger pump. An electrical control cabinet is used to implement local manipulation of the electric drive fracturing semi-trailer.

In some embodiments, the fracturing apparatus includes a plurality of sets of fracturing semi-trailers including a plurality of fracturing semi-trailer bodies respectively. The plurality of sets of inverters are on the fracturing semi-trailer bodies respectively. In one embodiment, each set of the inverters comprises two inverters, and the inverters are three-level inverters. In one embodiment, the inverters are high voltage inverters, and each of the plurality of sets of inverters is arranged on a gooseneck of one of sets of the fracturing semi-trailers. In one embodiment, the fracturing apparatus further includes an electric motor and a plunger on each of the fracturing semi-trailer bodies. Each of the inverters is connected to the electric motor and the electric motor is connected to a plunger pump.

Figure 39:
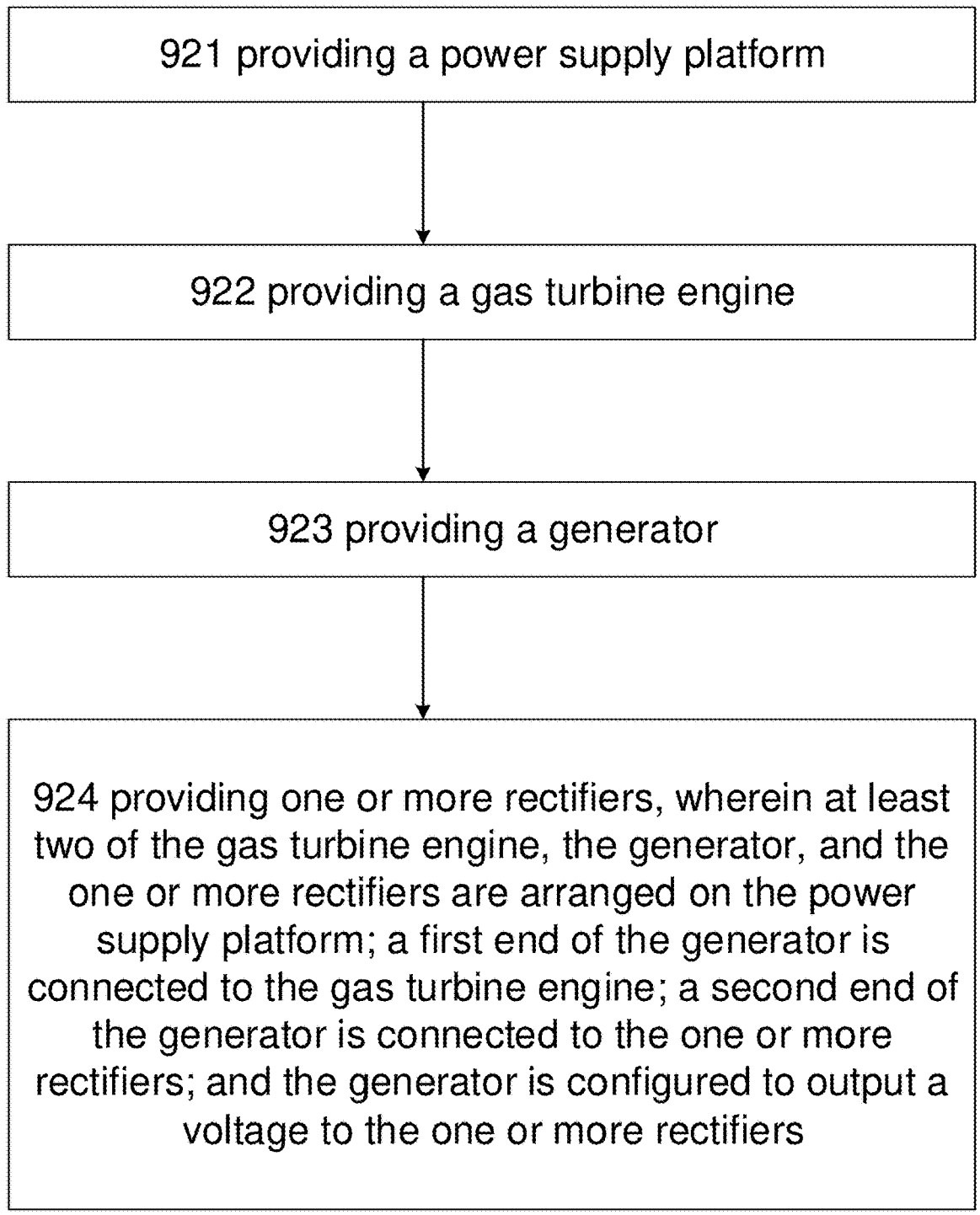
FIG. 39 is a schematic diagram of a fracturing method according to some embodiments of the present disclosure.

FIG. 39 is a schematic diagram of a fracturing method 920 according to some embodiments of the present disclosure. The method 920 may include step 921 providing a power supply platform; step 922 providing a gas turbine engine; step 923 providing a generator; and step 924 providing one or more rectifiers, wherein at least two of the gas turbine engine, the generator, and the one or more rectifiers are arranged on the power supply platform; a first end of the generator is connected to the gas turbine engine; a second end of the generator is connected to the one or more rectifiers; and the generator is configured to output a voltage to the one or more rectifiers.

The directional phrases "top", "bottom", "front end", "back end", and the like used in the invention should be conceived as shown in the attached drawings, or may be changed in other ways, if desired.

In the drawings of the embodiments of the present disclosure, only the structures related to the embodiments of the present disclosure are involved, and other structures may refer to the common design(s). In case of no conflict, features in one embodiment or in different embodiments of the present disclosure may be combined.

The above are merely particular embodiments of the present disclosure but are not limitative to the scope of the present disclosure; any of those skilled familiar with the related arts can easily conceive variations and substitutions in the technical scopes disclosed in the present disclosure, which should be encompassed in protection scopes of the present disclosure. Therefore, the scopes of the present disclosure should be defined in the appended claims. Further, two or more of the embodiments described herein may be combined unless explicitly prevented.

The invention claimed is:

1. A fracturing apparatus, comprising:
   a power supply platform;
   a gas turbine engine;
   a generator; and
   one or more rectifiers, wherein:
   at least two of the gas turbine engine, the generator, and the one or more rectifiers are arranged on the power supply platform;
   a first end of the generator is connected to the gas turbine engine;
   a second end of the generator is connected to the one or more rectifiers; and
   the generator is configured to output a voltage to the one or more rectifiers.

2. The fracturing apparatus according to claim 1, further comprising:
a first plunger pump, comprising a first power end and a first hydraulic end; and
a prime mover, comprising a first power output shaft; wherein:
the first power end of the first plunger pump comprises a first power input shaft; and
the prime mover is coupled to the generator via the one or more rectifiers.

3. The fracturing apparatus according to claim 2, further comprising:
a first clutch, comprising a first connection portion and a second connection portion,
wherein the first connection portion is coupled to the first power input shaft, and the second connection portion is coupled to the first power output shaft of the prime mover.

4. The fracturing apparatus according to claim 3, wherein:
the first clutch further comprises a first clutch portion between the first connection portion and the second connection portion; and
the fracturing apparatus further comprises a first clutch hydraulic system coupled to the first clutch portion and configured to provide hydraulic oil to the first clutch.

5. The fracturing apparatus according to claim 4, further comprising:
a first pressure sensor and a second pressure sensor, wherein the first pressure sensor is configured to detect a hydraulic pressure of the first clutch hydraulic system, the first hydraulic end of the first plunger pump comprises a first liquid output end, and the second pressure sensor is configured to detect a pressure of liquid output by the first liquid output end.

6. The fracturing apparatus according to claim 5, further comprising:
a discharge manifold, connected with the first liquid output end,
wherein the second pressure sensor is disposed on the first liquid output end or the discharge manifold.

7. The fracturing apparatus according to claim 4, further comprising:
a first temperature sensor, configured to detect a temperature of the first clutch; and
a second temperature sensor, configured to detect a temperature of the hydraulic oil in the first clutch hydraulic system.

8. The fracturing apparatus according to claim 2, further comprising:
a gearbox;
a second plunger pump, comprising a second power end and a second hydraulic end; and
a second clutch, comprising a third connection portion and a fourth connection portion,
wherein the prime mover further comprises a second power output shaft, the second power end of the second plunger pump comprises a second power input shaft, the third connection portion is coupled to the second power input shaft, the fourth connection portion is coupled to the second power output shaft of the prime mover, and the gearbox connects the second power input shaft with the second power output shaft.

9. The fracturing apparatus according to claim 8, wherein:
the second clutch further comprises a second clutch portion between the third connection portion and the fourth connection portion;
the fracturing apparatus further comprises a second clutch hydraulic system coupled to the second clutch portion and configured to provide hydraulic oil to the second clutch;
the fracturing apparatus further comprises a third pressure sensor and a fourth pressure sensor; and
the third pressure sensor is configured to detect a hydraulic pressure of the second clutch hydraulic system, the second hydraulic end of the second plunger pump comprises a second liquid output end, and the fourth pressure sensor is configured to detect a pressure of liquid output by the second liquid output end.

10. The fracturing apparatus according to claim 2, further comprising:
a first vibration sensor, configured to detect vibration of the first plunger pump; and
a second vibration sensor, configured to detect vibration of the prime mover,
wherein the fracturing apparatus further comprises a plunger pump base, the first plunger pump is disposed on the plunger pump base, and the first vibration sensor is disposed on the first plunger pump or the plunger pump base; and
wherein the fracturing apparatus further comprises a prime mover base, the prime mover is disposed on the prime mover base, and the second vibration sensor is disposed on the prime mover or the prime mover base.

11. The fracturing apparatus according to claim 2, further comprising:
a first rotation speed sensor, configured to detect an actual rotation speed of the first power input shaft of the first plunger pump; and
a second rotation speed sensor, configured to detect an actual rotation speed of the first power output shaft of the prime mover.

12. The fracturing apparatus according to claim 2, further comprising:
a planetary gearbox; and
a first clutch, comprising a first connection portion and a second connection portion, wherein:
the first connection portion is coupled to the first power input shaft;
the second connection portion is coupled to the first power output shaft of the prime mover;
the planetary gearbox comprises an input gear shaft;
the first connection portion of the first clutch is directly connected with the input gear shaft; and
the first power input shaft is directly connected with the planetary gearbox.

13. The fracturing apparatus according to claim 2, further comprising a radiator, a power supplier, and a motor, wherein:
the prime mover comprises a diesel engine, an electric motor, or a turbine engine,
the power supplier, the motor, the radiator, and the first plunger pump are disposed on the power supply platform,
the power supplier is coupled and configured to supply power to the motor, the motor is coupled to and configured to drive the first plunger pump, and
the radiator is configured to cool lubricating oil in the first plunger pump.

14. The fracturing apparatus according to claim 13, wherein the power supplier comprises a voltage converter and a frequency converter, the frequency converter is coupled to the voltage converter, the voltage converter is disposed at one end of the power supply platform near the motor, and the frequency converter is disposed on a gooseneck of the power supply platform.

15. The fracturing apparatus according to claim 14, wherein:
the voltage converter comprises a compartment structure comprising a high voltage switch and a transformer connected to each other;
the frequency converter comprises a compartment structure comprising a frequency converter; and
an input end of the frequency converter is connected to the voltage converter, and an output end of the frequency converter is connected to the motor.

16. The fracturing apparatus according to claim 13, further comprising:
a noise reduction device comprising a cabin structure, wherein the noise reduction device covers the motor and isolates the motor from the first plunger pump;
an oil tank containing lubricating oil;
a lubrication driving device configured to supply the lubricating oil from the oil tank to the first plunger pump;
a cooler comprising a fan disposed inside the noise reduction device and above the motor and configured to cool the lubricating oil, wherein the lubrication driving device includes a lubrication pump and a lubrication motor;
a primary exhaust silencer disposed inside the noise reduction device and connected with an exhaust port of a cooling fan of the motor via a soft connection, wherein a flow area of an airflow passage in the soft connection gradually increases along an airflow direction; and
a secondary exhaust silencer provided on the noise reduction device and corresponds to an exhaust port of the primary exhaust silencer.

17. The fracturing apparatus according to claim 2, wherein:
the first plunger pump is a five cylinder plunger pump comprising a power end assembly, a hydraulic end assembly, and a reduction gearbox assembly;
the power end assembly comprises the first power end;
the hydraulic end assembly comprises the first hydraulic end;
the power end assembly is connected to the hydraulic end assembly and the reduction gearbox assembly; and
the power end assembly comprises a crankcase, a crosshead case, and a spacer frame connected in sequence.

18. The fracturing apparatus according to claim 17, wherein:
the crankcase and the crosshead case are integrally welded to form a power end housing connected to the spacer frame;
the power end housing comprises a plurality of vertical plates, a plurality of bearing seats, a front end plate, a back cover plate, a base plate, a support plate, and an upper cover plate;
each of the vertical plates is connected to a corresponding one of the bearing seats;
the vertical plates are arranged in parallel to form a power end chamber;
the base plate is mounted at a bottom of the power end chamber;
the upper cover plate is mounted on a top of the power end chamber;
the front end plate is mounted at a front end of the power end chamber;
the back cover plate is mounted at a back end of the power end chamber; and
the support plate is disposed between two adjacent vertical plates arranged in parallel.

19. The fracturing apparatus according to claim 2, further comprising:
an integrated frequency-converting speed-varying machine, comprising a drive device configured to provide driving force and an inverter configured to supply an electric power to the drive device, wherein the first plunger pump is mechanically coupled to and driven by the drive device.

20. A fracturing system, comprising:
a power supply platform;
one or more fracturing plunger pumps;
a gas turbine engine;
a generator; and
one or more rectifiers, wherein:
at least two of the gas turbine engine, the generator, and the one or more rectifiers are arranged on the power supply platform;
a first end of the generator is connected to the gas turbine engine;
a second end of the generator is connected to the one or more rectifiers;
the generator is configured to output a voltage to the one or more rectifiers; and
the one or more rectifiers are coupled to one or more electric motors and configured to power the one or more electric motors to drive the one or more fracturing plunger pumps.

* * * * *